(12) United States Patent
Takenaka et al.

(10) Patent No.: US 7,337,040 B2
(45) Date of Patent: Feb. 26, 2008

(54) SELF-POSITION ESTIMATING DEVICE FOR LEG TYPE MOVABLE ROBOTS

(75) Inventors: Toru Takenaka, Wako (JP); Takashi Matsumoto, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 662 days.

(21) Appl. No.: 10/512,263

(22) PCT Filed: Apr. 28, 2003

(86) PCT No.: PCT/JP03/05448

§ 371 (c)(1),
(2), (4) Date: Oct. 22, 2004

(87) PCT Pub. No.: WO03/090980

PCT Pub. Date: Nov. 6, 2003

(65) Prior Publication Data

US 2005/0126833 A1    Jun. 16, 2005

(30) Foreign Application Priority Data

Apr. 26, 2002 (JP) ............................. 2002-127066

(51) Int. Cl.
*G06F 19/00* (2006.01)

(52) U.S. Cl. ...................... 700/245; 700/246; 700/251; 700/253; 700/260; 700/261; 318/568.1; 318/568.12; 318/568.16; 318/568.17; 318/568.2; 901/1; 901/9; 901/46; 180/8.1; 180/8.6

(58) Field of Classification Search ................ 700/245, 700/246, 251, 253, 260, 261; 318/568.1, 318/568.12, 568.16, 568.17, 568.2; 180/8.1, 180/8.6, 65.1; 901/1, 9, 46; 701/23

See application file for complete search history.

(56) References Cited

U.S. PATENT DOCUMENTS

| 6,963,185 | B2* | 11/2005 | Takenaka et al. | ............ 700/245 |
| 6,969,965 | B2* | 11/2005 | Takenaka et al. | ...... 318/568.12 |
| 2005/0179417 | A1* | 8/2005 | Takenaka et al. | ...... 318/568.12 |
| 2007/0156283 | A1* | 7/2007 | Takenaka | .................... 700/245 |

FOREIGN PATENT DOCUMENTS

| JP | 05-305584 | 11/1993 |
| JP | 05-318339 | 12/1993 |

(Continued)

OTHER PUBLICATIONS

WO 02/40224 A1, Gait Pattern Generating Device for Legged Mobile Robot, Publication Date: May 23, 2002.
WO 03/057425 A1, Gait Producing Device for Leg Type Movable Robot, and Control Device, Publication Date: Jul. 17, 2003.

*Primary Examiner*—Thomas Black
*Assistant Examiner*—McDieunel Marc
(74) *Attorney, Agent, or Firm*—Rankin, Hill, Porter & Clark LLP

(57) ABSTRACT

Based on a detected or estimated value of an actual posture of a predetermined part, such as a body 3, of a robot 1 and a deviation the actual posture from a posture of a desired gait, a posture rotational deviation's variation is determined as the temporal variation of the deviation, and the position of the robot 1 (for example, the position where the robot comes into contact with a floor) is estimated on the assumption that the robot 1 rotates about a rotation center by the rotational deviation's variation. In addition, in accordance with the difference between the estimated position and the estimated position of the robot 1 determined by an inertial navigation method using an accelerometer or the like, the estimated position of the robot 1 determined by the inertial navigation method is corrected, thereby improving the precision of the estimated position.

61 Claims, 23 Drawing Sheets

FOREIGN PATENT DOCUMENTS

| | | |
|---|---|---|
| JP | 05-324115 | 12/1993 |
| JP | 10-086080 | 4/1998 |
| JP | 10-277969 | 10/1998 |
| JP | 11-272983 | 10/1999 |
| JP | 2000-153476 | 6/2000 |
| JP | 2002-326173 | 11/2002 |

* cited by examiner

FLOOR REACTION FORCE'S VERTICAL COMPONENT

X COMPONENT OF DESIRED ZMP

CORRECTION GAIN K (REPRESENTATIVE OF Ka, Kb, Kc AND Kd)

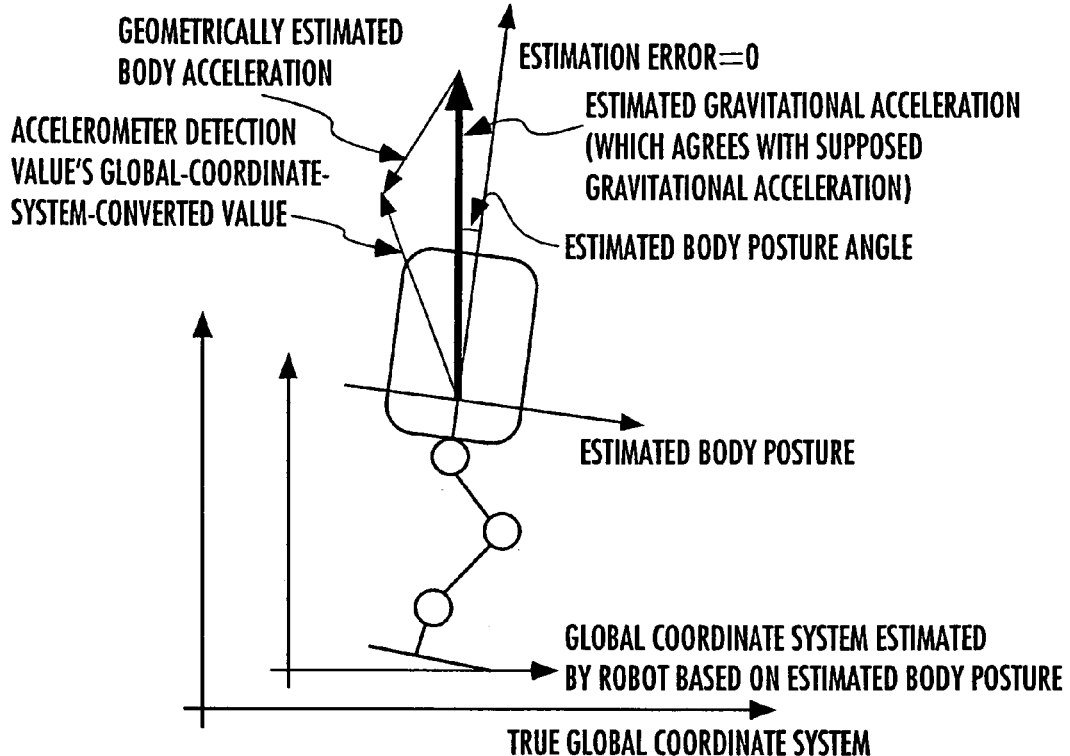
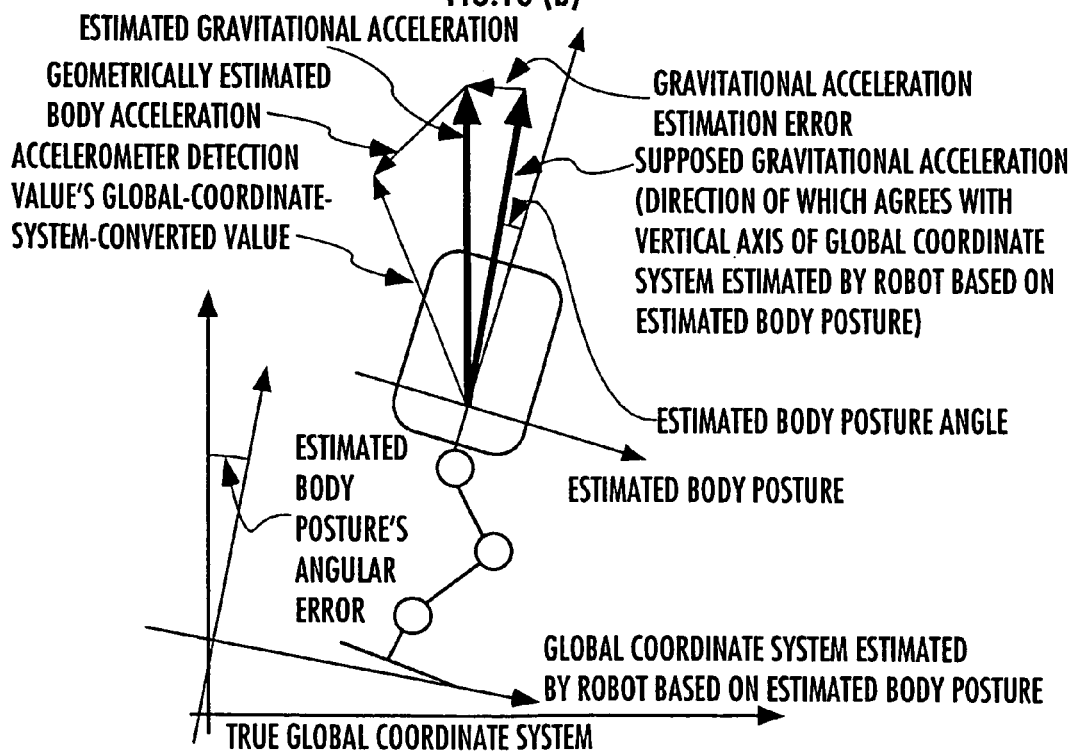

FIG. 20

START

S2400
DETERMINE ESTIMATED BODY POSTURE BY INTEGRATING DETECTION VALUE OF GYRO SENSOR, AND CORRECT DETECTION DRIFT OF GYRO SENSOR AND DRIFT OF INCLINATION COMPONENT OF ESTIMATED BODY POSTURE USING MOVEMENT ACCELERATION CALCULATED FROM MOVEMENT OF GEOMETRICALLY ESTIMATED BODY POSITION DETERMINED IN THE PRECEDING CONTROL CYCLE AND ACCELEROMETER DETECTION VALUE

S2402
PERFORM STEPS S2202 TO S2214 TO DETERMINE POSITION/POSTURE OF ESTIMATED SUPPORTING LEG COORDINATE SYSTEM AND GEOMETRICALLY ESTIMATED BODY POSITION

S2404
CALCULATE GEOMETRICALLY ESTIMATED TOTAL-CENTER-OF-GRAVITY POSITION BASED ON POSITION/POSTURE OF ESTIMATED SUPPORTING LEG COORDINATE SYSTEM, JOINT DISPLACEMENT OR THE LIKE

S2406
CALCULATE INERTIAL-NAVIGATION-LIKE ESTIMATED TOTAL-CENTER-OF-GRAVITY ACCELERATION THROUGH KINEMATICS CALCULATION BASED ON JOINT DISPLACEMENT, ESTIMATED BODY POSTURE (OR DESIRED BODY POSTURE) AND ACCELEROMETER DETECTION VALUE'S GLOBAL-COORDINATE-SYSTEM-CONVERTED VALUE

S2408
DETERMINE INERTIAL-NAVIGATION-LIKE ESTIMATED BODY POSITION BY INERTIAL NAVIGATION METHOD BASED ON INERTIAL-NAVIGATION-LIKE ESTIMATED TOTAL-CENTER-OF-GRAVITY ACCELERATION, AND CORRECT INERTIAL-NAVIGATION-LIKE BODY POSITION IN SUCH A MANNER THAT DIFFERENCE BETWEEN GEOMETRICALLY ESTIMATED BODY POSITION AND INERTIAL-NAVIGATION-LIKE ESTIMATED BODY POSITION CONVERGES TO 0

S2410
CALCULATE ESTIMATED BODY POSITION BASED ON INERTIAL-NAVIGATION-LIKE ESTIMATED TOTAL-CENTER-OF-GRAVITY POSITION, JOINT DISPLACEMENT DETECTION VALUE AND ESTIMATED BODY POSTURE (OR DESIRED BODY POSTURE)

RETURN

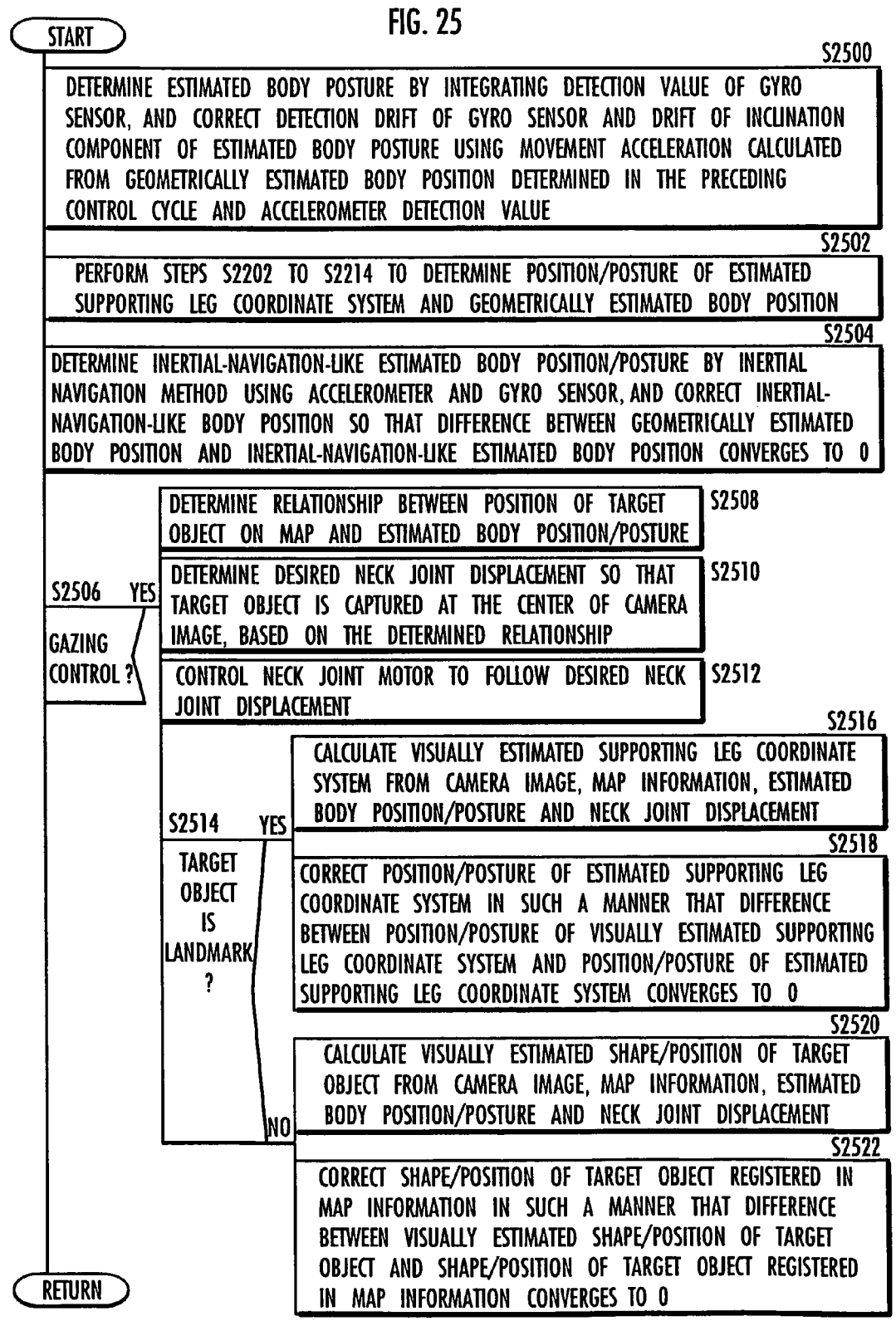

SELF-POSITION ESTIMATING DEVICE FOR LEG TYPE MOVABLE ROBOTS

TECHNICAL FIELD

The present invention relates to a self-position estimating device for a leg type movable robot.

BACKGROUND ART

Conventionally, a leg type movable robot has a problem that a reaction force caused by the moving robot swinging each leg overcomes the friction force between the foot (that is, the end portion of the leg) and the floor, causing a rotational slipping (spin) of the foot with respect to the floor, a rotation of the posture of the whole robot about the vertical axis and, thus, a deviation from a desired gait.

In addition, desired gaits to be generated are not always ones for straight walking with the body always kept in a vertical (upright) posture. A desired gait may involve a rotation or a forward, rearward, leftward or rightward inclination of the whole robot or the body thereof. That is, a desired gait may involve a posture rotation of the whole robot (or a posture rotation of a representative part, such as the body). Thus, in this specification, the posture rotation in the desired gait is referred to as a desired posture rotation. The phenomenon to be primarily addressed in this specification is a deviation of an actual posture rotation of the whole robot (or an actual posture rotation of a representative part, such as the body) from the desired posture rotation. Strictly speaking, this phenomenon should be referred to as a "perturbation from the desired posture rotation" or "a posture rotation perturbation". However, this phenomenon will be abbreviated as a "posture rotation" hereinafter unless there is no possibility of confusion with the "desired posture rotation".

In the following, the phenomenon of directional deviation from a desired gait due to a posture rotation of the whole robot about the vertical axis will be particularly referred to as a spin.

In addition, if the robot runs, the vertical position of the robot tends to deviate from the desired gait during a period in which all the legs float in the air (that is, a floating period).

Not to deviate from the trajectory of the desired gait thereof, that is, the desired path, the robot has to estimate the self position/posture with high precision.

In addition, if the robot has an environment recognition device, such as a video camera, mounted thereon, the self position/posture has to be estimated with high precision in order to capture a target object to be gazed, such as a landmark previously registered in map information, at a predetermined position in the image (for example, the center of the image).

In addition, in order for the environment recognition device, such as a video camera, to determine the position of a target object in a global coordinate system set in the environment (that is, a coordinate system fixed with respect to the floor in the environment in which the robot moves), the self position/posture in the global coordinate system has to be estimated with high precision.

As a method of estimating the self position/posture without using the environment recognition device, such as a video camera, an inertial navigation system used for guiding a rocket or the like has been known.

However, the inertial navigation system estimates the position of the robot by integrating the detection value of the accelerometer two times, and thus, integration errors tend to accumulate to a significant extent. Therefore, the accelerometer is required to have an extremely high detection accuracy. In addition, in order to use the inertial navigation system, the robot has to start moving from a state where it is fixed with respect to the floor (or ground) so that the initial values of the positions and velocity of the robot are 0. However, it is difficult to keep the leg type movable robot at complete rest, because the joints have to constantly move slightly to stabilize the posture of the robot even when the robot, as a whole, is at rest in an upright posture. Therefore, the inertial navigation calculation is started in a state where the initial values of the position and velocity are not 0, and thus, the estimation error tends to be significant.

As for rockets and airplanes, a global positioning system (GPS) is used which corrects the self position/posture based on the relative positional relationship between the rocket or airplane and an external device, such as a satellite or a radar or a beacon on the ground. A similar system might be used for robots, too. However, it is difficult to achieve measurement of the height of a foot (that is, the end of a leg) of the robot from the floor with a precision on the order of millimeters or centimeters at a low cost, for example.

The present invention has been devised in view of such circumstances, and an object thereof is to provide a self-position estimating device that can estimate the self-position of a robot with high precision. In particular, an object of the present invention is to provide a self-position estimating device that can estimate the self position/posture of a robot with high precision even if the robot is in a state where the movement acceleration varies greatly horizontally or vertically, in a state where all the legs float in the air, which occurs when the robot is running, for example, or in a state where a posture rotation (or a spin) of the whole robot occurs due to a rotational slipping of a foot sole with respect to the floor.

In addition, an object of the present invention is to provide a self-position estimating device that can estimate the self-position of a robot and then use the estimated self-position to achieve adequate gazing control for controlling the direction of an environment recognition device, such as a video camera, mounted on the robot in such a manner that a target object is captured at an appropriate position in an image taken by the environment recognition device.

In addition, an object of the present invention is to provide a self-position estimating device that can recognize an object, such as a landmark, precise information about which has been previously given to the device, with environment recognition means, such as a video camera, and achieve a higher precision of estimation of the self-position of the robot based on the information resulting from the recognition.

Furthermore, an object of the present invention is to provide a self-position estimating device that can recognize, using an estimated self position/posture, the position/posture or geometry of a floor surface or an obstacle with high precision using environment recognition means, such as a video camera.

DISCLOSURE OF THE INVENTION

In order to attain the objects described above, in a leg type movable robot that is controlled to follow a determined desired gait, a self-position estimating device for a leg type movable robot according to a first implementation of the present invention comprises: posture rotational deviation calculating means for determining a temporal variation of posture rotational deviation, which is the difference between a detected or estimated value of an actual posture of a predetermined part of the robot and a desired posture of the predetermined part in the desired gait, as a posture rotational deviation's variation; rotation center determining means for determining the rotation center of the variation of the posture rotational deviation; and position estimating means for determining an estimated position of the robot, that is, an estimated value of the position of the robot, on the assumption that the robot rotates about the rotation center by the posture rotational deviation's variation.

According to the first implementation, it is assumed that the variation of the posture rotational deviation, which the difference between the detected or estimated value of the actual posture of the predetermined part of the robot and the desired posture of the predetermined part in the desired gait, is equivalent to a rotation of the whole robot about a certain rotation center at the posture rotational deviation's variation. In actual, for example, a rotational slipping (a spin) occurring between a foot (an end portion of a leg) of the robot and a floor appears as a variation of the posture rotational deviation. According to the present invention, since the estimated position of the robot is determined on the assumption described above, it is possible to quantitatively keep track of an actual variation of the position of the robot due to the rotational slipping or the like and determine the estimated position, which is the estimated value of the actual position of the robot. As a result, the robot can estimate the self-position with high precision.

Here, the detected or estimated value of the actual posture of the predetermined part can be obtained using a sensor, such as an inclination sensor or a gyro sensor. However, the detected or estimated value may be appropriately corrected accessorily using the estimated position of the robot, an acceleration value detected by an accelerometer or the like, according to the invention. In principle, the detected or estimated value of the actual posture of the predetermined part may be of any kind, regardless of the means for acquiring it, as far as the value represents the actual posture of the predetermined part with relatively high precision. This holds true for the implementations other than the first implementation.

More specifically, in the first implementation, it is preferable that the position estimating means comprises means for determining a second coordinate system, which is obtained by rotating a first coordinate system that describes the desired gait about the rotation center by the posture rotational deviation's variation, and the position estimating means determines the estimated position of the robot seen from a global coordinate system in such a manner that the robot position seen from the first coordinate system, which is recognized from at least any of a desired movement with the desired gait, a displacement detection value of a joint of the robot and a desired displacement value of the joint, agrees with the estimated position of the robot seen from the second coordinate system (second implementation). Here, the global coordinate system is a coordinate system that is fixed to the floor (ground) in the environment in which the robot moves.

According to the second implementation, the estimated position of the robot seen from the global coordinate is determined in such a manner that the position of the robot seen from the first coordinate system, that is, the position of the robot recognized from at least any of the desired gait, the joint displacement detection value and the joint displacement desired value on the assumption that the robot moves, without a rotational slipping or the like, following the desired movement with the desired gait, the joint displacement detection value or the joint displacement desired value, agrees with the estimated position of the robot seen from the second coordinate system, which is obtained by rotating the first coordinate system about the rotation center by the posture rotational deviation's variation (that is, the coordinate components of the position in one coordinate system agree with the respective ones in the other coordinate system). As a result, the estimated position of the robot which adequately reflects the variation of the posture rotational deviation can be determined with high precision. Incidentally, the first coordinate system may be a coordinate system determined in the vicinity of the contact surface of the foot of the leg landing via a landing operation of the robot each time the robot lands on the floor (that is, a supporting leg coordinate system described later with reference to embodiments of the present invention), for example, or may be the same as the global coordinate system.

In the first or second implementation, the predetermined part is preferably a body (that is, a base body from which the legs extend) of the robot (third implementation). This is because the influence of the rotational slipping or the like of the robot is likely to appear as a variation of the posture of the body of the robot.

In the first to third implementations, it is preferable that the posture rotational deviation includes at least a posture rotational deviation component of the predetermined part in a yaw direction (fourth implementation). This is because the position of the robot is sensitive to the variation of the posture rotational deviation in the yaw direction.

In the first to fourth implementations, it is preferable that, when the desired gait of the robot is a gait including a floating period in which all the legs of the robot float in the air, such as a running gait, the rotation center determining means sets the rotation center at the center of gravity of the robot during the floating period and sets the rotation center at an actual floor reaction force central point, a desired ZMP of the desired gait or a point in the vicinity of the points during a period other than the floating period (fifth implementation). That is, during the floating period the variation of the posture rotational deviation is a rotation generally about the center of gravity of the robot. In a period other than the floating period, that is, in a period during which any of the legs is in contact with the floor, the rotation center of variation of the posture rotational deviation generally lies in the vicinity of the actual floor reaction force central point (that is, the central point of the total floor reaction force actually applied to the robot) or the desired ZMP. Therefore, the rotation center determined as described above is adequately adapted to the actual situation, and thus, the precision of the estimated position of the robot can be adequately assured.

If the desired gait is a gait that includes no floating period (in which any of the legs is always in contact with the floor), such as a walking gait of the robot, the rotation center may be set at the actual floor reaction force central point or the desired ZMP or in the vicinity thereof, for example.

In one of the first to fifth implementations, the posture rotational deviation calculating means is means for successively determining the posture rotational deviation's variation at each instant, and the position estimating means successively determines the estimated position of the robot at each instant using the posture rotational deviation's variation at each instant (sixth implementation). According to this implementation, since the estimated position at each instant is successively determined, the self-position of the robot can be recognized substantially continuously. In the sixth implementation, the posture rotational deviation's variation is the variation rate of posture rotational deviation.

Alternatively, according to another implementation, the posture rotational deviation calculating means is means for determining a posture rotational deviation's variation between landings, which is a posture rotational deviation's variation for a period from the last-time leg landing of a leg to the current-time leg landing, each time a leg of the robot lands on a floor via a landing operation of the robot, and the position estimating means determines the estimated position of the robot at each landing using the posture rotational deviation's variation between landings (seventh implementation).

According to this implementation, since the estimated position of the robot is determined each time the robot lands on the floor when the stability of the position of the robot is high, the reliability of the estimated position can be increased.

In the first to seventh implementations, it is preferable that the position of the robot estimated by the position estimating means is a contact position of the leg, which comes into contact with the floor in the landing operation of the robot (eighth implementation). The contact position of the leg of the robot is unlikely to show a minor variation compared with other parts of the robot, such as the body, and thus, is highly stable. Thus, by choosing the contact position as the estimated position of the robot, the estimated position can be determined with high reliability.

Furthermore, in the first to eighth implementations, it is preferable that the self-position estimating device further comprises floor reaction force detecting means for detecting a floor reaction force applied to the robot, and the position estimating means estimates a deformation of the robot based on the detected floor reaction force and determines the estimated position of the robot using at least the estimated deformation (ninth implementation). According to this implementation, since the estimated position of the robot is determined taking into consideration the deformation of the foot or the like of the robot due to the floor reaction force applied to the robot, the precision of the estimated position can be increased.

In a leg type movable robot that is controlled to follow a determined desired gait, a self-position estimating device for a leg type movable robot according to a tenth implementation of the present invention comprises: an accelerometer for detecting a translational acceleration that is mounted on the robot; an angular velocity sensor for detecting an angular velocity in an inertial space that is mounted on the robot; geometrical position estimating means for determining a first estimated position, which is a geometrically estimated value of the vertical position of a predetermined part of the robot or the center of gravity of the robot, based on at least any of a desired movement with the desired gait, a displacement detection value of a joint of the robot and a desired displacement value of the joint; and inertial-navigation-like position estimating means for determining a second estimated position, which is an inertial-navigation-like estimated value of the vertical position of the predetermined part or the total center of gravity of the robot, by an inertial navigation method based on at least a detection value of the accelerometer and a detection value of the angular velocity sensor and correcting the second estimated position based on at least the difference between the first estimated position and the second estimated position.

According to the tenth implementation, the first estimated position, which is a geometrically estimated value of the vertical position (that is, the vertical position determined through a kinematics calculation or the like) of a predetermined part of the robot or the center of gravity of the robot, is determined based on at least a desired movement with the desired gait, a displacement detection value of a joint of the robot and a desired displacement value of the joint. Furthermore, the second estimated position, which is an inertial-navigation-like estimated value of the vertical position of the predetermined part or the total center of gravity of the robot, is determined by an inertial navigation method based on at least a detection value of the accelerometer and a detection value of the angular velocity sensor. Then, the second estimated position is corrected based on the difference between the first estimated position and the second estimated position. That is, the second estimated position determined based on the inertial navigation method is corrected using the first estimated position determined based on a geometrical method different from the inertial navigation method. According to this implementation, the precision of the second estimated position can be increased while preventing a drift (that is, an accumulation of integration errors) which tends to occur in the second estimated position. That is, the precision of estimation of the vertical position of the predetermined part or the total center of gravity can be increased.

In the tenth implementation, as in the third implementation, the predetermined part is preferably the body of the robot (eleventh implementation).

In the tenth or eleventh implementation, it is preferable that the self-position estimating device further comprises floor reaction force detecting means for detecting a floor reaction force applied to the robot, and the geometrical position estimating means estimates a deformation of the robot based on the detected floor reaction force and determines the first estimated position using the estimated deformation (twelfth implementation). According to this implementation, since the first estimated position is determined taking into consideration the deformation of the foot of the robot due to the floor reaction force as in the ninth implementation, the precision of the first estimated position can be increased. As a result, the second estimated position can be corrected more adequately, and the precision of the second estimated position can be increased.

In the tenth to twelfth implementations, it is preferable the inertial-navigation-like position estimating means corrects the second estimated position in such a manner that the difference between the first estimated position and the second estimated position is brought close to 0 (thirteenth implementation). In this case, the second estimated position can be corrected adequately so that the precision of the second estimated position is increased (in other words, so that the error thereof decreases).

Furthermore, in the tenth to thirteenth implementations, it is preferable that, when the desired gait of the robot is a gait including a floating period in which all the legs of the robot float in the air, the inertial-navigation-like position estimating means sets the correction amount of the second estimated position at substantially 0 in the floating period (fourteenth implementation). During the floating period, the robot is not in contact with the floor, so that the precision of the first estimated position, which is the geometrically estimated vertical position of the predetermined part or total center of gravity of the robot, tends to decrease. Thus, in the fourteenth implementation, the correction amount of the second estimated position is set at 0 in the floating period. In this way, the second estimated position can be prevented from being corrected inadequately using the first estimated position of low reliability in the floating period, and the precision of the second estimated position can be assured for a long term.

In a leg type movable robot that is controlled to follow a determined desired gait, a self-position estimating device for a leg type movable robot according to a fifteenth implementation of the present invention comprises: an accelerometer for detecting a translational acceleration that is mounted on the robot; posture rotational deviation calculating means for determining a temporal variation of posture rotational deviation, which is the difference between a detected or estimated value of an actual posture of a predetermined part of the robot and a desired posture of the predetermined part in the desired gait, as a posture rotational deviation's variation; rotation center determining means for determining the rotation center of the variation of the posture rotational deviation; geometrical position estimating means for determining a first estimated position, which is an estimated value of the position of the predetermined part or the total center of gravity of the robot, on the assumption that the robot rotates about the rotation center by the posture rotational deviation's variation; and inertial-navigation-like position estimating means for calculating a second estimated position, which is an estimated value of the position of the predetermined part or the total center of gravity of the robot, by an inertial navigation method based on at least a detection value of the accelerometer and a detected or estimated value of an actual posture of the predetermined part, and correcting the second estimated position based on at least the difference between the first estimated position and the second estimated position.

According to the fifteenth implementation, the first estimated position, which is the estimated value of the position of the predetermined part or total center of gravity of the robot is determined in the manner described above concerning the first implementation. More specifically, preferably, the contact position of the leg having come into contact with the floor in the landing operation of the robot is determined in the manner described above concerning the eighth implementation, and then, the first estimated position is determined with respect to the contact position based on at least any of a desired movement with the desired gait, a displacement detection value of a joint of the robot and a desired displacement value of the joint. According to the fifteenth implementation, a second estimated position, which is an estimated value of the position of the predetermined part or the total center of gravity, is calculated by an inertial navigation method based on at least a detection value of the accelerometer and a detected or estimated value of an actual posture of the predetermined part, and the second estimated position is corrected based on the difference between the first estimated position and the second estimated position. That is, the second estimated position determined based on the inertial navigation method is corrected using the first estimated position determined geometrically taking into consideration a positional variation of the robot due to a rotational slipping or the like of the robot. According to this implementation, the precision of the second estimated position can be increased while preventing a drift (that is, an accumulation of integration errors) which tends to occur in the second estimated position. That is, the precision of estimation of the position of the predetermined part or the total center of gravity can be increased.

More specifically, in the fifteenth implementation, it is preferable that the geometrical position estimating means comprises means for determining a second coordinate system, which is obtained by rotating a first coordinate system that describes the desired gait about the rotation center by the posture rotational deviation's variation, and the geometrical position estimating means determines the first estimated position of the predetermined part or the total center of gravity seen from a global coordinate system in such a manner that the position of the predetermined part or the total center of gravity seen from the first coordinate system, which is recognized from at least any of a desired movement with the desired gait, a displacement detection value of a joint of the robot and a desired displacement value of the joint, agrees with the first estimated position of the predetermined part or the total center of gravity seen from the second coordinate system (sixteenth implementation). Thus, in determining the first estimated position, the same advantage as in the second implementation can be provided.

In the fifteenth or sixteenth implementation, as in the third implementation, the predetermined part is preferably the body of the robot (seventeenth implementation).

In the fifteenth to seventeenth implementations, as in the fourth implementation, it is preferable that the posture rotational deviation includes at least a posture rotational deviation component of the predetermined part in a yaw direction (eighteenth implementation).

In the fifteenth to eighteenth implementations, it is preferable that the self-position estimating device further comprises floor reaction force detecting means for detecting a floor reaction force applied to the robot, and the geometrical position estimating means estimates a deformation of the robot based on the detected floor reaction force and determines the first estimated position using the estimated deformation (nineteenth implementation). According to this implementation, since the first estimated position is determined taking into consideration the deformation of the foot of the robot due to the floor reaction force as in the ninth implementation, the precision of the first estimated position can be increased. As a result, the second estimated position can be corrected more adequately, and the precision of the second estimated position can be increased.

In the fifteenth to nineteenth implementations, it is preferable that, when the desired gait of the robot is a gait including a floating period in which all the legs of the robot float in the air, the rotation center determining means sets the rotation center at the center of gravity of the robot during the floating period and sets the rotation center at an actual floor reaction force central point, a desired ZMP of the desired gait or a point in the vicinity of the points during a period other than the floating period (twentieth implementation). According to this implementation, as in the fifth implementation, the rotation center determined can be adequately adapted to the actual situation, and thus, the precision of the first estimated position can be adequately assured.

In the fifteenth to twentieth implementations, it is preferable the inertial-navigation-like position estimating means corrects the second estimated position in such a manner that the difference between the first estimated position and the second estimated position is brought close to 0 (twenty-first implementation). In this case, as in the thirteenth implementation, the second estimated position can be corrected adequately so that the precision of the second estimated position is increased (in other words, so that the error thereof decreases).

Furthermore, in the fifteenth to twenty-first implementations, it is preferable that the desired gait of the robot is a gait including a floating period in which all the legs of the robot float in the air, and the inertial-navigation-like position estimating means sets the correction amount of the second estimated position at substantially 0 in the floating period (twenty-second implementation).

According to this implementation, as in the fourteenth implementation, since the correction amount of the second estimated position is set at 0 in the floating period, the second estimated position can be prevented from being corrected inadequately using the first estimated position of low reliability in the floating period, and the precision of the second estimated position can be assured for a long term.

In a leg type movable robot that is controlled to follow a predetermined desired gait, a self-position estimating device for a leg type movable robot according to a twenty-third implementation of the present invention is characterized in that the self-position estimating device comprises: floor reaction force detecting means for detecting a floor reaction force applied to the robot; posture rotational deviation calculating means for determining a temporal variation of posture rotational deviation, which is the difference between a detected or estimated value of an actual posture of a predetermined part of the robot and a posture of the predetermined part in the desired gait, as a posture rotational deviation's variation; rotation center determining means for determining the rotation center of the variation of the posture rotational deviation; geometrical position estimating means for determining a first estimated position, which is an estimated position of the predetermined part or the total center of gravity of the robot, on the assumption that the robot rotates about the rotation center by the posture rotational deviation's variation; and dynamical position estimating means for calculating a second estimated position, which is an estimated position of the predetermined part or the total center of gravity of the robot, through a dynamical calculation based on at least a detection value of the floor reaction force detecting means and a detected or estimated value of the actual posture and correcting the second estimated position based on at least the difference between the first estimated position and the second estimated position.

According to the twenty-third implementation, the first estimated position is determined in the same manner as in the fifteenth implementation. On the other hand, the second estimated position, which is an estimated position of the predetermined part or the total center of gravity of the robot, is calculated through a dynamical calculation based on at least a detection value of the floor reaction force detecting means and a detected or estimated value of an actual posture of the predetermined part, and the second estimated position is corrected based on the difference between the first estimated position and the second estimated position. Here, the value obtained by dividing the floor reaction force by the total mass of the robot, subtracting the gravitational acceleration from the quotient, and inverting the sign of the difference corresponds to the detection value of the accelerometer. As a result, the second estimated position is determined and corrected in the same manner as in the fifteenth implementation. Therefore, according to the twenty-third implementation, as in the fifteenth implementation, the precision of the second estimated position can be increased while preventing a drift (that is, an accumulation of integration errors) which tends to occur in the second estimated position. That is, the precision of estimation of the position of the predetermined part or the total center of gravity can be increased.

More specifically, in the twenty-third implementation, it is preferable that the geometrical position estimating means comprises means for determining a second coordinate system, which is obtained by rotating a first coordinate system that describes the desired gait about the rotation center by the posture rotational deviation's variation, and the geometrical position estimating means determines the first estimated position of the predetermined part or the total center of gravity seen from a global coordinate system in such a manner that the position of the predetermined part or the total center of gravity seen from the first coordinate system, which is recognized from at least any of a desired movement with the desired gait, a displacement detection value of a joint of the robot and a desired displacement value of the joint, agrees with the first estimated position of the predetermined part or the total center of gravity seen from the second coordinate system (twenty-fourth implementation). Thus, in determining the first estimated position, the same advantage as in the second implementation can be provided.

In the twenty-third or twenty-fourth implementation, as in the third implementation, the predetermined part is preferably the body of the robot (twenty-fifth implementation).

In the twenty-third to twenty-fifth implementations, as in the fourth implementation, it is preferable that the posture rotational deviation includes at least a posture rotational deviation component of the predetermined part in a yaw direction (twenty-sixth implementation).

Furthermore, in the twenty-third to twenty-sixth implementations, it is preferable that the geometrical position estimating means estimates a deformation of the robot based on the detected floor reaction force and determines the first estimated position using the estimated deformation (twenty-seventh implementation). According to this implementation, since the first estimated position is determined taking into consideration the deformation of the robot due to the floor reaction force as in the ninth implementation, the precision of the first estimated position can be increased. As a result, the second estimated position can be corrected more adequately, and the precision of the second estimated position can be increased.

In the twenty-third to twenty-seventh implementations, it is preferable that, when the desired gait of the robot is a gait including a floating period in which all the legs of the robot float in the air, the rotation center determining means sets the rotation center at the center of gravity of the robot during the floating period and sets the rotation center at an actual floor reaction force central point, a desired ZMP of the desired gait or a point in the vicinity of the points during a period other than the floating period (twenty-eighth implementation). According to this implementation, as in the fifth implementation, the rotation center determined can be adequately adapted to the actual situation, and thus, the precision of the first estimated position can be adequately assured.

In the twenty-third to twenty-eighth implementations, it is preferable the dynamical position estimating means corrects the second estimated position in such a manner that the difference between the first estimated position and the second estimated position is brought close to 0 (twenty-ninth implementation). In this case, as in the thirteenth implementation, the second estimated position can be corrected adequately so that the precision of the second estimated position is increased (in other words, so that the error thereof decreases).

Furthermore, in the twenty-third to twenty-ninth implementations, it is preferable that, when the desired gait of the robot is a gait including a floating period in which all the legs of the robot float in the air, the dynamical position estimating means sets the correction amount of the second estimated position at substantially 0 in the floating period (thirtieth implementation).

According to this implementation, as in the fourteenth implementation, since the correction amount of the second estimated position is set at 0 in the floating period, the second estimated position can be prevented from being corrected inadequately using the first estimated position of low reliability in the floating period, and the precision of the second estimated position can be assured for a long term.

Furthermore, in the first to ninth implementations described above, it is preferable that at least any of the detected or estimated value of the actual posture of the predetermined part and the estimated position of the robot is corrected based on at least information about the position of a target object, such as a floor surface or an obstacle, on a map stored previously and information about the relative position of the robot with respect to the target object, which is recognized with environment recognition means, such as an image pickup device, mounted on the robot (thirty-first implementation).

Similarly, in the tenth to fourteenth implementations described above, it is preferable that the self-position estimating device further comprises means for correcting at least one of the first estimated position and the second estimated position based on at least information about the position of a target object, such as a floor surface or an obstacle, on a map stored previously and information about the relative position of the robot with respect to the target object, which is recognized with environment recognition means, such as an image pickup device, mounted on the robot (thirty-second implementation).

Similarly, in the fifteenth to twenty-ninth implementations described above, it is preferable that the self-position estimating device further comprises means for correcting at least one of the first estimated position, the second estimated position and the detected or estimated value of the actual posture of the predetermined part based on at least information about the position of a target object, such as a floor surface or an obstacle, on a map stored previously and information about the relative position of the robot with respect to the target object, which is recognized with environment recognition means, such as an image pickup device, mounted on the robot (thirty-third implementation).

According to the thirty-first to thirty-third implementations, a target object, such as a landmark, whose positional information is precisely provided on a map, is recognized with environment recognition means, and the estimated position (the first or second estimated position in the tenth to thirtieth implementations) or the detected or estimated value of the actual posture of the predetermined part which is required to determine the estimated position (in the cases of the first to ninth implementations or the fifteenth to thirtieth implementations) is corrected based on the information about the relative position between the target object and the robot. Thus, the precision of the estimated position (the second estimated position in the tenth to thirtieth implementations) can be increased.

Furthermore, in the first to ninth implementations, it is preferable that the self-position estimating device further comprises means for estimating the position of a target object based on at least the position of the robot estimated by the position estimating means and information about the relative position of the robot with respect to the target object, which is recognized with environment recognition means, such as an image pickup device, mounted on the robot (thirty-fourth implementation).

Similarly, in the tenth to thirtieth implementations described above, it is preferable that the self-position estimating device further comprises means for estimating the position of a target object based on at least the second estimated position and information about the relative position of the robot with respect to the target object, which is recognized with environment recognition means, such as an image pickup device, mounted on the robot (thirty-fifth implementation).

According to the thirty-fourth and thirty-fifth implementations, the position of the target object can be estimated with high precision by using the estimated position which is the self-position of the robot determined as described above (the second estimated position in the tenth to thirtieth implementations).

Furthermore, in the first to ninth implementations, it is preferable that the self-position estimating device further comprises means for determining the direction of gazing of environment recognition means, such as an image pickup device, mounted on the robot based on at least the estimated position of the robot and the position of a target object, such as a floor surface or an obstacle, on a map stored previously (thirty-sixth implementation).

Similarly, in the tenth to thirtieth implementations, it is preferable that the self-position estimating device further comprises means for determining the direction of gazing of environment recognition means, such as an image pickup device, mounted on the robot based on at least the second estimated position and the position of a target object, such as a floor surface or an obstacle, on a map stored previously (thirty-seventh implementation).

According to the thirty-sixth and thirty-seventh implementations, since the estimated position which is the self-position of the robot determined as described above (the second estimated position in the tenth to thirtieth implementations) is used, the positional relationship between the target object and the robot can be recognized with high precision. As a result, the environment recognition means can be precisely controlled and directed toward an intended gazing direction (for example, a direction in which the target object is captured at a predetermined position in (for example, at the center of) the image taken by the image pickup device of the environment recognition means).

BRIEF DESCRIPTION OF THE DRAWINGS

FIGS. 18(a) and 18(b) is diagrams for illustrating the self position/posture estimating process according to the fourth embodiment.

FIG. 20 is a flowchart showing a self position/posture estimating process according to a fifth embodiment.

FIG. 25 is a flowchart showing a self position/posture estimating process according to the seventh embodiment.

BEST MODE FOR CARRYING OUT THE INVENTION

In the following, embodiments of a self-position estimating device for a leg type movable robot according to the present invention will be described with reference to the drawings. In the description, a two-legged movable robot is taken as an example of the leg type movable robot.

Figure 1:
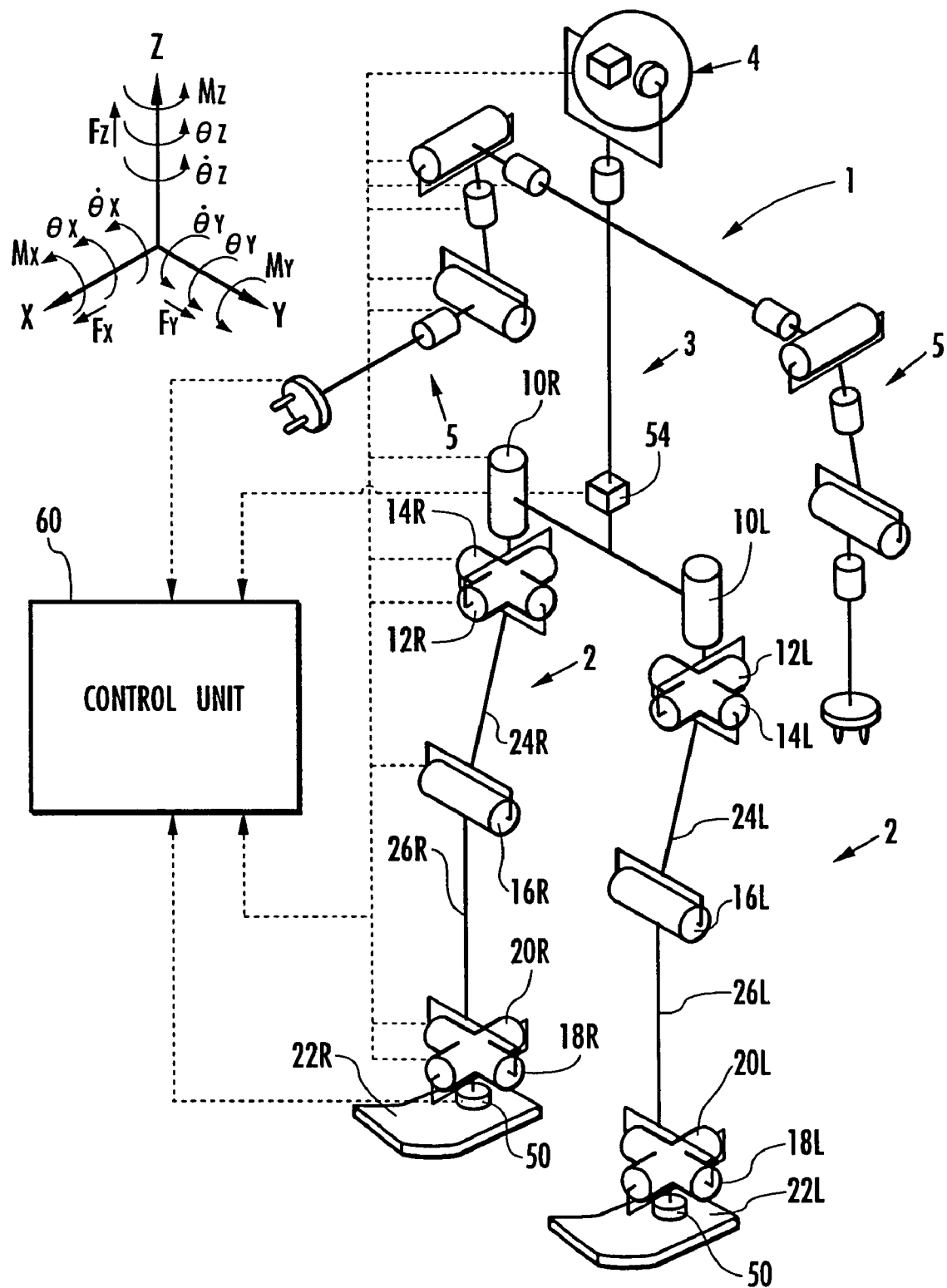
FIG. 1 is a schematic diagram showing a whole arrangement of a two-legged movable robot, which is a leg type movable robot according to an embodiment of the present invention.

FIG. 1 is a schematic diagram showing the whole of a two-legged movable robot, which is a leg type movable robot according to an embodiment of the present invention.

As shown in the drawing, a two-legged movable robot (referred to as a robot, hereinafter) 1 comprises a pair of left and right legs (leg links) 2, 2 extending downward from a body 3 (that is, a base body of the robot 1). The legs 2, 2 have the same construction and each have six joints. In the order of increasing distance from the body 3, the six joints include a hip (waist) joint 10R (10L) for convolution (rotation) (rotation in the yaw direction with respect to the body 3), a hip (waist) joint 12R (12L) for rotation in the roll direction (about the X axis), a hip (waist) joint 14R (14L) for rotation in the pitch direction (about the Y axis), a knee joint 16R (16L) for rotation in the pitch direction, an ankle joint 18R (18L) for rotation in the pitch direction, and an ankle joint 20R (20L) for rotation in the roll direction. Reference symbols R and L represent the right leg and the left leg, respectively.

Under the two ankle joints 18R(L) and 20R(L) of each leg 2, a foot (foot portion) 22R(L) which constitutes the end portion of the leg 2 is attached. The body 3 is mounted on the top of the two legs 2, 2 via the hip joints 10R, 10L, 12R, 12L, 14R and 14L. The body 3 houses a control unit 60 and the like, which will be described in detail later. In FIG. 1, for the convenience of illustration, the control unit 60 is shown as being external to the body 3.

In each leg 2 configured as described above, the hip joint (or waist joint) is composed of the joints 10R(L), 12R(L) and 14R(L), and the knee joint is composed of the joint 16R(L), and the ankle joint is composed of the joints 18R(L) and 20R(L). The hip joint and the knee joint are connected to each other by a thigh link 24R(L), and the knee joint and the ankle joint are connected to each other by a crus link 26R(L).

In addition, the body 3 has a pair of left and right arms 5, 5 each attached to the upper part of either side thereof, and a head 4 is mounted on the top of the body 3. The arms 5, 5 and the head 4 will not be described in detail, because they are not directly related to the essence of the present invention.

The configuration described above allows the foot 22R(L) of each leg 2 to have six degrees of freedom with respect to the body 3. During movement, such as walking, of the robot 1, desired movements of the feet 22R and 22L can be achieved by driving the twelve joints of the two legs 2, 2 (6*2=12) to appropriate angles (in this specification, the symbol "*" represents multiplication of scalar quantities or outer product of vector quantities). Thus, the robot 1 can move arbitrarily in a three-dimensional space.

As shown in FIG. 1, each leg 2 has a well-known six-axis force sensor 50 disposed below the ankle joints 18R(L) and 20R(L) and between the ankle joints and the foot 22R(L). The six-axis force sensor 50 detects the presence of landing of the foot 22R (22L) of the leg 2, the floor reaction force (floor-contact load) applied to the leg 2, and the like. The six axis force sensor 50 outputs, to the control unit 60, detection signals indicating three directional components Fx, Fy and Fz of the translation force of the floor reaction force and three directional components Mx, My and Mz of the moment thereof. In addition, the body 3 has an inclination sensor 54 for detecting the inclination (posture angle) of the body 3 with respect to the Z axis (that is, the vertical direction (direction of gravity)) and the angular velocity thereof, and the inclination sensor 54 outputs the detection signals to the control unit 60. The inclination sensor 54 has a three-axis-directional accelerometer and a three-axis-directional gyro sensor (both not shown). The detection signals of the sensors are used to determine the inclination and angular velocity of the body 3 and to estimate the self position/posture of the robot 1. In addition, although not shown in detail, each joint in the robot 1 has an electric motor 64 for driving it (see FIG. 5) and an encoder (rotary encoder) 65 (see FIG. 5) for detecting the rotation amount of the electric motor 64 (rotation angle of the joint), and the encoder 65 outputs the detection signal to the control unit 60.

Furthermore, although not shown in FIG. 1, a joystick (manipulator) 73 (see FIG. 5) for manipulating the robot 1 is provided at an appropriate position on the robot 1. By manipulating the joystick 73, a request concerning the gait of the robot 1, such as a request to turn the robot 1 moving straight ahead, can be entered to the control unit 60 as required.

Figure 2:
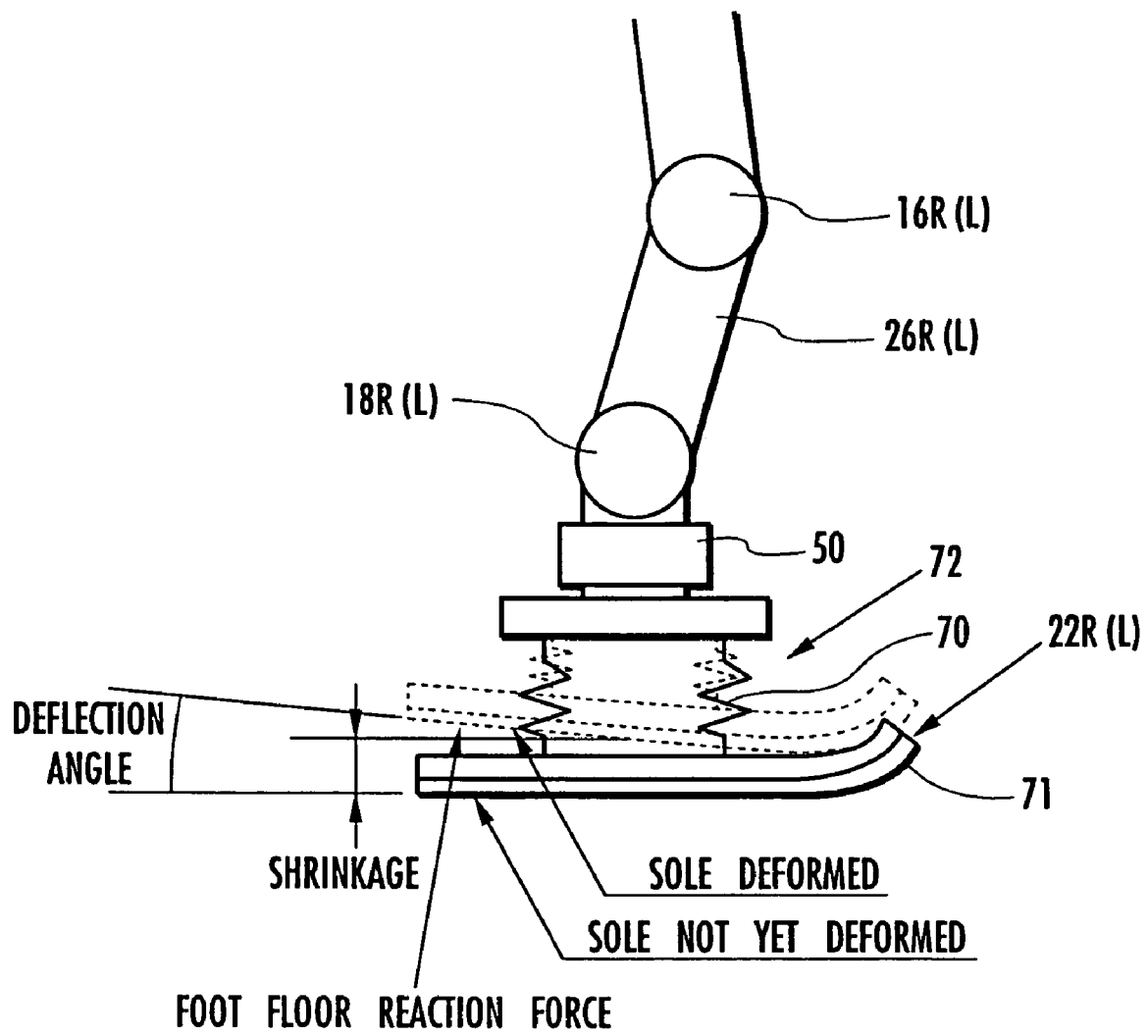
FIG. 2 is a schematic view of an arrangement of a foot portion of each leg shown in FIG. 1.

FIG. 2 is a schematic diagram showing a basic arrangement of the end portion of the leg 2 (including the foot 22R (22L)) according to this embodiment. As shown in this drawing, a spring mechanism 70 is provided above each foot 22R (22L) and between the foot 22R (22L) and the six-axis force sensor 50, and a foot sole elastic member 71 made of a rubber or the like is attached to the foot sole (that is, the bottom surface of each foot 22R (22L)). The spring mechanism 70 and the foot sole elastic member 71 constitute a compliance mechanism 72. Although described in detail later, the spring mechanism 70 comprises a rectangular guide member (not shown in FIG. 2) mounted on the upper surface of the foot 22R(L) and a piston member (not shown in FIG. 2) mounted closer to the ankle joint 18R(L) (the ankle joint 20R(L) is not shown in FIG. 2) and the six-axis force sensor 50 and housed in the guide member in such a manner that the piston member can slightly move in the guide member by the action of an elastic member (such as rubber or a spring).

The foot 22R(L) shown by the solid line in FIG. 2 is in a state where no floor reaction force is applied to the foot. When a floor reaction force is applied to the leg 2, the spring mechanism 70 and the foot sole elastic member 71 of the compliance mechanism 72 are distorted, thereby shifting the foot 22R(L) to a position/posture as indicated by the dotted line in FIG. 2. The structure of the compliance mechanism 72 is important not only for reducing the landing impact but also for enhancing the controllability, as described in detail in Japanese Patent Laid-Open No. 5-305584 previously proposed by the applicant, for example.

Figure 3:
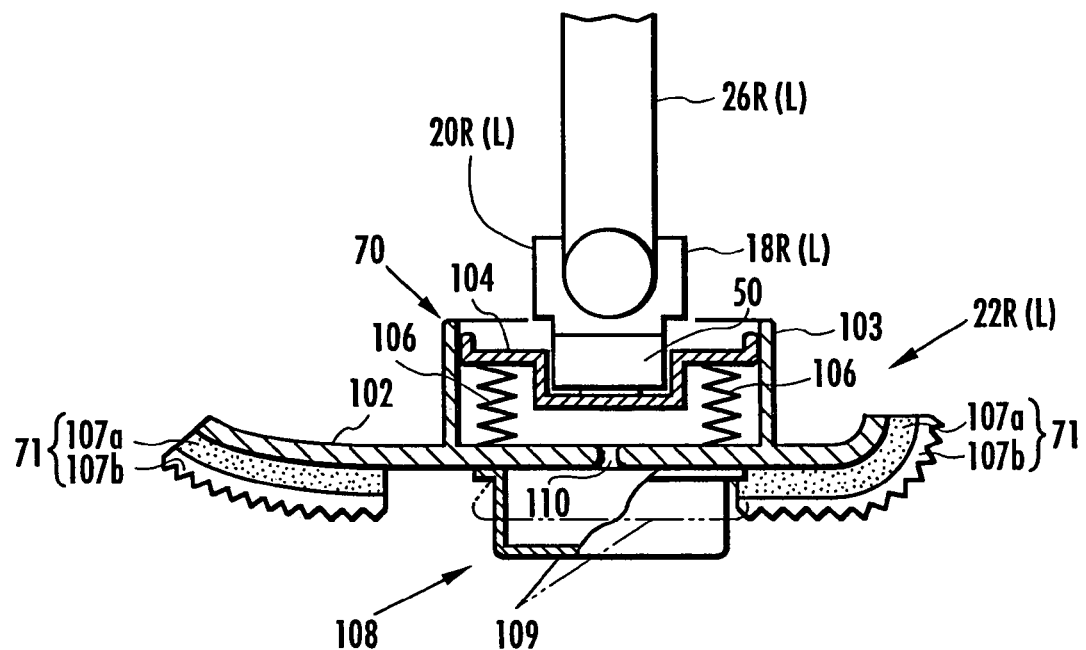
FIG. 3 is a detailed cross sectional view of the foot portion of each leg viewed from the side thereof.
Figure 4:
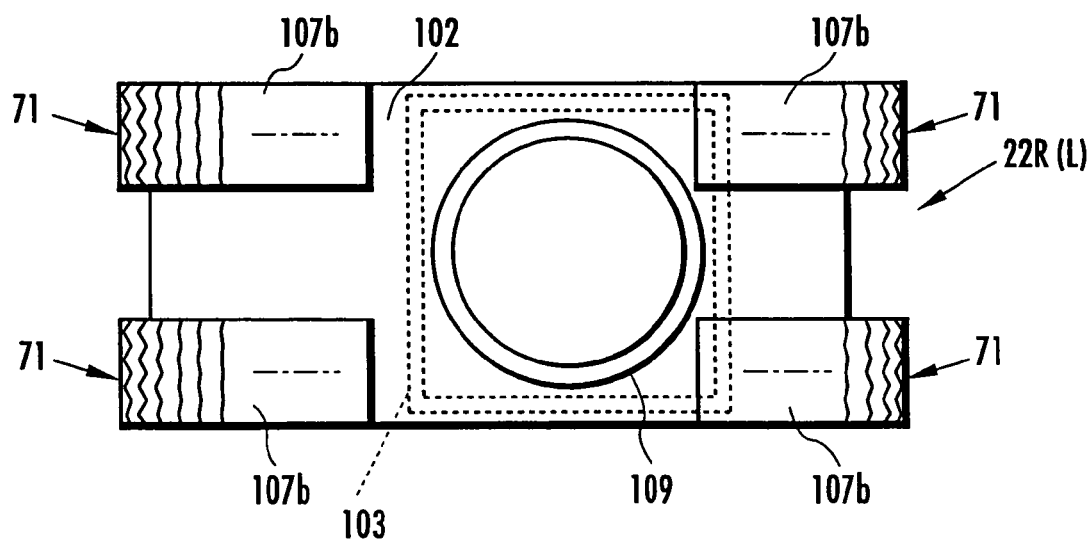
FIG. 4 is a detailed bottom view of the foot portion of each leg.

The structure of the foot 22R(L) including the compliance mechanism 72 (sometimes referred to as a foot mechanism 22R(L) hereinafter) will be described in detail with reference to FIGS. 3 and 4. FIG. 3 is a cross sectional view of the foot mechanism 22R(L) viewed from the side thereof, and FIG. 4 is a bottom view of the foot mechanism 22R(L).

The foot mechanism 22R(L) has a substantially planar foot plate member 102 as a framework member. The foot plate member 102 has a front end portion (that is, a toe portion) and a rear end portion (that is, a heel portion) slightly curved upward, and the remaining portion thereof is planar. In addition, a guide member 103 which is rectangular in cross section and has an axis aligned with the vertical direction is fixed to the upper surface of the foot plate member 102. In the guide member 103, a movable plate (piston member) 104 is provided in such a manner it can move substantially vertically along the inner surface of the guide member 103. The movable plate 104 is connected to the ankle joints 18R(L) and 20R(L) via the six-axis force sensor 50.

The movable plate 104 is connected, at the perimeter of the bottom surface, to the upper surface of the foot plate member 102 via a plurality of elastic members 106 made of an elastic material, such as rubber (springs are shown in the drawing). Thus, the foot plate member 102 is connected to the ankle joint 18R(L) via the elastic members 106, the movable plate 104 and the six-axis force sensor 50. The interior of the guide member 103 (that is, the space below the movable plate 104) is opened to the atmosphere via an opening or clearance (not shown), so that the atmospheric air can flow in or out of the interior of the guide member 103. The guide member 103, the movable plate 104 and the elastic members 106 are components of the spring mechanism 70 described above with reference to FIG. 2.

To the bottom surface (lower surface) of the foot plate member 102, a floor contact member 71, which serves as the foot sole elastic member 71 described above with reference to FIG. 2, is attached. The floor contact member 71 is an elastic member which is interposed between the foot plate member 102 and the floor (that is, an elastic member which is in direct contact with the floor surface) when the foot mechanism 22R(L) is in contact with the floor. In this embodiment, four floor contact members 71 are attached to four corners of the foot plate member 102 (that is, the both sides of the toe portion of the foot plate member 102 and the both sides of the heel portion of the same).

In this embodiment, the floor contact member 71 has a two-layer structure including a soft layer 107*a* made of a relatively soft rubber and a hard layer 107*b* made of a relatively hard rubber stacked one another, in which the hard layer 107*b* is disposed at the bottom so as to serve as a floor contact part which comes into direct contact with the floor when the leg 2 lands on the floor.

In addition, the foot mechanism 22R(L) has a landing impact reducing device 108. The landing impact reducing device 108 comprises a bag member 109 attached to the bottom surface of the foot plate member 102 and a flow path 110 for the air (atmospheric air) serving as a compressible fluid to flow in and out of the interior of the bag member 109.

The bag member 109 is provided approximately at the center of the bottom surface of the foot plate member 102 so that it is surrounded by the floor contact members 71 described above. The bag member 109 is made of an elastic material, such as rubber, so that it can be deformed. When it is in a natural state, that is, when it is not deformed by an external force, the bag member 109 has a shape of a cylindrical container with the opening at the top as shown by the solid line in FIG. 3. The open end of the bag member 109 is attached to the bottom surface of the foot plate member 102 along the entire perimeter, and thus, is closed by the foot plate member 102. Furthermore, in the natural state in which it has a cylindrical-container shape, the bottom of the bag member 109 protrudes downward beyond the floor contact members 71. That is, the height of the bag member 109 (that is, the distance from the bottom surface of the foot plate member 102 to the bottom of the bag member 109) is larger than the thickness of the floor contact members 71. Therefore, in a state where the foot plate member 102 is in contact with the floor via the floor contact member 71 (that is, in a floor contact state of the leg 2), the bag member 109 is compressed in the height direction by the floor reaction force as shown by the phantom line in FIG. 3.

In this embodiment, the natural state of the bag member 109 in which it has a cylindrical-container shape is an expanded state thereof. Since the bag member 109 is made of an elastic material, the bag member 109 has a shape-restoring force to restore itself to the shape in the natural state (that is, the cylindrical-container shape) when it is compressed.

The flow path 110 constitutes inlet/outlet means for the air to flow into and out of the bag member 109. In this embodiment, the flow path 110 is a flow opening formed in the foot plate member 102 to communicate the interior of the bag member 109 and the interior of the guide member 103 described above. In this case, since the interior of the guide member 103 is opened to the atmosphere as described above, the flow path 110 serves to communicate the interior of the bag member 109 to the atmosphere. Therefore, atmospheric air can flow in and out of the interior of the bag member 109 through the flow path 110, and, when the bag member 109 is in the expanded state (that is, the natural state), the bag member 109 is filled with air and, thus, has an internal pressure equal to the atmospheric pressure. Furthermore, the flow path 110 is a throttle path, so that there occurs a fluid resistance when the air flows in and out of the interior of the bag member 109.

Figure 5:
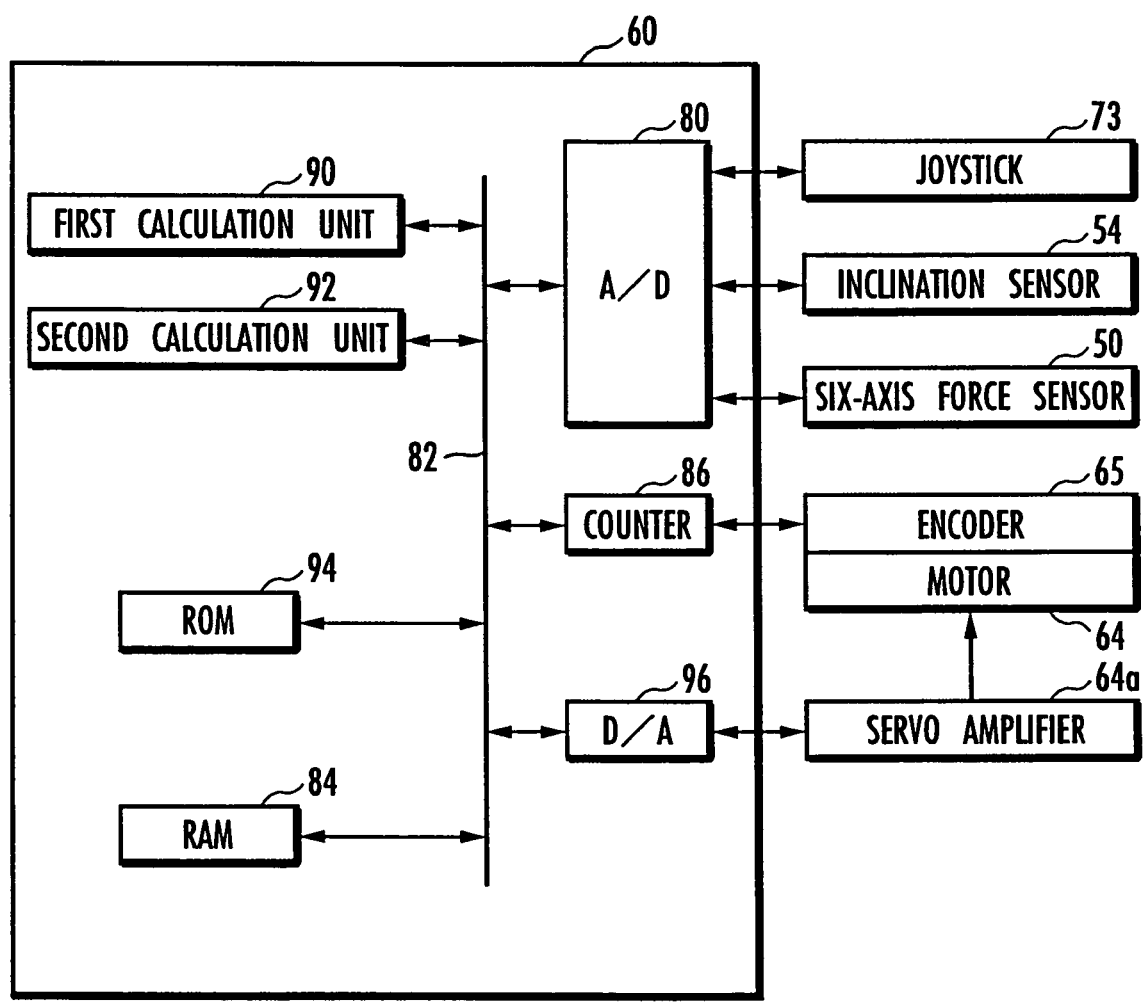
FIG. 5 is a block diagram showing a control unit provided in the robot shown in FIG. 1.

FIG. 5 is a block diagram showing an arrangement of the control unit 60. The control unit 60 is constituted by a microcomputer and comprises a first calculation unit 90 and a second calculation unit 92 (which constitute a CPU), an A/D converter 80, a counter 86, a D/A converter 96, a RAM 84, a ROM 94 and a bus line 82 for data transmission among these components. In the control unit 60, the output signals from the six-axis force sensors 50 of the legs 2, the inclination sensor 54 (that is, the accelerometer and the rate gyro sensor), the joystick 73 and the like are converted into digital values in the A/D converter 80 and then transmitted to the RAM 84 via the bus line 82. Besides, the outputs from the encoders 65 (rotary encoders) at the joints of the robot 1 are input to the RAM 84 via the counter 86.

The first calculation unit 90 generates a desired gait as described later, calculates a joint angle displacement command (that is, a command value of the displacement angle of each joint or the rotation angle of each electric motor 64) and transmits the command to the RAM 84. The second calculation unit 92 reads, from the RAM 84, the joint angle displacement command and the measurement value of the joint angle determined based on the output signal of each encoder 65, calculates the operating amount of each joint to be driven and outputs the operating amount data to the electric motor 64 that drives the joint via the D/A converter 96 and a servo amplifier 64a.

Figure 6:
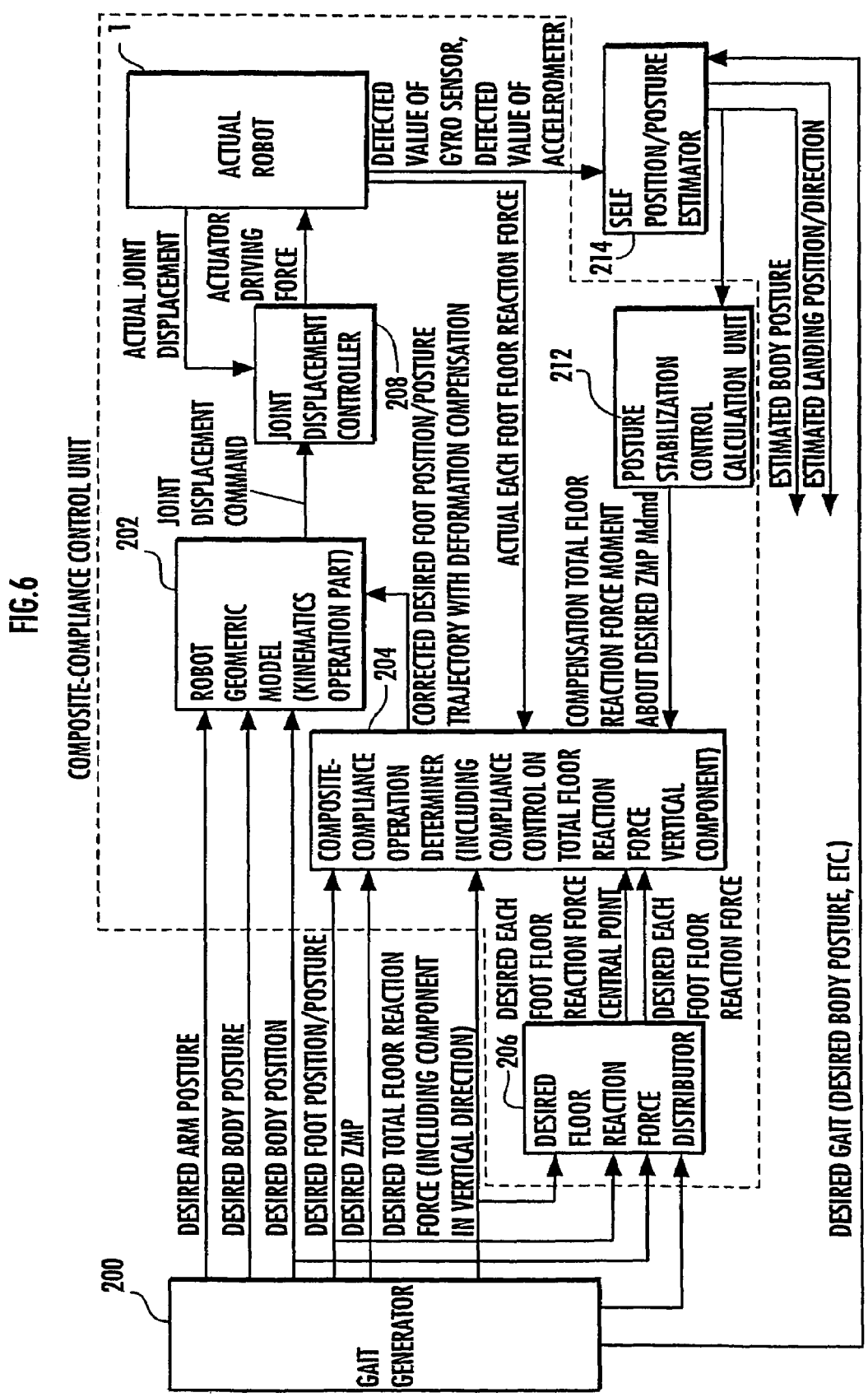
FIG. 6 is a block diagram showing a functional arrangement of the control unit shown in FIG. 5.

FIG. 6 is a block diagram showing the whole of a functional arrangement of a control device of the leg type movable robot according to this embodiment. All the parts in FIG. 6 except for the part designated as an "actual robot" are implemented by the functions performed by the control unit 60 (primarily, functions performed by the first calculation unit 90 and the second calculation unit 92). In the following description, the reference symbols R and L will be omitted if there is no need to discriminate between the left and right legs 2.

The control unit 60 has a gait generator 200 that generates and outputs a desired gait of the robot 1 flexibly and in real time as described later, a self position/posture estimator 214 and the like. As described in detail later, the self position/posture estimator 214 performs functions relating to the characteristics of the present invention and estimates the position/posture of the robot 1 (that is, the position/posture in the global coordinate system).

The desired gait output from the gait generator 200 comprises a desired body position/posture trajectory (including a trajectory of a desired position of the body 3 and a trajectory of a desired posture of the body 3), a desired foot position/posture trajectory (including a trajectory of a desired position of each foot 22 and a trajectory of a desired posture of each foot 22), a desired arm posture trajectory (a trajectory of a desired posture of each arm 5), a desired total floor reaction force central point trajectory (a desired ZMP trajectory), and a desired total floor reaction force trajectory. If the body 3 has a movable member other than the legs 2 and the arms 5, a desired position/posture trajectory of the movable member is added to the desired gait.

Now, meanings or definitions of the terms used in connection with this embodiment will be additionally described. The term "trajectory" means a time-varying pattern (time-series pattern) and is sometimes referred to also as a "pattern" in the following description. In addition, the "posture" of a component means an inclination and an orientation of the component collectively. Here, the "inclination" refers to the angle of the component with respect to the vertical direction, and the "orientation" refers to the direction of the vector indicating the front of the component projected onto a horizontal plane. For example, the inclination of the body posture is represented by the inclination angle (posture angle) of the body 3 in the roll direction (about the X axis) with respect to the Z axis (vertical axis) and the inclination angle (posture angle) of the body 3 in the pitch direction (about the Y axis) with respect to the Z axis. Besides, the direction of the body 3 is represented by the rotation angle, in the yaw direction (about the Z axis), of the vector indicating the front of the body 3 projected onto a horizontal plane. The foot posture is represented by the azimuth angles of two axes fixedly set to the foot 22. In particular, the landing posture of the foot 22 is basically represented by the direction of the landing foot 22. Specifically, the landing posture of the foot 22 is represented by the vector from the heel to the toe of the landing foot 22 projected onto a horizontal plane. In addition, the desired arm posture is represented as a relative posture of the whole arm 5 with respect to the body 3.

The body position means a predetermined position of the body 3, or specifically, the position of a predetermined representative point of the body 3. Similarly, the foot position means the position of a predetermined representative point of each foot 22R (22L). The body velocity means the movement velocity of the representative point of the body 3, and the foot velocity means the movement velocity of the representative point of each foot 22R (22L).

As for the desired gait including the desired body position/posture, the word "desired" will often be omitted in the following description as far as it causes no misunderstanding. The components of the gait other than those related to the floor reaction force, that is, the components related to the movement of the robot 1, such as the foot position/posture and the body position/posture, are collectively referred to as a "movement".

The floor reaction force applied to each foot 22R(L) (the floor reaction force composed of the translation force and the moment) is referred to as an "each foot floor reaction force", and the resultant force of the "each foot floor reaction forces" applied to all (two) the feet 22R and 22L of the robot 1 is referred to as a "total floor reaction force". However, in the following description, there is made little mention of the each foot floor reaction force, and therefore, the term "floor reaction force" is used as having the same meaning as the "total floor reaction force" unless otherwise specified.

In general, the desired floor reaction force is represented by the point of application, and the force (translation force) and the moment thereof applied to the point. The point of application can be set arbitrarily, so that one desired floor reaction force can be represented in an infinite number of ways. However, if the desired floor reaction force is represented by taking the desired floor reaction force central point described above as the point of application, the moment of the force is 0 except for the vertical component thereof.

Here, in a gait which satisfies the dynamical equilibrium condition, the ZMP calculated from a desired movement trajectory agrees with the desired floor reaction force central point (the ZMP is a point where the moment of the resultant force of the inertial force and gravity applied to the robot 1, which is calculated from a desired movement trajectory, is 0 except for the vertical component thereof). Therefore, providing a desired floor reaction force central point trajectory means the same as providing a desired ZMP trajectory (for more information, see PCT Patent Publication WO/02/40224 by the applicants).

Considering such a background, in the specification of PCT Patent Publication WO/02/40224, the desired gait is defined as follows.

(a) In a broad sense, the desired gait is a set of a desired movement trajectory and a desired floor reaction force trajectory for a period of one or more steps.
(b) In a narrow sense, the desired gait is a set of a desired movement trajectory and a ZMP trajectory for a period of one step.
(c) A gait series is a connection of several gaits.

In the case where the robot 1 walks, if the body's vertical position (body height) is determined by the body height determination method previously proposed in Japanese Patent Laid-Open No. 10-86080 by the applicants, the translation force component of the floor reaction force is determined accordingly. Therefore, the ZMP is the only physical quantity concerning the floor reaction force of the desired gait which remains to be explicitly determined. Therefore, in the specification of PCT Patent Publication WO/02/40224, as the definition of the desired gait in a narrow sense, the definition (b) described above is sufficient. On the other hand, in the case where the robot 1 runs, the floor reaction force vertical component is important for controlling the robot, and therefore, the floor reaction force vertical component is preferably explicitly determined. Thus, in the PCT application (PCT/JP02/13596) by the applicants or the like, as the definition of the desired gait in a narrow sense, the following definition (b') is adopted.

(b') The desired gait in a narrow sense is a set of a desired movement trajectory, the ZMP trajectory thereof and the floor reaction force's vertical component trajectory thereof for a period of one step.

In this specification, the term "desired gait" is used as meaning the desired gait in the narrow sense unless otherwise specified. In addition, the term "one step" in the desired gait is used to mean a leg operation starting from landing of one leg 2 of the robot 1 and ending with the next landing of the other leg 2.

Of course, a "two-leg supporting period" in a gait refers to a period in which the two legs 2, 2 support the weight of the robot 1, a "one-leg supporting period" refers to a period in which either one of the legs 2, 2 supports the weight of the robot 1, and a "floating period" refers to a period in which both the legs 2, 2 are away from the floor (floating in the air).

The leg 2 that doesn't support the weight of the robot 1 during the one-leg supporting period is referred to as a "free leg", and the leg 2 that supports the weight is referred to as a "supporting leg". When the robot 1 walks, the two-leg supporting period and the one-leg supporting period occur alternately, and when the robot 1 runs, the one-leg supporting period and the floating period occur alternately. During the floating period which occurs when the robot runs, both the two legs 2, 2 don't support the weight of the robot 1. However, the leg 2 that has been a free leg during the one-leg supporting period immediately preceding the floating period is referred to as a free leg during the floating period, and the leg 2 that has been a supporting leg during the one-leg supporting period immediately preceding the floating period is referred to as a supporting leg during the floating period.

The positions/postures of the components of the robot 1 moving with the desired gait including the desired body posture, the desired body position, the desired foot position/posture and the desired arm posture are described in a supporting leg coordinate system. The supporting leg coordinate system is a coordinate system that is fixed to the floor surface and has an origin in the contact surface of the foot 22 of the supporting leg. Specifically, as described in Japanese Patent No. 3273443, the supporting leg coordinate system is a coordinate system that has: an origin located at an intersection of the contact surface and a perpendicular line drawn from the center of the ankle joints of the supporting leg, whose foot 22 has been rotated to the horizontal posture without any slipping with respect to the contact surface; an X axis corresponding to the horizontal axis extending from the origin to the toe of the foot 22 of the supporting leg (that is, an axis in the back-and-forth direction of the foot 22); a Z axis corresponding to the vertical axis; and a Y axis corresponding to a coordinate axis perpendicular to the X and Z axes (that is, an axis extending sideward of the foot 22).

The gait generator 200 according to this embodiment of the present invention generates a desired gait comprising a desired body position/posture trajectory, a desired foot position/posture trajectory, a desired ZMP trajectory, a desired floor reaction force's vertical component trajectory and a desired arm posture trajectory based on input required values (desired values) of landing position/posture and landing time of the foot 22 of the free leg for the next two steps. In this process, some of the parameters determining the trajectories (referred to as gait parameters) are corrected to maintain the continuity of the gait.

The desired gait is generated using a dynamical model of the robot 1. The dynamics model may be a simplified model described in PCT Patent Publication WO/02/40224 described above or a multi-mass model (full model) described in Japanese Patent Laid-Open No. 2002-326173 proposed by the applicants, for example.

The gait generator 200 successively generates desired gaits, on a one-step basis, for steps each starting from landing of one leg 2 of the robot 1 and ending with the next landing of the other leg 2 (that is, desired gaits according to the definition in the narrow sense described above). Here, the gait being generated or to be generated is referred to as a "current time gait", the following gait is referred to as a "next time gait", and the gait following the next time gait is referred to as a "next but one time gait". In addition, the desired gait generated immediately before the current time gait is referred to as a "last time gait".

Part of the desired gait generated by the gait generator 200 will be generally described for the sake of illustration. For example, the desired foot position/posture trajectory is generated using a finite duration settling filter disclosed in Japanese Patent No. 3233450 by the applicants. In the generation of the foot position/posture trajectory using the finite duration settling filter, for example, the foot position trajectory is generated in such a manner that the foot 22 starts moving by gradually accelerating toward the desired landing position (the required value of landing position), gradually decelerates to a velocity of 0 or almost 0 before the desired landing time (the required value of landing time) and stops moving at the desired landing position at the desired landing time. The same holds true for the foot posture trajectory. For the desired foot position/posture trajectory thus generated, the velocity of the foot with respect to the floor at the instant of landing is 0 or substantially 0. Therefore, in particular, when the robot 1 runs, the landing impact on the foot having been in the floating period can be reduced.

Figure 7:
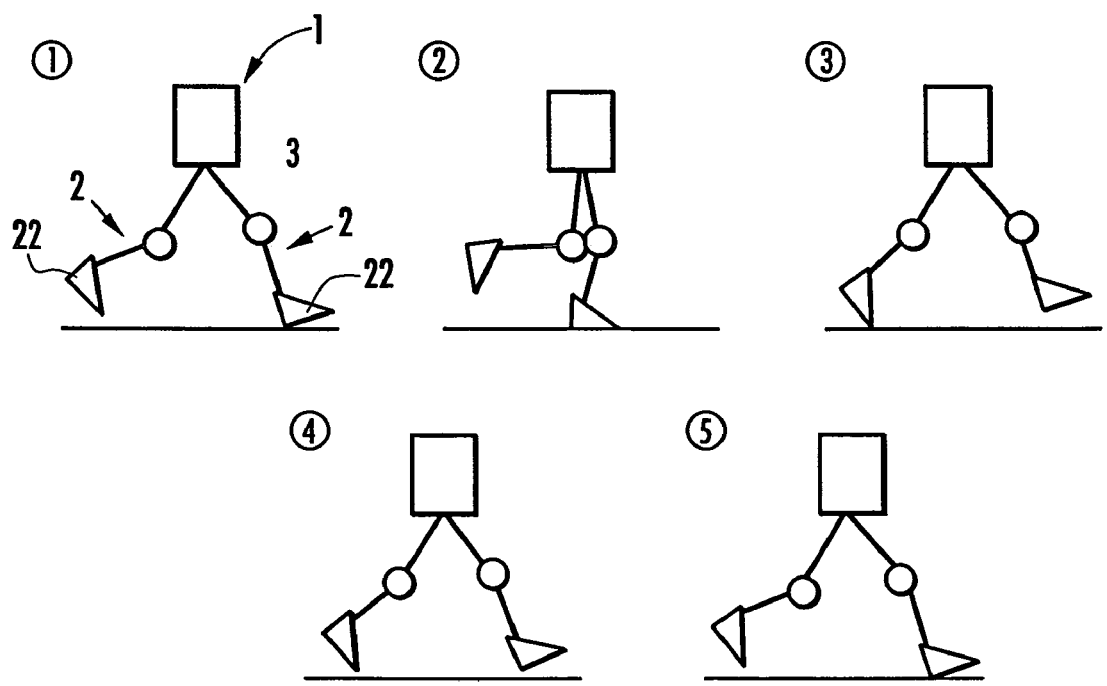
FIG. 7 is a diagram for illustrating a running gait of the robot.
Figure 8:
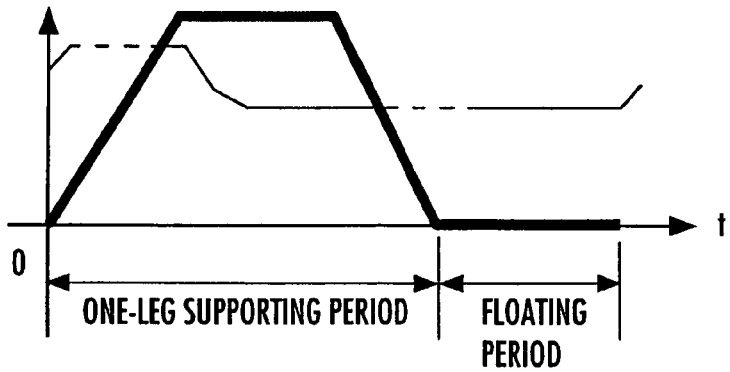
FIGS. 8(a), 8(b) and 8(c) are graphs showing exemplary settings of a floor reaction force's vertical component of a desired gait, a desired ZMP and a gain for estimating a self position/posture, respectively.
Figure 8:
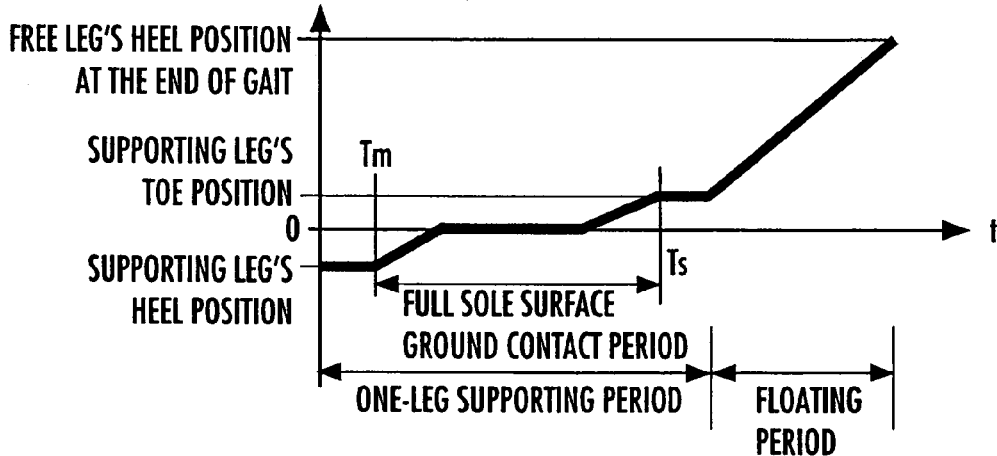
Figure 8:
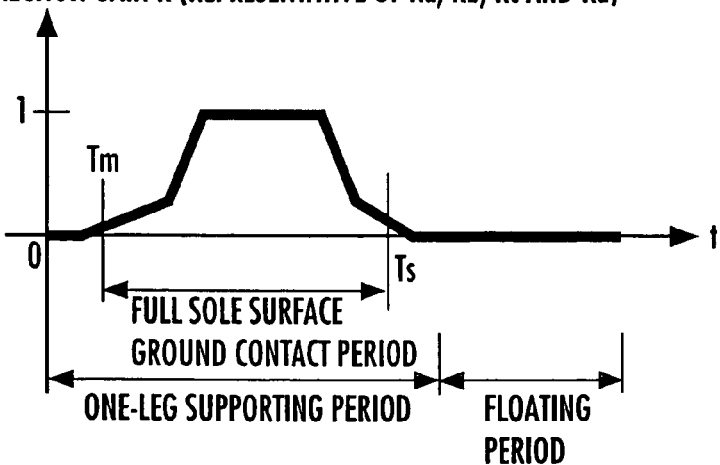

In addition, if the robot 1 runs in the same manner that a human being runs as shown in FIG. 7, the desired floor reaction force's vertical component trajectory and the desired ZMP trajectory (specifically, the desired ZMP trajectory in the X axis direction (that is, the back-and-forth direction of the foot 22 of the supporting leg) in the supporting leg coordinate system) are set to be patterns shown by the solid lines in FIGS. 8(a) and 8(b), respectively, for example. In FIG. 7, the first drawing schematically shows a state of the two legs 2, 2 of the robot 1 at the start of the one-leg supporting period, the second drawing schematically shows a state thereof at the middle of the one-leg supporting period, the third drawing schematically shows a state thereof at the end of the one-leg supporting period, the fourth drawing schematically shows a state of the two legs 2, 2 of the robot 1 at the middle of the floating period, and the fifth drawing schematically shows a state thereof at the end of the floating period (that is, at the start of the next one-leg supporting period).

When the robot 1 runs, the desired floor reaction force's vertical component trajectory principally varies in a trapezoidal shape during the one leg supporting period and is kept at 0 during the floating period. On the other hand, when the robot 1 walks, the desired floor reaction force's vertical component trajectory is set as shown by the chain double-dashed line in FIG. 8(a), for example. In this case, the trapezoidal section of the chain double-dashed line corresponds to the two-leg supporting period, and the reversed trapezoidal section corresponds to the one-leg supporting period. Regardless of whether the robot 1 runs or walks, the desired ZMP is set close to the center of the contact surface (specifically, a supporting polygon) of the leg 2 of the robot 1.

Figure 9:
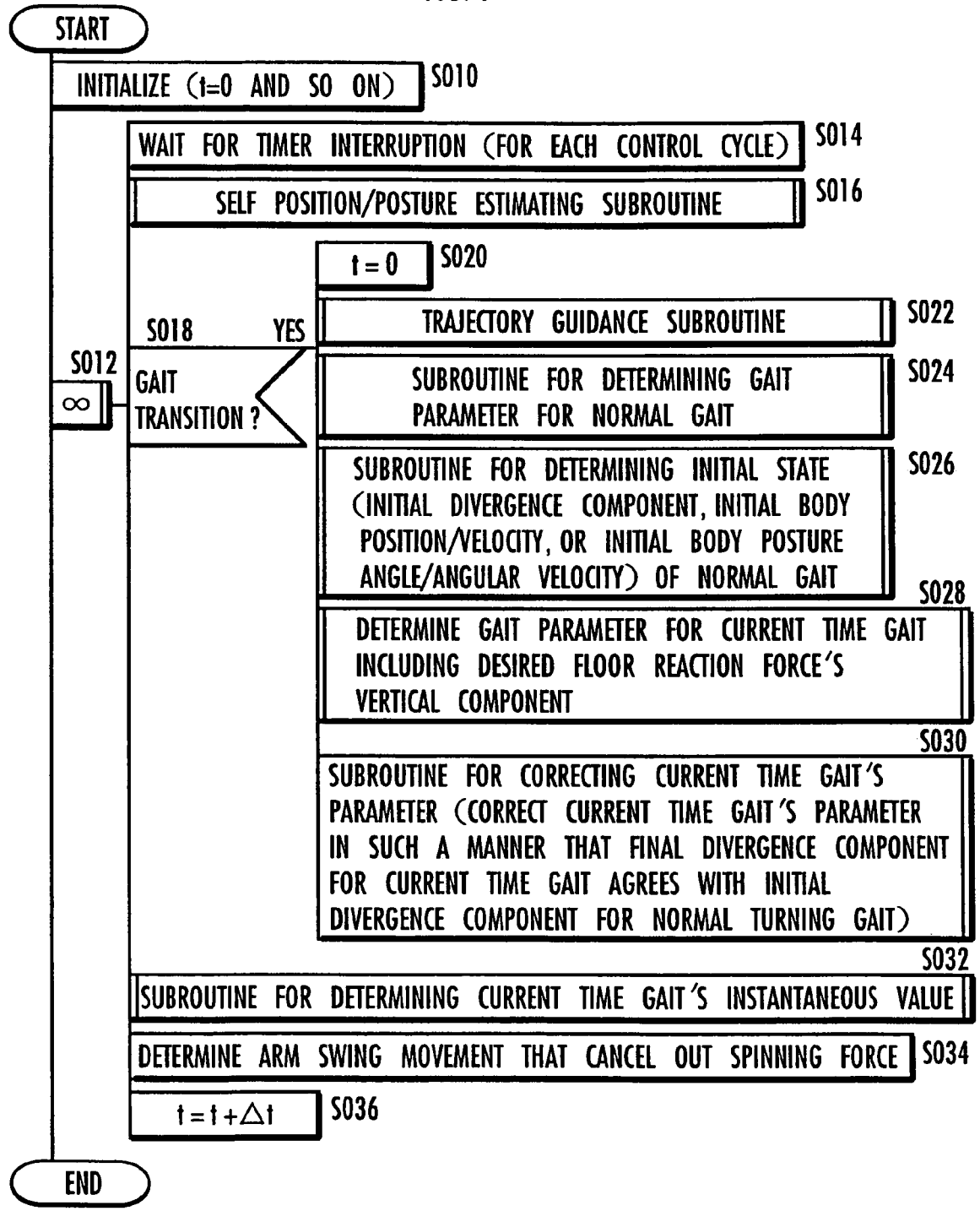
FIG. 9 is a flowchart showing essential steps performed in the control unit according to a first embodiment.

FIG. 9 is a flowchart (structured flowchart) showing a gait generation process performed by the gait generator 200 and a self position/posture estimation process performed by the self position/posture estimator 214 shown in FIG. 6.

First, in step S010, various initialization operations, such as an operation of initializing the time t to 0, are conducted.

Then, the process proceeds to step S014 through step S012. In step S014, a timer interruption for each control cycle is waited for. The control cycle is Δt.

Then, the process proceeds to step S016, where the self position/posture estimator 214 estimates the self position/posture. The processing of the step S016 characterizes the self-position estimating device for a leg type movable robot according to this application. However, that will be described later.

Then, the process proceeds to step S018, where it is determined whether a gait transition (that is, a point in time when generation of the last time gait is completed and generation of a new current time gait is to be started) is detected or not. If the result of the determination is YES, the process proceeds to step S020, and if the result is NO, the process proceeds to step S032. Now, the processings of step S020 and the following steps will be described below. However, the processings are described in detail in PCT Patent Publication WO/02/40224 or PCT application PCT/JP02/13596 previously proposed by the applicants, and therefore, it will be simply described in this specification.

When the process proceeds to step S020, the time t is initialized to 0. Then, the process proceeds to step S022, where a next time gait's supporting leg coordinate system (specifically, the position and orientation thereof), a next but one time gait's supporting led coordinate system (specifically, the position and orientation thereof), a current time gait's period and a next time gait's period are read in.

The next time gait's supporting leg coordinate system and the next but one time gait's supporting leg coordinate system are determined in accordance with the definition of the supporting leg coordinate system described above, based on the required value of landing position/posture (that is, the desired landing position/posture) of the foot 22 of the free leg for the first step (that is, the foot 22 of the free leg in the current time gait) and the required value of landing position/posture (that is, the desired landing position/posture) of the foot 22 of the free leg for the second step (that is, the foot 22 of the free leg in the next time gait), respectively, which are specified through manipulation of the joystick 73 or the like.

The current time gait's period and the next time gait's period are determined based on the required value of landing time (that is, the desired landing time) of the foot 22 of the free leg for the first step and the required value of landing time (that is, the desired landing time) of the foot 22 of the free leg for the second step, respectively.

The required values of landing position/posture and landing time of the foot 22 of the free leg, the positions and orientations of the supporting leg coordinate systems, or the gait's periods may be previously stored in a memory as a walking schedule or may be determined based on an instruction (request) input via a manipulator, such as the joystick 73, and a walking history recorded up to that moment.

Then, the process proceeds to step S024, where a gait parameter for a normal turning gait following the current time gait is determined based on the next time gait's supporting leg coordinate system, the next but one time gait's supporting leg coordinate system, the current time gait's period and the next time gait's period and the like, which are determined in step S022. Primarily determined are a foot trajectory parameter for defining a desired foot position/posture trajectory, a reference body posture trajectory parameter for defining a reference trajectory of a desired body posture, an arm posture trajectory parameter for defining a desired arm posture trajectory, a ZMP trajectory parameter for defining a desired ZMP trajectory, and a floor reaction force's vertical component trajectory parameter for defining a desired floor reaction force's vertical component trajectory. For example, as for the floor reaction force's vertical component trajectory, the point in time or value of an apex in the pattern shown in FIG. 8(a) is determined as the floor reaction force's vertical component trajectory parameter.

The term "normal turning gait" in this specification means a cyclic gait that, if it is repeated, results in no discontinuity in the movement of the robot 1 at the boundaries between the gaits (hereinafter, the "normal turning gait" will be sometimes abbreviated as a "normal gait").

The normal turning gait for one period comprises a first turning gait and a second turning gait. The first turning gait corresponds to a gait for the foot 22 of the supporting leg in the current time gait's supporting leg coordinate system to move to a position/posture in the next but one time gait's supporting leg coordinate system, and the second turning gait corresponds to a gait for the foot 22 of the supporting leg in the next time gait's supporting leg coordinate system to move a position/posture in a next but two time gait'supporting leg coordination system. The next but two time gait's supporting leg coordinate system is associated with the desired landing position/posture of the foot 22 of the free leg in the second turning gait. The next but two time gait's supporting leg coordinate system is set in such a manner that the position/posture (that is, position and orientation) of the next but two time gait's supporting leg coordinate system seen from the next but one time gait's supporting leg coordinate system (the supporting leg coordinate system for the second turning gait) agrees with the position/posture (that is, position and orientation) of the next time gait's supporting leg coordinate system seen from the current time gait's supporting leg coordinate system (that is, the landing position/posture of the foot 22 of the free leg in the current time gait). The word "turning" in the term "normal turning gait" is used because "turning" can include "straight advance" in a broad sense since a turning ratio of 0 means straight advance.

The normal turning gait is a virtual cyclic gait provisionally created in the gait generator 200 for determining a divergence component of the current time gait and the body's vertical position/velocity at the end of the current time gait and is not output directly from the gait generator 200 for actually controlling the robot 1.

Here, the word "divergence" means that the position of the body is displaced far from the positions of the foot portions (that is, the feet). The value of the divergence component is a numerical value that represents the degree of displacement of the position of the body of the two-legged movable robot from the positions of the foot portions (feet) (strictly, from the origin of the supporting leg coordinate system set on the contact surface of the supporting leg) and is represented as a function of the horizontal position and velocity of the body 3.

In this embodiment, the current time gait is generated in such a manner that the normal gait following the current time gait to be generated is set in accordance with the movement requests (that is, the required values of landing position/posture and landing time of the foot 22 of the free leg for the next two steps and the like), the initial divergence component of the normal gait is determined, and then, the final divergence component of the current time gait is made to agree with the initial divergence component of the normal gait. The processing of step S024 is described in detail in PCT Patent Publication WO/02/40224 or PCT application PCT/JP02/13596 previously proposed by the applicants, and therefore, further description thereof will be omitted.

After the processings from steps S010 to S024 are conducted, the process proceeds to step S026, where initial states of the normal turning gait (that is, the initial body position/velocity horizontal component, the initial body vertical position/velocity, the initial divergence component, and the initial body posture angle and angular velocity) are determined. The processing of step S026 is described in PCT Patent Publication WO/02/40224 or PCT application PCT/JP02/13596, and therefore, further description thereof will be omitted.

Then, the process proceeds to step S028, where the gait parameters for the current time gait are determined (some of them are provisionally determined). In this case, as with the gait parameters for the normal turning gait, the gait parameters for the current time gait to be determined primarily include a foot trajectory parameter, a reference body posture trajectory parameter, an arm posture trajectory parameter, a desired ZMP trajectory parameter and a desired floor reaction force's vertical component trajectory parameter, and the gait parameters for the current time gait are determined in such a manner that the trajectories defined by the above parameters are seamlessly connected to the respective trajectories in the normal turning gait. However, of these parameters, the desired ZMP trajectory parameter is a provisional one. The processing of step S028 is described in PCT Patent Publication WO/02/40224, PCT application PCT/JP02/13596 or the like, and therefore, further description thereof will be omitted.

Then, the process proceeds to step S030, where the gait parameters for the current time gait are corrected to make the final divergence component of the current time gait agree with the initial divergence component of the normal gait. The gait parameter corrected in this step is the desired ZMP trajectory parameter.

After the current time gait parameter is corrected in step S030, or if the result of the determination in step S018 is NO, the process proceeds to step S032, where a current time gait's instantaneous value is determined. This processing is described in detail in PCT Patent Publication WO/02/40224, PCT application PCT/JP02/13596 or the like, and therefore, further description thereof will be omitted.

Then, the process proceeds to step S034, where an arm movement that cancels the spinning force is determined in the same manner as the processing of step S032 in the embodiment described in PCT application PCT/JP02/13596.

Then, the process proceeds to step S036, where the gait generation time t is incremented by Δt. Then, the process returns to step S014, and the gait generation continues as described above.

Described above are the desired gait generation process conducted by the gait generator 200 and the self position/posture estimating process conducted by the self position/posture estimator 214.

The control operation by the control unit 60 according to this embodiment will be further described with reference to FIG. 6. The gait generator 200 generates the desired gait as described above. The desired body position/posture (trajectory) and the desired arm posture trajectory of the generated desired gait are directly transmitted to a robot geometric model (inverse kinematics calculation part) 202.

Besides, the desired foot position/posture (trajectory), the desired ZMP trajectory (that is, the desired total floor reaction force central point trajectory) and the desired total floor reaction force (trajectory) (that is, the desired floor reaction force's horizontal component and the desired floor reaction force's vertical component) are directly transmitted to a composite-compliance operation determinator 204 and to a desired floor reaction force distributor 206. The desired floor reaction force distributor 206 distributes the desired total floor reaction force among the feet 22R and 22L and determines the desired each foot floor reaction force central points and the desired each foot floor reaction forces for the feet. The desired each foot floor reaction force central points and the desired each foot floor reaction forces thus determined are transmitted to the composite-compliance operation determinator 204.

The composite-compliance operation determinator 204 generates a corrected desired foot position/posture trajectory with deformation compensation and transmits the same to the robot geometric model 202. Upon receiving the desired body position/posture (trajectory) and the corrected desired foot position/posture (trajectory) with deformation compensation, the robot geometric model 202 calculates joint displacement commands (values) for the twelve joints (such as 10R(L)) of the legs 2, 2 and transmits the commands to a displacement controller 208. The displacement controller 208 controls the twelve joints of the robot 1 by following the joint displacement commands (values) calculated by the robot geometric model 202 as desired values.

The floor reaction force (specifically, an actual each foot floor reaction force) applied to the robot 1 is detected by the six-axis force sensor 50. The detection value is transmitted to the composite-compliance operation determinator 204. In addition, inclination components of the difference between the estimated body posture determined in step S016 in FIG.

9 as described later and the desired body posture generated by the gait generator 200, that is, actual body posture errors θerrx and θerry are transmitted to a posture stabilization control calculation unit 212. Here, θerrx is an inclination component in the roll direction (about the X axis), and θerry is an inclination component in the pitch direction (about Y axis). The posture stabilization control calculation unit 212 calculates the compensation total floor reaction force moment about the desired total floor reaction force central point Mdmd (desired ZMP) for restoring the body posture inclination of the robot 1 to the body posture inclination in the desired gait and transmits the compensation total floor reaction force moment Mdmd to the composite-compliance operation determinator 204. Based on the input value, the composite-compliance operation determinator 204 corrects the desired foot position/posture. Specifically, the composite-compliance operation determinator 204 determines the corrected desired foot position/posture (trajectory) with deformation compensation by correcting the desired foot position/posture transmitted from the gait generator 200 in such a manner that the actual total floor reaction force (that is, the resultant force of all the actual foot floor reaction forces including the translation forces and the moments) agrees with the resultant force of the desired total floor reaction force, which is a resultant force of the desired each foot floor reaction forces, and the compensation total floor reaction force moment Mdmd. However, it is actually impossible that all the states agree with their respective desired values, and therefore, various trade-offs are made among these states to make each of them agree with its desired value as closely as possible. That is, a control deviation for each of the desired values of the foot position/posture and the floor reaction force is weighted, and the weighted averages of the control deviations (or the squares of the control deviations) are controlled to be minimum.

Specifically, the corrected desired foot position/posture (trajectory) with deformation compensation is a desired foot position/posture (trajectory) that is corrected so as to achieve a deformation of a deformable mechanism (a cylindrical rubber, a sole sponge, or a bag-like air damper for impact absorption) of the foot which is required to achieve the desired floor reaction force value corrected by the composite-compliance operation determinator 204 which is determined using a dynamics model thereof (for example, a spring damper model).

In the following, a self position/posture estimating process in step S016 according to a first embodiment will be described in detail with reference to the flowchart thereof shown in FIG. 10. The self position/posture estimating process according to the first embodiment described below is a process concerning walking of the robot 1.

First, in step S2000, a detection value of the gyro sensor in the inclination sensor 54 of the body 3, that is, a detection value of angular velocity (or angular velocities in the three axis direction) of the body 3 is integrated by an integrator to determine an estimated body posture. The estimated body posture is described in the global coordinate system. Of the estimated body posture, the inclination component is drift-corrected with respect to the gravity direction detected by the accelerometer in the inclination sensor 54 in order to reduce an accumulation of errors of integration of the detection value of the gyro sensor (that is, a drift thereof). Specifically, this correction is conducted by determining the difference between the relative angle of the body 3 with respect to the gravity direction determined from the detection value of the accelerometer and the inclination of the estimated body posture and additionally inputting, to the integrator that integrates the detection value of the gyro sensor, a value derived from the difference in accordance with a feedback control law, such as the PI control law, to make the difference converge to 0. This correction method is well-known, and therefore, further description thereof will be omitted.

Then, the process proceeds to step S2002, where it is determined whether landing of the robot 1 is ensured or not. This determination may be made with reference to a certain point in time in the desired gait, such as based on criteria described below, or alternatively, may be made based on the detection value of the six-axis force sensor 50 (floor reaction force sensor) or the accelerometer. Alternatively, the determination may be made by comprehensively taking such detection values and such a certain point in time in the desired gait into consideration.

(a) Whether a predetermined time has elapsed from the start of the one-leg supporting period or not.

(b) Whether a predetermined time has elapsed since the detection value of the six-axis force sensor (floor reaction force sensor) 50 reached a predetermined value or not.

(c) Whether a predetermined time has elapsed since the detection value of the accelerometer reached a predetermined value or not.

However, in order to avoid slipping or taking-off of the foot 22 having landed on the floor immediately after the result of the determination in step S2002 is found YES as reliably as possible, it is preferable to choose a point in time an appropriate time after the instant of landing as the point in time when landing of the foot is ensured. Therefore, the predetermined times described in the above criteria (a) to (c) are preferably determined so as to meet this requirement.

If the result of the determination in step S2002 is NO, the self-position estimating process of step S016 is completed, and the process proceeds to step S018 in FIG. 9 as described above.

If the result of the determination in step S2002 is YES, the following processings are performed. The process proceeds to step S2004, where the difference between the estimated body posture seen from the global coordinate system and the body posture of the desired gait (that is, the desired body posture) seen from the global coordinate system is calculated as a posture rotational deviation's variation. Here, the body posture of the desired gait seen from the global coordinate system is a body posture seen from the global coordinate system for the case where it is assumed that the robot 1 moves with the desired gait without any posture inclination or spin of the body 3 (that is, any deviation from the desired body posture) during one step in a current estimated supporting leg coordinate system. The estimated supporting leg coordinate system is a supporting leg coordinate system associated with the estimated position/posture of the foot 22 of the supporting leg of the actual robot 1. That is, the estimated supporting leg coordinate system is a coordinate system established in accordance with the definition of the supporting leg coordinate system described above. More specifically, the estimated supporting leg coordinate system is a coordinate system that has: an origin located at an intersection of the contact surface and a perpendicular line drawn from the center of the ankle of the supporting leg of the actual robot 1, whose foot 22 has been rotated from the estimated position/posture to the horizontal posture without any slipping with respect to the contact surface; an X axis corresponding to the horizontal axis extending from the origin to the toe of the foot 22 of the supporting leg; a Z axis corresponding to the vertical axis; and a Y axis corresponding to a coordinate axis perpendicular to the X and Z. In the first embodiment, the estimated supporting leg coordinate system is updated only when landing of a foot is ensured as described later, and therefore, is a supporting leg coordinate system associated with the estimated position/posture of the foot 22 of the supporting leg of the actual robot at the time of landing. Consequently, in the first embodiment, the position/posture of the estimated supporting leg coordinate system is estimated as an estimation value of the self-position of the robot 1.

In the above description, the difference between the estimated body posture at the time when landing is ensured and the body posture of the desired gait is calculated as the posture rotational deviation's variation in step S2004. Strictly, however, it is preferable that the difference between the variation of the estimated body posture and the variation of the body posture of the desired gait for a period of one step is calculated as the posture rotational deviation's variation. However, in the first embodiment, since the algorithm described later is performed, the estimated body posture agrees with the body posture of the desired gait by itself at the start of one step. Therefore, the difference between the estimated body posture and the body posture of the desired gait equals to the difference between the variation of the estimated body posture and the variation of the body posture of the desired gait for a period of one step, and thus, either of them may be used.

Then, the process proceeds to step S2006, where a posture rotation center is determined. Specifically, for example, of the desired ZMPs of the last time gait, the desired ZMP at the time when the foot 22 of the rear supporting leg in the last time gait is in contact with the floor at the toe is determined as the posture rotation center.

Figure 11:
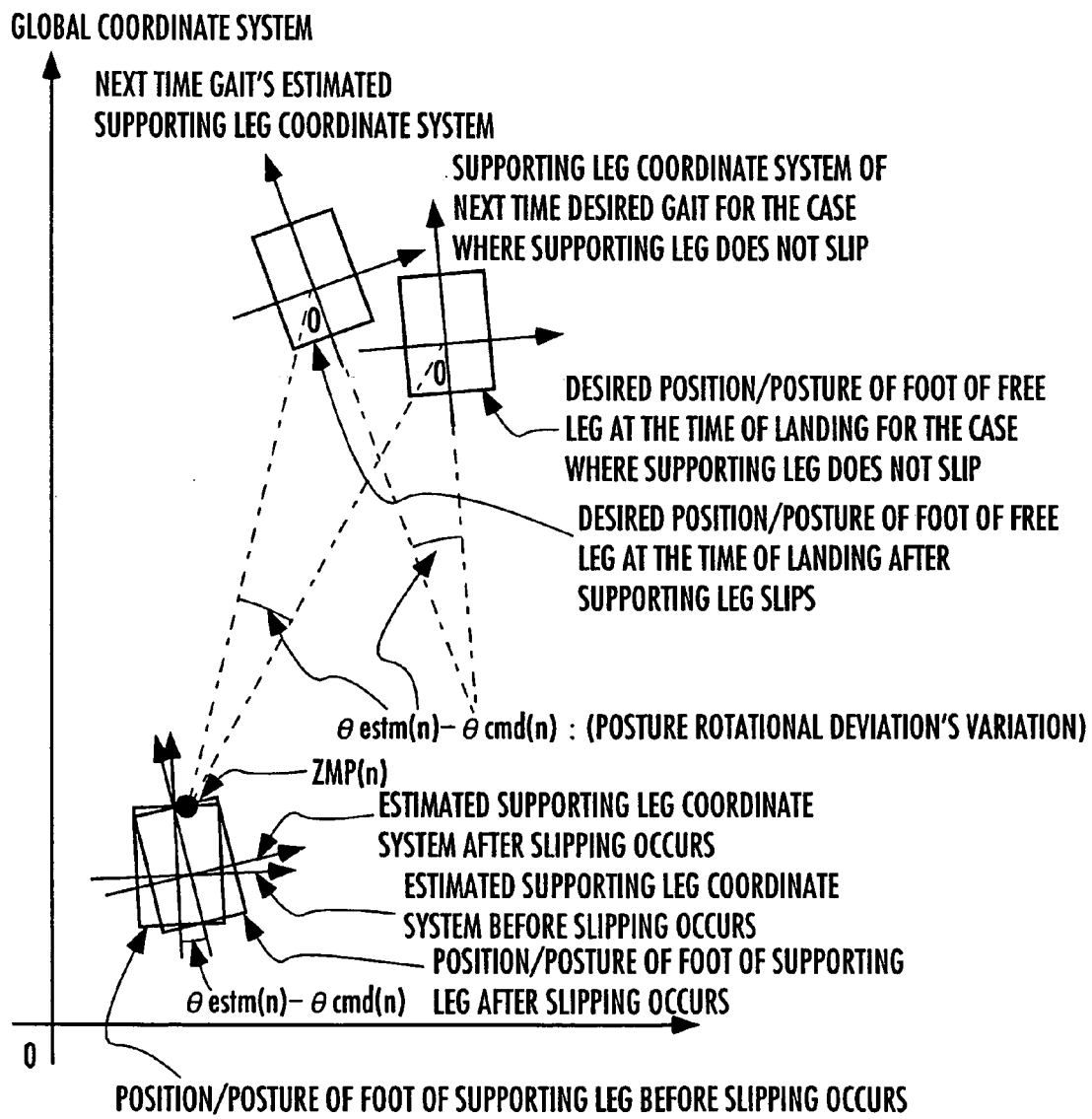
FIG. 11 is a diagram for illustrating the self position/posture estimating process shown in the flowchart in FIG. 9.

Then, the process proceeds to step S2008, where the position/posture of the current estimated supporting leg coordinate system (specifically, the estimated supporting leg coordinate system determined when landing of the foot 22 of the supporting leg of the last time gait is ensured, that is, the estimated supporting leg coordinate system before slipping shown in FIG. 11 occurs) is rotated by the posture rotational deviation's variation about the posture rotation center determined in step S2006, and the resulting coordinate system is determined as a new current estimated supporting leg coordinate system (the estimated supporting leg coordinate system after slipping shown in FIG. 11 occurs).

The origin and the directions of the coordinate axes of the estimated supporting leg coordinate system are represented in the global coordinate system.

In addition, it is assumed that initial values for the estimated supporting leg coordinate system (that is, initial position/posture in the global coordinate system) have been set during the initialization in step S010.

Then, the process proceeds to step S2010, where a next time gait's estimated supporting leg coordinate system (that is, a next time gait's estimated supporting leg coordinate system shown in FIG. 11) is determined in such a manner that the relative position/posture relationship of the next time gait's estimated supporting leg coordinate system with respect to the current estimated supporting leg coordinate system is the same as the relative position/posture relationship of the next time gait's supporting leg coordinate system with respect to the supporting leg coordinate system of the desired gait (last time gait). Here, the "next time gait's supporting leg coordinate system" referred to herein means the supporting leg coordinate system of the gait following the last time gait (that is, the current time gait), rather than the next time gait's supporting leg coordinate system of the current time gait that is to be generated.

Then, the process proceeds to step S2012, where the position/posture of the next time gait's estimated supporting leg coordinate system determined in step S2010 (including the position of the origin and the directions of the coordinate axes) is substituted for the position/posture of the current estimated supporting leg coordinate system. Thus, the self-position estimating process in step S016 is completed, and then, the process proceeds to step S018, as described above.

Described above is the self-position estimating process in step S016 according to the first embodiment.

The rotation center of the estimated supporting leg coordinate system corresponds with the rotation center of the rotational slipping of the foot 22 of the supporting leg during normal walking, which involves no floating period. During the floating period occurring in one step in running or the like, during which the supporting leg also floats over the floor, the foot 22 of the supporting leg does not slip in a narrow sense, and therefore, the posture rotation (or spin) in the air is preferably represented as a rotation about the rotation center of the estimated supporting leg coordinate system. However, in a broader sense, the "slipping of the foot of the supporting leg" may be defined as a posture rotation about the rotation center of the estimated supporting leg coordinate system.

More specifically, the supporting leg coordinate system just has to be set with respect to the contact surface of the foot 22 of the supporting leg, and the origin thereof does not have to be the point where the perpendicular line drawn from the center of the ankle of the supporting leg intersects with the contact surface as described above. That is, the supporting leg coordinate system is a local coordinate system that is set on a virtual floor in the vicinity of the foot 22 of the supporting leg for describing the movement of the robot. After all, the posture rotation (or spin) of the robot 1 is considered as a phenomenon in which the virtual floor including the robot 1 rotates (or spins) about a predetermined point in the global coordinate system while the robot 1 is kept moving without any posture rotation (or spin) with respect to the virtual floor.

In other words, the movement of the robot 1 can be considered as a rotational perturbation of a local coordinate system including the whole robot 1 moving following the desired gait or joint displacement detection values in the local coordinate system about a predetermined point (posture rotation center) with respect to the global coordinate system.

Therefore, the posture rotation center corresponds with the rotation center of the estimated supporting leg coordinate system, as well as the rotation center of the rotational perturbation.

In step S2008 in the first embodiment, if the current estimated supporting leg coordinate system is rotated by the posture rotational deviation's variation including the difference of inclination component of the posture of the body 3, the Z axis of the current estimated supporting leg coordinate system typically deviates from the vertical direction.

According to this embodiment, the current estimated supporting leg coordinate system is updated only at the time of landing, and therefore, the current estimated supporting leg coordinate system is kept inclined depending on the body posture at the instant of landing, which is not preferable. The current estimated supporting coordinate system should be determined so as to have the Z axis aligned with the vertical direction. Thus, according to the first embodiment, in step S2008, after the current estimated supporting leg coordinate system is rotated, the direction of the Z axis of the rotated current estimated supporting leg coordinate system is restored to the vertical direction. Specifically, the direction of the Z axis of the rotated current estimated supporting leg coordinate system is restored to the vertical direction by rotating the rotated current estimated supporting leg coordinate system about the origin of the estimated supporting leg coordinate system by the inclination angle of the Z axis with respect to the vertical direction. Alternatively, in step S2008, the current estimated supporting leg coordinate system may be rotated by the component about the vertical axis (that is, the spin component) of the posture rotational deviation's variation, rather than by the posture rotational deviation's variation. Alternatively, the direction of the Z axis of the next time gait's estimated supporting leg coordinate system may be restored to the vertical direction in step S2010.

Also in the following, as for the second embodiment, the current estimated supporting leg coordinate system is preferably determined so as to the Z axis aligned with the vertical direction. As for the third and the following embodiments, a similar strategy may be used if the self position deviation due to spinning has to be primarily handled.

As described above, in the first embodiment, assuming that the actual behavior of the robot 1 is a rotation of the robot 1 and the estimated supporting leg coordinate system, the estimated supporting leg coordinate system being a local coordinate system that describes the movement of the robot 1, and the robot 1 moving following the desired gait in the estimated supporting leg coordinate system, about a predetermined posture rotation center determined by the posture rotation center determining means (in the processing in step S2006) by the posture rotational deviation's variation, which is a variation, during one step, of the difference between the posture of the body 3 detected by the posture detecting means (in the processing in step S2000) (that is, the estimated value of the actual posture) and the desired posture of the body 3 (or the component, about the vertical axis, of the posture rotational deviation's variation), the position/posture of the new estimated supporting leg coordinate system depending on the position/posture of the foot 22 of the free leg at the time of landing, that is, the position and orientation of the landing point of the foot 22, or in other words, the foot print is estimated for every step (for every landing).

The first embodiment described above is associated with the first to fifth, seventh and eighth implementations of the present invention.

Now, a second embodiment of the present invention will be described with reference to FIGS. 12 and 13. The second embodiment differs from the first embodiment only in the self position/posture estimating process in step S016 described above with reference to FIG. 9, and the other arrangements and the processings performed by the control unit 60 are the same as those according to the first embodiment.

Figure 12:
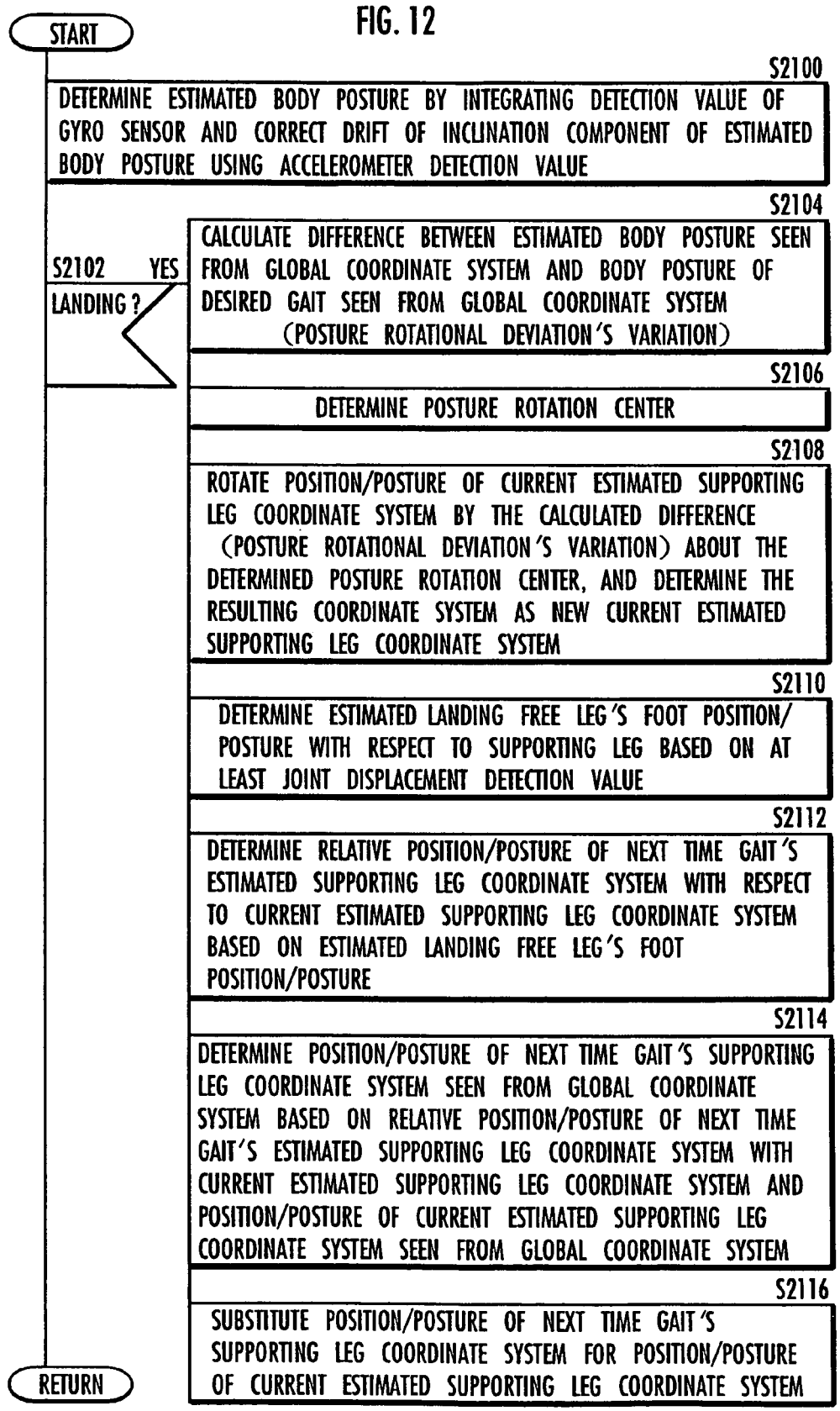
FIG. 12 is a flowchart showing a self position/posture estimating process according to a second embodiment.

FIG. 12 is a flowchart showing a self position/posture estimating process according to the second embodiment. The self position estimating process according to the second embodiment described below is a process concerning walking of the robot 1.

First, in step S2100, as in the first embodiment, a detection value of the gyro sensor in the inclination sensor 54 of the body 3 (a detection value of angular velocity) is integrated by an integrator to determine an estimated body posture. Then, the process proceeds to step S2102, where it is determined whether landing of the robot 1 is ensured or not, as in the first embodiment.

If the result of the determination in step S2102 is NO, the self-position estimating process of step S016 shown in FIG. 9 is completed, and the process proceeds to step S018 as described above.

If the result of the determination in step S2102 is YES, the following processings are performed. The process proceeds to step S2104, where the difference between the estimated body posture seen from the global coordinate system and the body posture of the desired gait seen from the global coordinate system is calculated as a posture rotational deviation's variation, as in the first embodiment.

Then, the process proceeds to step S2106, where a posture rotation center is determined, as in the first embodiment.

Then, the process proceeds to step S2108, where the position/posture of the current estimated supporting leg coordinate system is rotated about the posture rotation center by the posture rotational deviation's variation, and the resulting coordinate system is determined as a new current estimated supporting leg coordinate system, as in the first embodiment. FIG. 13 illustrates the current estimated supporting leg coordinate system before being rotated and the current estimated supporting leg coordinate system after being rotated.

Then, the process proceeds to step S2110, where the actual position/posture of the foot of the free leg (in the example shown in FIG. 13, the position/posture of the foot 22 located toward the front of robot 1) at the time of landing in the current estimated supporting leg coordinate system is estimated through kinematics calculations based on at least the joint displacement detection values. In the following, the estimated actual position/posture of the foot of the free leg at the time of landing will be referred to as an estimated free leg's foot position/posture at the time of landing.

However, this is on the assumption that, on the current estimated supporting leg coordinate system, the robot 1 moves following the joint displacement detection values while keeping the body posture according to the desired gait without any slipping of the foot 22 of the supporting leg with respect to the virtual floor in the current estimates supporting leg coordinate system.

Specifically, the reason why it is assumed that the robot 1 keeps the body posture according to the desired gait on the current estimated supporting leg coordinate system which has been rotated about the posture rotation center by the posture rotational deviation's variation is because the body posture on the assumption agrees with the estimated body posture in the global coordinate system at that instant. Therefore, is the current estimated supporting leg coordinate system is rotated by the component about the vertical axis (that is, the spin component) of the posture rotational deviation's variation rather than by the difference described above, it is assumed that, on the current estimated supporting leg coordinate system, the robot 1 moves following the joint displacement detection values while keeping the body direction according to the desired gait and the body inclination corresponding with the inclination component of the posture rotational deviation's variation without any slipping of the foot 22 of the supporting leg with respect to the virtual floor in the current estimates supporting leg coordinate system.

Alternatively, based on at least any of the floor reaction force detection value obtained by the six-axis force sensor 50 and the floor reaction force of the desired gait, the deformation of the deformable mechanism (the elastic member 106, the floor contact member (foot sole elastic member) 71, the bag member 109 or the like shown in FIGS. 3 and 4) of the foot 22 is determined using a dynamics model for the deformable mechanism (for example, a spring damper model), and the estimated free leg's foot position/posture at the time of landing may be determined taking the deformation into consideration. More specifically, as shown in FIG. 13, the whole attitude of the robot 1 in the current estimated supporting leg coordinate system for the case where it is assumed that the body posture is the desired body posture, the joint displacements are the joint displacement detection values (that is, the j-th Joint displacement detection values $\theta j$, $j=1, 2, \ldots$) and the deformation of the deformable mechanism is the deformation estimated based on the floor reaction force detection value (that is, the whole attitude of the robot 1 at that instant) is determined, the free leg's foot position/posture with respect to the supporting leg (the leg 2 located toward the back of the robot 1 in FIG. 13) in the whole attitude is determined, and the free leg's foot position/posture may be considered as the estimated free leg's foot position/posture at the time of landing. Alternatively, a load on a decelerator or link may be estimated using a disturbance observer based on a motor current instruction or detection value, and the deformation of the decelerator or link may be estimated based on the estimated load, and the estimated free leg's foot position/posture at the time of landing may be determined by taking the deformation of the decelerator or link into consideration.

Alternatively, the estimated free leg's foot position/posture at the time of landing may be determined through a kinematics calculation based on at least a joint displacement of the desired gait and a compliance compensation (see Japanese Patent Laid-Open No. 10-277969 previously proposed by the applicants).

In this way, the estimated free leg's foot position/posture at the time of landing can be determined with higher precision.

Figure 13:
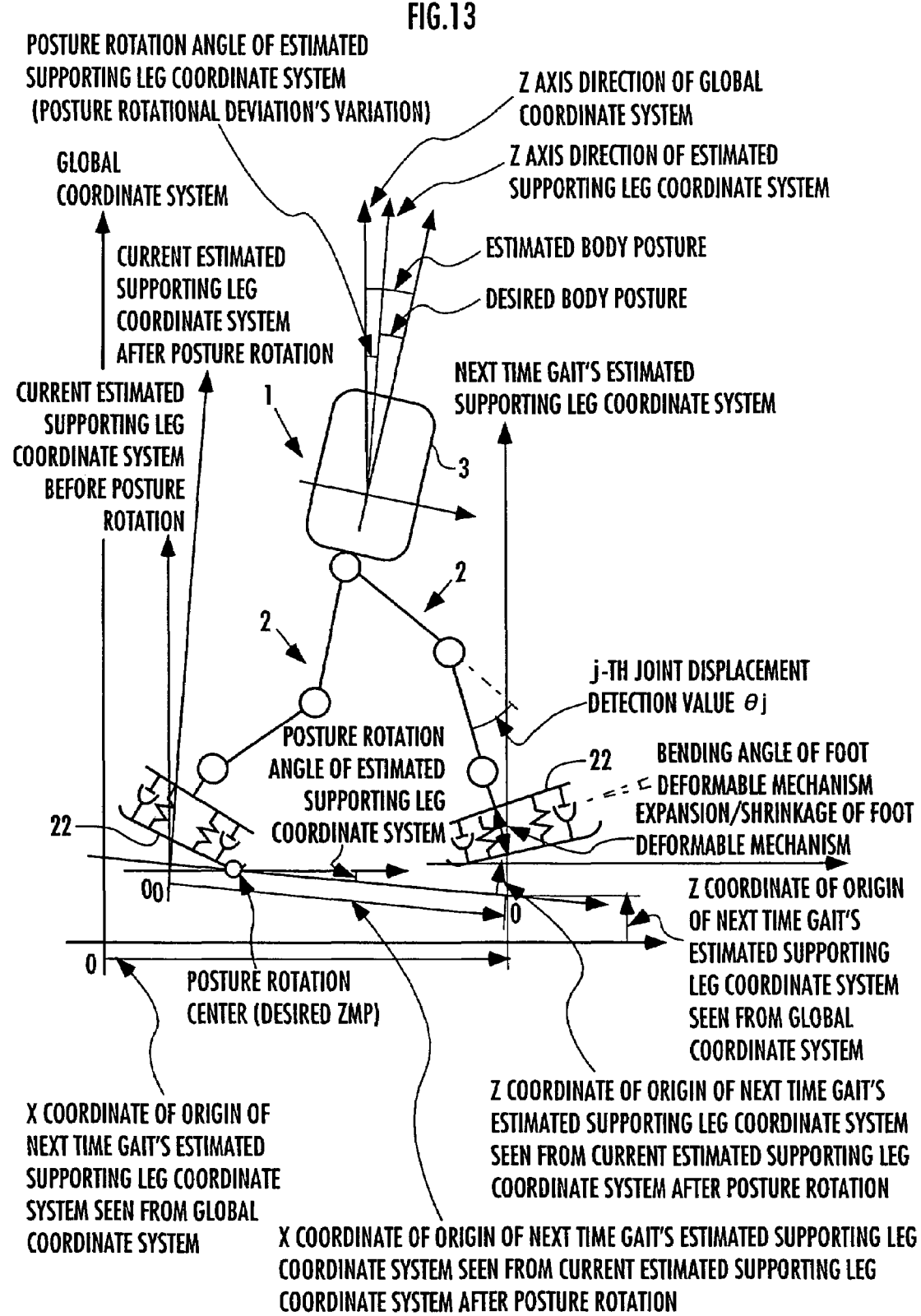
FIG. 13 is a diagram for illustrating the self position/posture estimating process according to the second embodiment.

Then, the process proceeds to step S2112, where the relative position/posture of the next time gait's estimated supporting leg coordinate system with respect to the current estimated supporting leg coordinate system is determined based on the estimated free leg's foot position/posture at the time of landing, as shown in FIG. 13. Here, the correspondence between the estimated free leg's foot position/posture at the time of landing, that is, the position/posture of the foot 22 of the supporting leg of the next time gait and the position/posture of the next time gait's estimated supporting leg coordinate system agrees with the correspondence between the foot 22 of the supporting leg and the supporting leg coordinate system as described above.

Then, the process proceeds to step S2114, where the position/posture of the next time gait's estimated supporting leg coordinate system seen from the global coordinate system is determined based on the relative position/posture of the next time gait's estimated supporting leg coordinate system with respect to the current estimated supporting leg coordinate system after being rotated and the position/posture of the current estimated supporting leg coordinate system after being rotated seen from the global coordinate system, as shown in FIG. 13.

Then, the process proceeds to step S2116, where the position/posture of the next time gait's estimated supporting leg coordinate system thus determined is substituted for the position/posture of the current estimated supporting leg coordinate system. In this way, the self-position estimating process in step S016 in FIG. 9 is completed, and then, the process proceeds to step S018, as described above.

As described above, in the second embodiment, assuming that the actual behavior of the robot 1 is a rotation of the robot 1 and the estimated supporting leg coordinate system, the estimated supporting leg coordinate system being a local coordinate system that describes the movement of the robot 1 and the robot 1 moving following at least the joint displacement detection values while keeping the body posture according to the desired gait in the estimated supporting leg coordinate system, about the predetermined posture rotation center determined by the posture rotation center determining means (in the processing in step S2106) by the posture rotational deviation's variation, which is a variation, during one step, of the difference between the posture of the body 3 detected by the posture detecting means (in the processing in step S2100) (that is, the estimated value of the actual posture) and the desired posture of the body 3, the position/posture of the new estimated supporting leg coordinate system depending on the position/posture of the free leg at the time of landing, that is, the position and orientation of the landing point of the foot 22, or in other words, the foot print is estimated for every step (for every landing).

The second embodiment described above is associated with the first to fifth, and seventh to ninth implementations of the present invention.

Now, a third embodiment of the present invention will be described with reference to FIGS. 14 and 15. The third embodiment differs from the first embodiment only in the self position/posture estimating processing in step S016 described above with reference to FIG. 9, and the other arrangements and the processings performed by the control unit 60 are the same as those according to the first embodiment.

Figure 14:
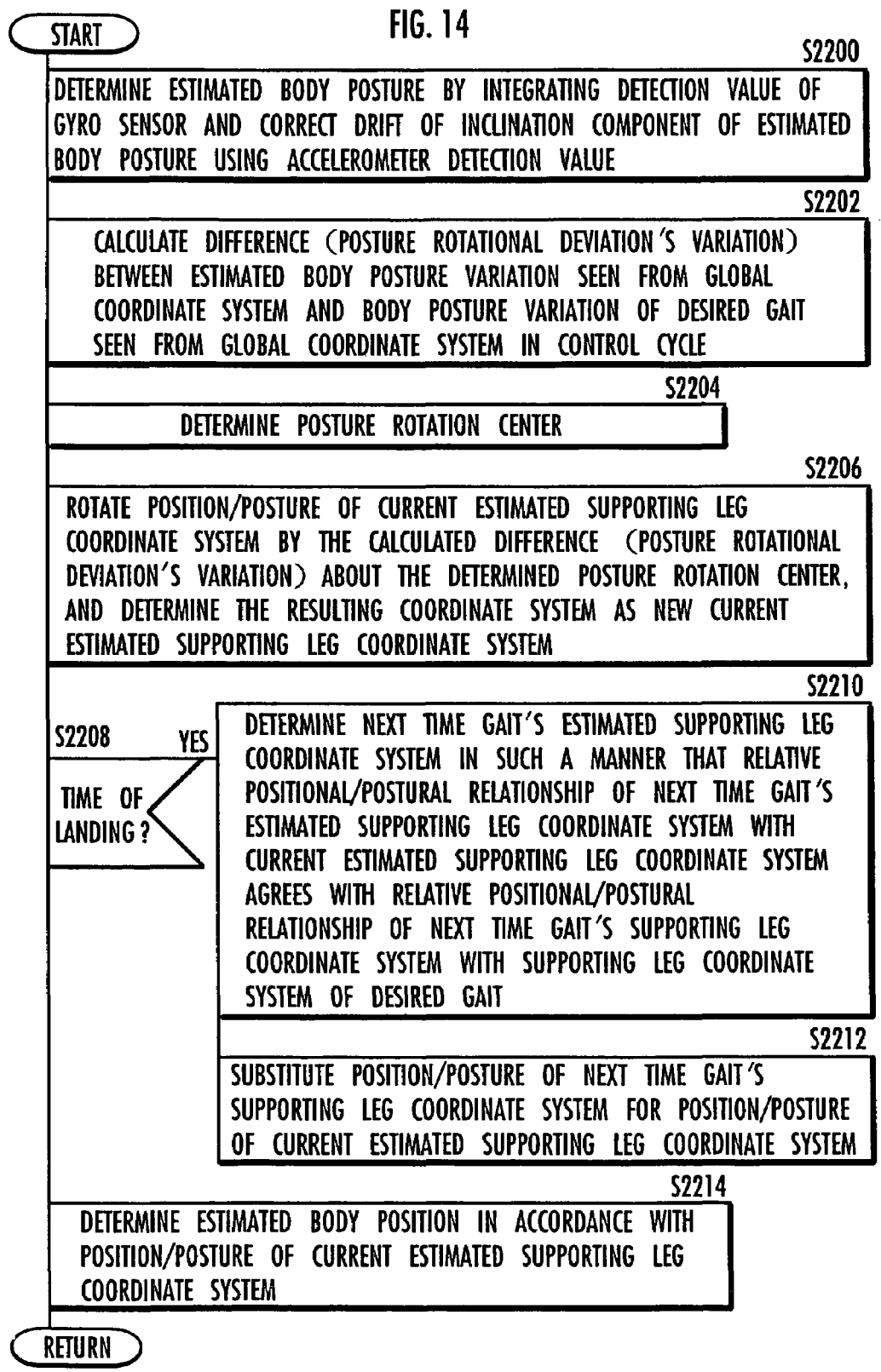
FIG. 14 is a flowchart showing a self position/posture estimating process according to a third embodiment.

FIG. 14 is a flowchart showing a self-position estimating process in step S016 in FIG. 9 according to the third embodiment.

In the third embodiment, unlike the first and second embodiments, for each control cycle, the posture rotation (or spin) of the estimated supporting leg coordinate system is estimated, so that the estimated supporting leg coordinate system is updated. In addition, the body posture is estimated at instants during each control cycle, and the body position (strictly, the position of the representative point of the body) is estimated at instants during each control cycle.

Specifically, first, in step S2200, an estimated body posture is determined, as in the first embodiment.

Then, the process proceeds to step S2202, where the difference between the variation of the estimated body posture seen from the global coordinate system in the control cycle and the variation of the body posture of the desired gait seen from the global coordinate system in the control cycle is calculated as a posture rotational deviation's variation. According to the third embodiment, the difference between the variations in the control cycle is determined as the posture rotational deviation's variation, while the difference between the variation of the estimated body posture and the variation of the body posture of the desired gait for one step is determined as the posture rotational deviation's variation in the first and second embodiments.

Then, the process proceeds to step S2204, where a posture rotation center is determined, as in the first embodiment. Specifically, the desired ZMP at that instant (that is, the current value of the desired ZMP) is determined as the posture rotation center.

Figure 15:
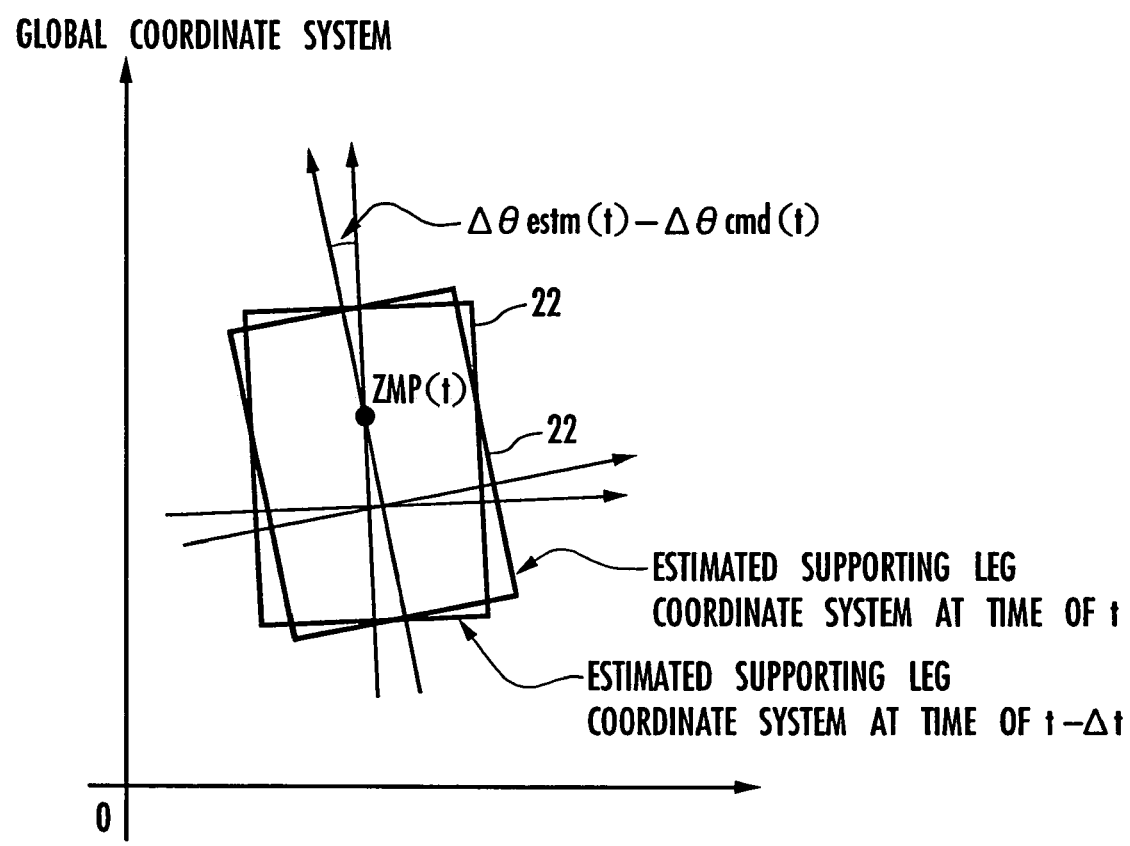
FIG. 15 is a diagram for illustrating the self position/posture estimating process according to the third embodiment.

Then, the process proceeds to step S2206, where the position/posture of the current estimated supporting leg coordinate system (that is, the estimated supporting leg coordinate system determined during the last control cycle, at the time of t-Δt shown in FIG. 15) is rotated by the posture rotational deviation's variation about the posture rotation center, and the resulting coordinate system is determined as a new current estimated supporting leg coordinate system (that is, the estimated supporting leg coordinate system at the time of t shown in FIG. 15). The rotation is achieved in the same manner as in the first embodiment.

Then, the process proceeds to step S2208, where it is determined whether it is the time of landing or not, that is, whether a gait transition is detected or not.

If the result of the determination in step S2208 is YES, the following processings are performed. Then, the process proceeds to step S2210, where a next time gait's estimated supporting leg coordinate system is determined in such a manner that the relative position/posture relationship of the next time gait's estimated supporting leg coordinate system with respect to the current estimated supporting leg coordinate system is the same as the relative position/posture relationship of the next time gait's supporting leg coordinate system with respect to the supporting leg coordinate system of the desired gait (last time gait), as in the first embodiment.

Then, the process proceeds to step S2212, where the position/posture of the next time gait's estimated supporting leg coordinate system is substituted for the position/posture of the current estimated supporting leg coordinate system, as in the first embodiment.

After the processing in step S2212 is performed, or if the result of the determination in step S2208 is NO, the process proceeds to step S2214, where the estimated body position is determined depending on the position/posture of the current estimated supporting leg coordinate system. However, the relation of the estimated body position with the current estimated supporting leg coordinate system should agree with the relation of the body position with the supporting leg coordinate system of the desired gait (the desired gait determined during the last control cycle).

Thus, the self-position estimating process in step S016 is completed, and then, the process proceeds to step S018, as described above.

As described above, in the third embodiment, it is assumed that the actual behavior of the robot is a rotation, at each instant, of the robot 1 and the estimated supporting leg coordinate system, the estimated supporting leg coordinate system being a local coordinate system that describes the movement of the robot 1 and the robot 1 moving following the desired gait in the estimated supporting leg coordinate system, about the predetermined posture rotation center at that instant determined by the posture rotation center determining means (in the processing in step S2204) at the posture rotational deviation's variation, which is the difference between the variation (variation rate) of the body posture detected by the posture detecting means (in the processing in step S2200) and the variation (variation rate) of the body posture of the desired gait. Then, on that assumption, the estimated supporting leg coordinate system and the estimated body position are newly determined (updated) at each instant (for each control cycle), and the position/posture of the new estimated supporting leg coordinate system depending on the position/posture of the free leg at the time of landing, that is, the position and orientation of the landing point of the foot, or in other words, the new foot print is estimated for every step (each time the foot lands on the floor).

This embodiment can be applied not only to the case where the robot 1 walks but also to the case where the robot 1 runs. However, when the posture rotation center is determined in step S2204 in the case where the robot 1 runs, the desired ZMP at each instant (that is, the current desired ZMP) may be used as the posture rotation center during the one-leg supporting period, while the center of gravity of the robot 1 in the desired gait at each instant (that is, the current desired gait) is determined as the posture rotation center during the floating period in which both the legs 2, 2 of the robot 1 float in the air.

In addition, when the robot 1 walks, in step S2214, based on at least the current estimated supporting leg coordinate system and the joint displacement detection values, the relationship of the body position with respect to the supporting leg coordinate system may be determined in the same manner as that in which the estimated free leg's foot position/posture at the time of landing is determined in step S2110, and the estimated body position may be determined in such a manner that the relationship of the estimated body position with respect to the estimated supporting leg coordinate system agrees with that positional relationship. In this case, the relationship among the estimated body position, the estimated supporting leg coordinate system and the joint displacement detection values is as shown in FIG. 13.

Alternatively, the relationship of the body position/posture with respect to the supporting leg coordinate system may be determined through a kinematics calculation based on at least a joint displacement of the desired gait and a compliance compensation (see Japanese Patent Laid-Open No. 10-277969 previously proposed by the applicants), and the relationship of the estimated body position/posture with respect to the estimated supporting leg coordinate system may be made to agree with the relationship thus determined.

In this way, the estimated body position/posture can be determined with higher precision.

In addition, when the robot 1 walks, step S2210 may be replaced with the processings from step S2110 to step S2114 in the second embodiment shown in FIG. 12. In this case, the estimated supporting leg coordinate system at the time of landing can be determined with higher precision.

Furthermore, step S2210 may be replaced with the processings from step S2110 to step S2114 in the second embodiment, and the estimated body position/posture may be determined through a kinematics calculation based on at least the joint displacement detection values in step S2214 as described above. In this case, as described with reference to the second embodiment, it is preferable that the estimated free leg's foot position/posture at the time of landing is determined based on the detection value of the floor reaction force taking the deformation of the foot 22 into consideration, and the next time gait's supporting leg coordinate system is determined using the estimated free leg's foot position/posture at the time of landing.

In other words, it is assumed that the actual behavior of the robot is a rotation, at each instant (in each control cycle), of the robot and the estimated supporting leg coordinate system, the estimated supporting leg coordinate system being a local coordinate system that describes the movement of the robot, and the robot moving following at least the joint displacement detection values while keeping the body posture according to the desired gait in the estimated supporting leg coordinate system, about the predetermined posture rotation center at that instant determined by the posture rotation center determining means (in the processing in step S2204) at the posture rotational deviation's variation, which is the difference between the variation (variation per control cycle, that is, the variation rate) of the body posture detected by the posture detecting means (in the processing in step S2200) and the variation (the variation per control cycle, that is, the variation rate) of the body posture of the desired gait. Then, on that assumption, the estimated supporting leg coordinate system and the estimated body position may be newly determined (updated) at each instant (for each control cycle), and the position/posture of the new estimated supporting leg coordinate system depending on the position/posture of the free leg at the time of landing, that is, the position and orientation of the new landing point of the foot, or in other words, the new foot print may be estimated for every step (for every landing).

In this way, the estimated supporting leg coordinate system at the time of landing can be determined with higher precision, and the estimated body position/posture can be prevented from being discontinuous.

The third embodiment described above is associated with the first to sixth, eighth and ninth implementations of the present invention.

Now, a fourth embodiment of the present invention will be described with reference to FIGS. 16 to 19. The fourth embodiment differs from the first embodiment only in the self position/posture estimating process in step S016 in FIG. 9, and the other arrangements and the processings performed by the control unit 60 are the same as those according to the first embodiment.

In the following, the estimated body position determined as described above with reference to the third embodiment will be referred to as a "geometrically estimated body position". The geometrically estimated body position is a position seen from the global coordinate system.

On the other hand, the position/posture of the body seen from the global coordinate system which is estimated through a well-known inertial navigation method based on the detection values of the accelerometer and the gyro sensor will be referred to as an "inertial-navigation-like estimated body position/posture". Here, the estimated body posture determined in step S2200 in the third embodiment is an inertial-navigation-like estimated body posture.

As described above with reference to the third embodiment, the geometrically estimated body position is a body position estimated geometrically with respect to the floor, and therefore, the estimation precision tends to decrease for the floating period that occurs during running or the like.

On the other hand, the inertial-navigation-like estimated body position/posture is estimated according to the same principle regardless whether the robot walks or runs or regardless of the one-leg supporting period, the two-leg supporting period or the floating period. Therefore, it does not suffer a short-term estimation precision reduction for any of the periods. However, since the estimation involves integration, a long-term drift is likely to occur.

Taking such characteristics into consideration, according to the fourth embodiment, the inertial-navigation-like estimated body position/posture is corrected with the geometrically estimated body position.

In addition, a detection drift of the gyro sensor and a drift of the inclination component of the estimated body posture are corrected using the movement acceleration of the robot 1 calculated from the movements of the geometrically estimated body position and the estimated body posture and the detection value of the accelerometer. Furthermore, depending on the circumstance, a drift in the yaw direction of the detection value of the gyro sensor is also corrected.

Figure 16:
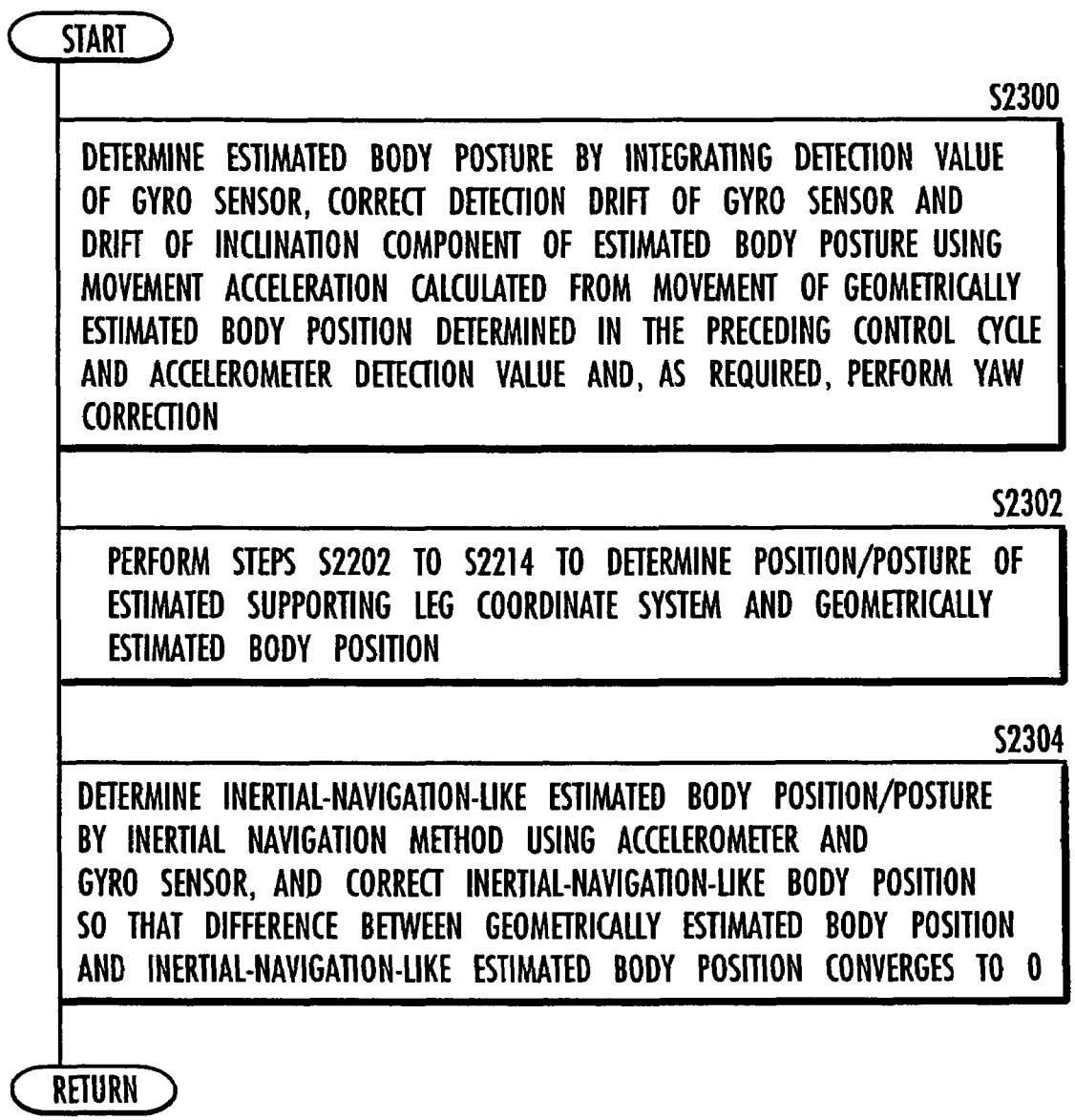
FIG. 16 is a flowchart showing a self position/posture estimating process according to a fourth embodiment.
Figure 17:
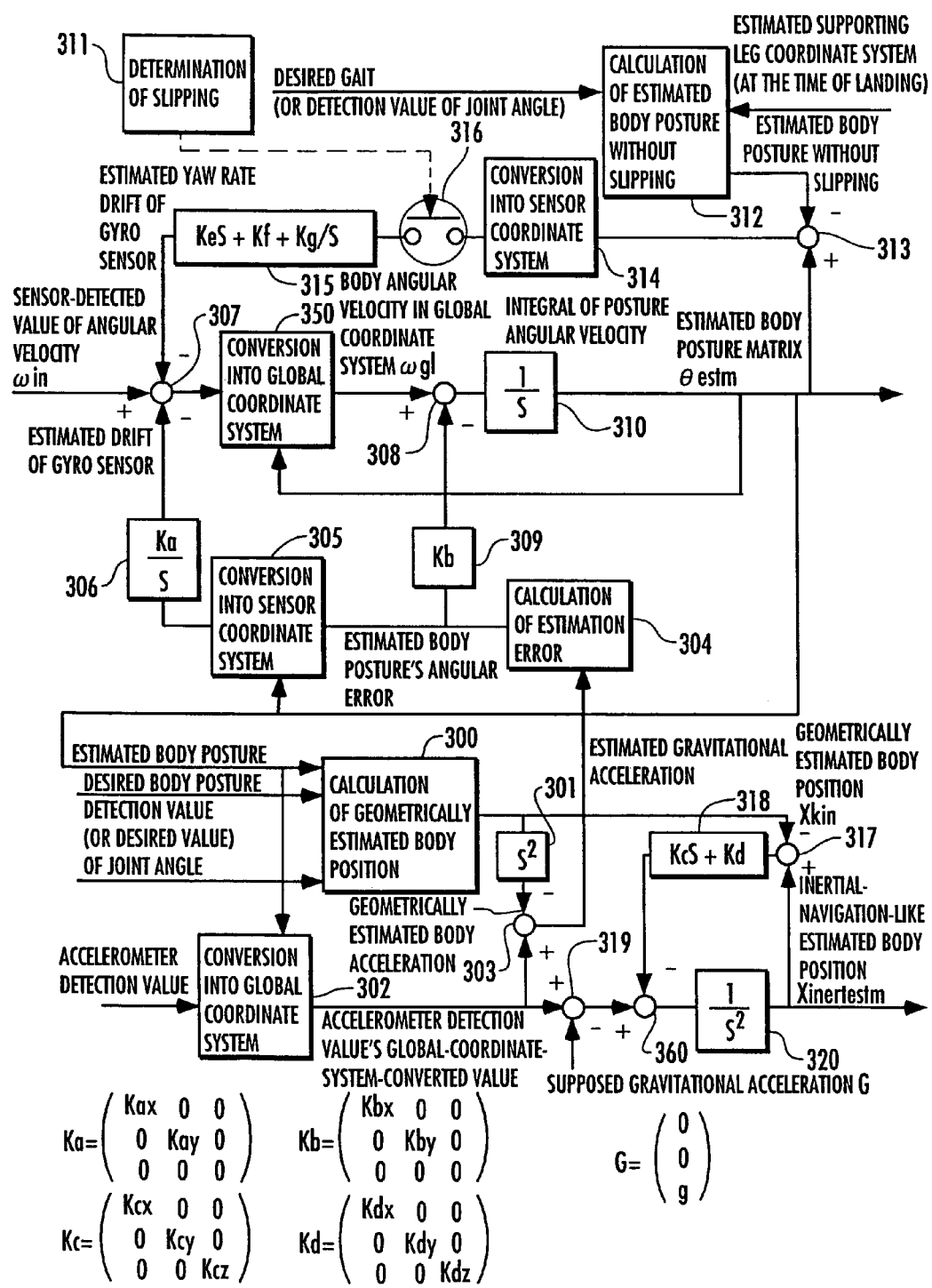
FIG. 17 is a block diagram showing essential steps of the self position/posture estimating process according to the fourth embodiment.

FIG. 16 is a flowchart showing a self-position estimating process in step S016 in FIG. 9 according to the fourth embodiment, and FIG. 17 is a block diagram for illustrating the same estimating process.

With reference to FIGS. 16 and 17, the self-position estimating process in step S016 in FIG. 9 according to the fourth embodiment will be described. First, in step S2300 in FIG. 16, the detection value of the gyro sensor is integrated to determine the estimated body posture. However, a drift of the inclination component of the estimated body posture is corrected by correcting the detection drift of the gyro sensor using the movement acceleration calculated from the movement of the geometrically estimated body position determined in a preceding control cycle (that is, the last or previous control cycle) and the detection value of the accelerometer.

A processing in step S2300 will be described in detail. First, based on the movement of the geometrically estimated body position determined in step S2302 described later during the last or previous control cycle, the geometrically estimated body acceleration, which is the second order differential of the geometrically estimated body position, is calculated. This processing is performed in a block 301 in FIG. 17. The processing of determining the geometrically estimated body position is performed in a block 300 in FIG. 17. Incidentally, if the representative point of the body agrees with the position of the accelerometer, the estimated body posture is not needed to calculate the geometrically estimated body acceleration (strictly, the acceleration of the position of the accelerometer in the body 3 estimated geometrically).

Then, the accelerometer's detection value (that is, the detection value of the body acceleration) is converted using the estimated body posture into the value in the global coordinate system, thereby determining the accelerometer's detection value's global-coordinate-system-converted value. This processing is performed in a block 302 in FIG. 17. For simplicity of description, it is assumed herein that the position of the accelerometer agrees with the representative point of the body. If the two positions don't agree with each other, the accelerometer's detection value and the gyro-sensor's detection value can be converted into an acceleration and an angular velocity at the representative point of the body, respectively, through a kinematics calculation, or the acceleration and the angular velocity at the representative point of the body can be converted into the acceleration at the position of the accelerometer and the angular velocity at the position of the gyro sensor, respectively, through a kinematics calculation.

Then, as shown in FIGS. 18(*a*) and 18(*b*), the geometrically estimated body acceleration is subtracted from the accelerometer's detection value's global-coordinate-system-converted value (that is, vector subtraction therefor is performed), thereby determining the estimated gravitational acceleration. The accelerometer's detection value's global-coordinate-system-converted value includes an acceleration component due to gravity applied to the accelerometer, while the geometrically estimated body acceleration does not include any acceleration component due to gravity. Therefore, by subtracting the geometrically estimated body acceleration from the accelerometer's detection value's global-coordinate-system-converted value, the estimated gravitational acceleration can be determined. This processing is performed in a block 303 in FIG. 17. Here, FIG. 18(*a*) shows a case where there is no error in the estimated body posture, and FIG. 18(*b*) shows a case where there is an error in the estimated body posture (in the following, this error will be referred to as an estimated body posture error, or an estimated body posture's angular error).

On the other hand, as shown in FIGS. 18(*a*) and 18(*b*), the gravitational acceleration that is supposed to occur in the vertical direction (that is, the Z axis direction) of the global coordinate system estimated by the robot 1 based on the estimated body posture is referred to as a supposed gravitational acceleration.

As described above, the geometrically estimated body acceleration is described in the global coordinate system. Besides, the actual robot 1 moves following the desired gait on the assumption that the estimated body posture is a correct estimation of the actual body posture. In other words, the robot moves following the desired gait on the estimated global coordinate system on the assumption that the global coordinate system is correctly estimated based on the estimated body position/posture. More strictly, in the self position/posture estimating process by the robot 1, the global coordinate system estimated based on the estimated body position/posture is assumed to be a correct one, and it is assumed that the actual behavior of the robot 1 is a rotation of the robot 1 and the estimated supporting leg coordinate system, the estimated supporting leg coordinate system being a local coordinate system set on the global coordinate system assumed to be correct, and the robot 1 moving following the desired gait in the estimated supporting leg coordinate system, about the predetermined posture rotation center at that instant determined by the posture rotation center determining means at the posture rotational deviation's variation, which is the difference between the variation rate of the body posture obtained (detected or estimated) at each instant by the posture detecting means and the variation rate of the body posture of the desired gait.

Therefore, if the estimated body posture is correct, and there is no error in the accelerometer's detection value, the supposed gravitational acceleration agrees with the estimated gravitational acceleration as shown in FIG. 18(a).

On the other hand, even when there is no error in the accelerometer's detection value, if there is an error in the estimated body posture, the direction of the supposed gravitational acceleration deviates from the direction of the estimated gravitational acceleration by the estimated body posture's angular error, as shown in FIG. 18(b). That is, the following formula 42 holds.

estimated body posture's angular error=angle between supposed gravitational acceleration and estimated gravitational acceleration   formula 42

As shown in FIGS. 18(a) and 18(b), the difference between the estimated gravitational acceleration and the supposed gravitational acceleration is referred to as an estimated gravitational acceleration error. Then, from the relationship described above, if there is no error in the accelerometer's detection value, the estimated gravitational acceleration error is caused by the error in the estimated body posture, and there is a relationship represented by the following formula 43 between the horizontal component of the estimated gravitational acceleration error seen from the global coordinate system estimated by the robot 1 based on the estimated body posture (that is, the component of the estimated gravitational acceleration perpendicular to the supposed gravitational acceleration) and the estimated body posture's angular error. However, the formula 43 represents a relationship between the back-and-forth-directional component (X component) of the estimated gravitational acceleration error and the component of the estimated body posture's angular error about the Y axis. To represent a relationship between the sideward-directional component (Y component) of the estimated gravitational acceleration error and the component of the estimated body posture's angular error about the X axis, the minus sign in the right side is eliminated. Here, the gravitational acceleration is a positive value.

horizontal component of estimated gravitational acceleration error=−tan (estimated body posture's angular error)*gravitational acceleration   formula 43

According to this embodiment, the estimated body posture is corrected so as to make the estimated body posture error converge to 0 using the estimated body posture's angular error calculated using the formula 42 or 43.

Returning to description of step S2300, the estimated body posture's angular error is calculated from the angle between the supposed gravitational acceleration and the estimated gravitational acceleration at the current instant (strictly, at the instant one control cycle before) using the formula 42. Alternatively, the estimated body posture's angular error may be calculated from the horizontal component of the estimated gravitational acceleration error at the current instant (strictly, at the instant one control cycle before) using the formula 43. The calculation of the estimated body posture's angular error is performed in a block 304 in FIG. 17.

Then, the estimated body posture's angular error is converted into a value in a sensor coordinate system (that is, a coordinate system with the coordinate axes corresponding with the detection axes of the gyro sensor) in a block 305 in FIG. 17, and then, the converted value multiplied with an integral gain Ka is integrated in a block 306, thereby determining the estimated gyro-sensor drift (the estimated value of a gyro-sensor drift). Furthermore, the estimated gyro-sensor drift is subtracted from a gyro-sensor detection value ω in (that is, a detection value of the body angular velocity) in a block 307, thereby determining the angular velocity with the drift corrected. In the block 307, subtraction of a yaw rate drift is also appropriately performed, and this will be described later. Then, the angular velocity with the drift corrected is converted into a value in the global coordinate system using the estimated body posture in a block 350, thereby determining the body angular velocity ωgl in the global coordinate system.

Then, the estimated body posture's angular error is multiplied with a gain Kb in a block 309 in FIG. 17, the resulting value is subtracted from the body angular velocity ωgl in the global coordinate system in a block 308, and the resulting value (that is, the output from the block 308) is integrated in a block 310 (an integrator), thereby determining a new estimated body posture θestm.

The estimated body posture θestm, the angular velocity and the like are represented by a quaternion, a rotation matrix, an Euler angle or the like.

In the case where the gyro-sensor drift is estimated (that is, the estimated gyro-sensor drift is determined) in the manner described above, in order to achieve the estimation adequately, it is an essential condition that the components of the value (vector) in the sensor coordinate system which is converted from the estimated body posture's angular error (that is, the estimated body posture's angular errors about the respective sensor detection axes, or in other words, the sensor's local estimated body posture's angular errors) are affected only by the drift of the relevant gyro sensor and are not or little affected by the drifts of the other gyro sensors.

In other words, it is an essential condition that the error of the estimated body posture's angular error about the X(Y) axis is affected by the drift of the X(Y)-axis gyro sensor but not affected by the drift of the Y(X)-axis gyro sensor.

If the body is rotated 90 degrees about the Z axis of the sensor coordinate system immediately after the component of the estimated body posture's angular error about the X axis occurs by the effect of the drift of the X-axis gyro sensor, the estimated body posture's angular error remains accumulated in the global coordinate system, and, thus, the sensor's local component of the estimated body posture's angular error about the X axis becomes the sensor's local component of the estimated body posture's angular error about the Y axis. Therefore, in order to meet the essential condition, it is necessary that the absolute value of the rotational velocity about the Z axis of the sensor coordinate system is adequately small.

Thus, if the absolute value of the Z-axis (body's-vertical-axis) gyro sensor's detection value is large, it is desirable that the integral gain Ka is reduced or brought to 0 (that is, the drift correction for the gyro sensor is not performed).

Furthermore, in general, when the robot 1 moves or works, the longitudinal axis (trunk axis) of the body 3 is vertical or nearly vertical, and therefore, the body angular velocity ωglz in the global coordinate system, which is a value in the global coordinate system converted from the detection value of the angular velocity of the gyro sensor, is close to the detection value of the angular velocity of the Z-axis gyro sensor.

Figure 19:
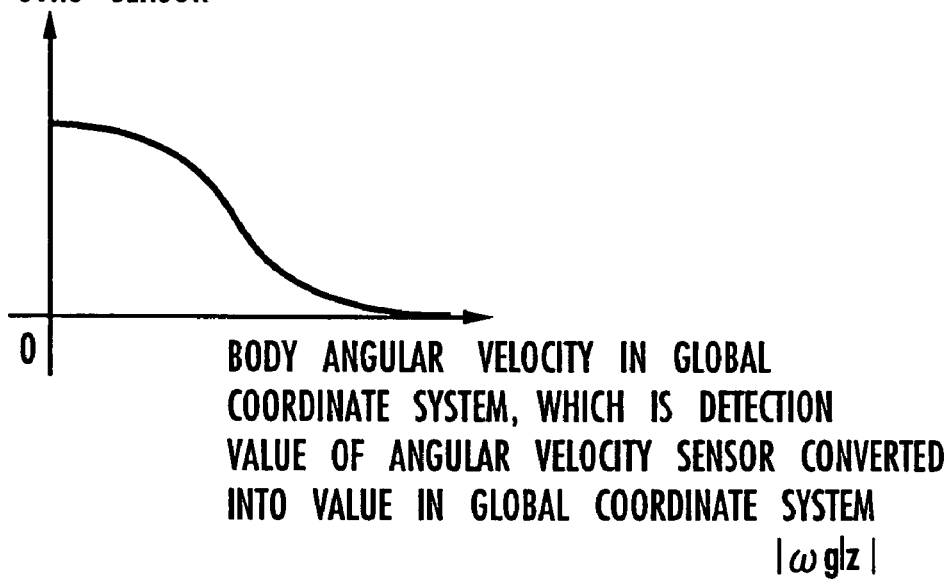
FIG. 19 is a graph showing an exemplary setting of a gain used in the forth embodiment.

Thus, as shown in FIG. 19, if the absolute value of the component ωglz of the angular velocity about the vertical axis in the global coordinate system, which is a value in the global coordinate system converted from the detection value of the angular velocity of the gyro sensor, is large, the integral gain Ka may be reduced or brought to 0 (that is, the drift correction for the gyro sensor may not be performed).

In addition, if the absolute value of the component of the rotation velocity of the body 3 in the desired gait about the vertical axis or the longitudinal axis of the body 3, rather than the absolute value of the detection value of the angular velocity of the gyro sensor, is large, the integral gain Ka may be reduced or brought to 0 (that is, the drift correction for the gyro sensor may not be performed).

In summary, if the absolute value of the component of the body's rotation velocity about the vertical axis or the longitudinal axis of the body 3 which is determined based on at least any of the detection value of the angular velocity of the gyro sensor and the desired gait is large, that can be addressed by reducing the integral gain Ka or bringing the same to 0 (that is, omitting the drift correction for the gyro sensor).

Furthermore, if the absolute value of the value resulting from subtraction of the supposed gravitational acceleration from the accelerometer's detection value's global-coordinate-system-converted value, or the absolute value of the geometrically estimated body acceleration is large, the error of the estimated gravitational acceleration tends to increase due to a detection error of the sensor or insufficient rigidity of the main body of the robot 1. Thus, it is preferable that the gain Ka is reduced or brought to 0.

In addition, as described above, the actual robot 1 moves following the desired gait on the estimated global coordinate system on the assumption that the global coordinate system is correctly estimated based on the estimated body position/posture. Therefore, when the supporting leg is in contact with the floor, even if there is a significant error in the estimated body posture, the actual body acceleration is not affected by the actual gravitational acceleration and substantially agrees with the geometrically estimated body acceleration on the estimated global coordinate system. On the other hand, during the floating period, the actual body acceleration increases with the actual gravitational acceleration, and therefore, the direction thereof deviates from the direction of the geometrically estimated body acceleration on the estimated global coordinate system, and thus, the relationship shown in FIG. 18(*b*) does not hold. Thus, during the floating period, the precision of the geometrically estimated body position tends to be lowered, compared with the precision of the body position determined by the inertial navigation method using a relatively precise accelerometer and relatively precise gyro sensor. Therefore, also during the floating period, the gain Ka is preferably reduced or brought to 0.

Besides, in the case where the body position is estimated taking a deformation of the foot 22 into consideration as described above, even in a period other than the floating period, a significant error is likely to occur in the estimation of the deformation of the part near the sole of the foot if the foot 22 at the end of the leg is not in adequate contact with the floor, and therefore, the precision of the geometrically estimated body acceleration decreases. Therefore, also in the case where the contact surface between the foot 22 of the supporting leg and the floor is small, the gain Ka is preferably reduced or brought to 0.

Specifically, a "state where the foot 22 of the leg 2 is in adequate contact with the floor" refers to a state where at least any one of the conditions described below is satisfied or where some of the conditions are satisfied simultaneously:

(a) a condition where the contact surface between the bottom surface of the foot 22 and the floor is large, for example, a condition where the foot 22 is in intimate contact with the floor (that is, a flat contact condition);

(b) a condition where the distribution of the pressure of the floor reaction force is relatively uniform;

(c) a condition where the foot is in contact with the floor at many contact points;

(d) a condition where the desired ZMP (or the actual floor reaction force's central point) is located at or close to the center of the foot 22;

(e) a condition where the contact pressure or the floor reaction force is high; and (f) a condition where the variation rate of the position/posture of the foot 22 is small, or more strictly, a condition where the variation of the relative position/posture relationship between the bottom surface of the foot 22 and the floor is small.

Determination of whether the conditions described above are satisfied or not can be achieved based on the period (phase) in the desired gait, the desired ZMP, or the detection value of the floor reaction force, for example. Alternatively, determination of whether the conditions are satisfied or not may be achieved based on detection values of a pressure distribution sensor or a contact sensor, although they are not provided in this embodiment.

To summarize the gain determination method described above, when the absolute value of the component of the body's rotation velocity about the vertical axis or the longitudinal axis of the body 3 which is determined based on at least any of the detection value of the angular velocity of the gyro sensor and the desired gait is large, when the absolute value of the value resulting from subtraction of the supposed gravitational acceleration from the accelerometer's detection value's global-coordinate-system-converted value, or the absolute value of the geometrically estimated body acceleration, is large, when it is in the floating period, or when the end portion (foot) of the leg is not in adequate contact with the floor, it is preferable that the gain Ka is reduced or brought to 0.

That is, it is preferable that the integral gain Ka is determined by comprehensively taking such conditions into consideration.

Alternatively, the integral gain Ka may be determined based on an instantaneous value or a long-term tendency of such conditions.

For the same reason, the integral gain Kb is preferably determined in the same manner as the integral gain Ka.

In step S2300 according to this embodiment, in addition to the processings described above, yaw rate correction (drift correction in the yaw direction) is also conducted, depending on the circumstance.

First, it is determined whether to perform the yaw rate correction or not in a block 311 in FIG. 17.

Specifically, at least one of the conditions described below is selected as a determination condition, it is determined to perform the yaw rate correction if the conditions is satisfied:
(a) a condition where the absolute value of the detected floor reaction force's moment about the vertical axis (or the differential value thereof) is equal to or lower than a predetermined value;
(b) a condition where the desired movement is a substantially static one;
(c) a condition where the foot sole is in adequate contact with the floor and it is considered that there is no slipping between them;
(d) a condition where the absolute value of the difference between the posture angular velocity of the desired gait and the gyro detection value (posture angular velocity's detection value) is equal to or lower than a predetermined value;
(e) a condition where the absolute value of the posture angular velocity of the desired gait is equal to or lower than a predetermined value; and
(f) a condition where the absolute value of the gyro detection value (posture angular velocity's detection value) is equal to or lower than a predetermined value.

Primarily, when slipping (rotational slipping) does not or hardly occur on the contact surface between the foot 22 of the supporting leg and the floor, it is determined to perform the yaw rate correction.

Here, the gyro detection value in the conditions (d) and (f) is desirably a value obtained by yaw-rate-correcting the gyro-sensor's detection value (that is, the detection value of the posture angular velocity represented by the unprocessed output of the gyro sensor).

If it is determined to perform the yaw rate correction, as shown in FIG. 17, in a block 312, the body posture for the case where it is assumed that no slipping occurs between the foot 22 associated with the estimated supporting leg coordinate system and the floor (hereinafter, referred to as an estimated body posture with out slipping) is calculated based on at least any of the desired gait, the desired body posture, the desired joint displacements and the joint detection values and the latest estimated supporting leg coordinate system stored at the time of landing (hereinafter, referred to as an estimated supporting leg coordinate system at the time of landing). Then, the difference between the estimated body posture and the estimated body posture without slipping is determined in a block 313, the difference is converted into a value in the sensor coordinate system, and the resulting value is input to a block 315 of a feedback control law, thereby determining the yaw rate drift. For example, the feedback control law of the block 315 may be a PID control law, and the yaw rate drift is determined by summing the time differential value (or a variation of the difference in the control cycle) of the difference (that is, the output of the block 314) multiplied with again Ke, the value of the difference (the output of the block 314) multiplied with a gain Kf, and the integral value of the difference (the output of the block 314) multiplied with a gain Kg. Then, the yaw rate drift thus determined is subtracted from the sensor-detected angular velocity value ωin in the block 307. If it is determined not to perform the yaw rate correction, the input to the block 315 of the feedback control law is blocked (a switch 316 in FIG. 17 is opened), so that the last yaw rate drift value is retained, and the value is subtracted from the sensor-detected angular velocity value ωin. Alternatively, as in the case of estimating the position/posture of the foot of the free leg at the time of landing in step S2110 in FIG. 12, the estimated body posture without slipping may be determined by determining the deformation of the deformable mechanism (the elastic member 106, the floor contact member (foot sole elastic member) 71, the bag member 109 or the like shown in FIGS. 3 and 4) of the foot 22 using a dynamics model for the deformable mechanism (for example, a spring damper model) based on the floor reaction force detection value and/or the floor reaction force of the desired gait and taking into consideration the deformation. Alternatively, a load on a decelerator or link may be estimated using a disturbance observer based on a motor current instruction or detection value, and the deformation of the decelerator or link may be estimated based on the estimated load, and the estimated body posture without slipping may be determined by taking the deformation of the decelerator or link into consideration.

Alternatively, the estimated free leg's foot position/posture at the time of landing may be determined through a kinematics calculation based on at least a joint displacement of the desired gait and a compliance compensation (see Japanese Patent Laid-Open No. 10-277969 previously proposed by the applicants).

In this way, the estimated free leg's foot position/posture at the time of landing can be determined with higher precision.

Referring back to FIG. 16, once the processing in step S2300 is completed as described above, the process proceeds to step S2302, where the steps S2202 to S2214 in FIG. 14 according to the third embodiment are performed to determine the position/posture of the estimated supporting leg coordinate system and the geometrically estimated body position. As described concerning the third embodiment, the processing of step S2210 in FIG. 14 may be replaced with the processings from step S2110 to step S2114 in the second embodiment, and the estimated body position/posture may be determined through a kinematics calculation based on at least the joint displacement detection values in step S2214 as described above. In this case, as described with reference to the second embodiment, it is preferable that the estimated free leg's foot position/posture at the time of landing is determined based on the detection value of the floor reaction force taking the deformation of the foot 22 into consideration, and the next time gait's supporting leg coordinate system is determined using the estimated free leg's foot position/posture at the time of landing.

Then, the process proceeds to step S2304, where the inertial-navigation-like estimated body position/posture is determined by the inertial navigation method using the accelerometer and the gyro sensor, and the inertial-navigation-like body position is corrected so as to make the difference between the geometrically estimated body position and the inertial-navigation-like estimated body position converge to 0.

Specifically, as shown in FIG. 17, the difference between the last time value of the inertial-navigation-like estimated body position Xinertestm and the geometrically estimated body position is determined in a block 317, and the sum of the time differential value (or a variation of the difference in the control cycle) of the difference multiplied with a gain Kc and the value of the difference multiplied with a gain Kd is determined in a block 318. That is, the sum described above is determined from the difference described above according to the PD control law, a feedback control law. In addition, the difference between the accelerometer's detection value's global-coordinate-system-converted value, which is output from the block 302, and the supposed gravitational acceleration G is determined in a block 319. Then, the sum (output from the block 318) is subtracted from the difference (output from the block 319) in a block 360, and the resulting value is integrated two times in a block 320, thereby determining a new inertial-navigation-like estimated body position Xinertestm.

Here, the gains Kc and Kd are preferably small or 0 if a significant error is likely to occur in the geometrically estimated body position. If the contact surface between the bottom surface of the foot 22 of the supporting leg and the floor is small, a significant error occurs in the geometrically estimated body position. Therefore, in the case where the contact surface between the bottom surface of the foot 22 of the supporting leg and the floor is small, the gains Kc and Kd are preferably small or 0. In particular, when the foot 22 is in intimate contact with the floor (that is, in a flat contact condition), the gains Kc and Kd are preferably large.

Thus, in the case where the robot runs, for example, the correction gains Ka, Kb, Kc and Kd are preferably set high during the period in which the entire foot sole is in contact with the floor and set to 0 or substantially 0 during the floating period, as shown in the graph of the correction gain K in FIG. 8(c). It is to be noted that the graph of the correction gain K in FIG. 8(c) shows only the tendency of variations of the gains Ka, Kb, Kc and Kd but does not show the specific values thereof. In addition, in FIG. 8(c), the graph is normalized so that the maximum value of the correction gain K is 1. Therefore, the correction gain K can be considered to mean a reducer (attenuator) for the correction gains Ka, Kb, Kc and Kd.

In this embodiment, the estimated body posture is corrected based on the estimated body posture error calculated using the formula 42 or 43. However, the estimated body posture can also be corrected directly based on the horizontal component of the estimated gravitational acceleration error without using the formulas 42 and 43. That is, instead of the formula 43, the following formula 44 can be used.

horizontal component of estimated gravitational acceleration error=−estimated body posture angular error*gravitational acceleration     formula 44

To be more specific about setting of the gain Ka, during the floating period, the whole robot 1 seen from the coordinate system moving in a parabola with the robot 1 can be regarded as being in a state of weightless regardless of the value of the estimated body posture error, and the output of the accelerometer is not affected by the estimated body posture error. Therefore, the estimated gravitational acceleration always substantially agrees with the supposed gravitational acceleration if the following conditions are satisfied: the accelerometer has a high detection precision; the actual robot 1 can follow the desired gait with a high accuracy; the robot 1 has a high rigidity; and the parameters of the dynamics model for the robot used for generating the desired gait substantially agree with those of the actual robot 1 (hereinafter, these conditions will be collectively referred to as a condition A). Strictly, the estimated gravitational acceleration and the supposed gravitational acceleration equally deviate from their respective true values depending on the estimated body posture error, so that the estimated gravitational acceleration and the supposed gravitational acceleration always substantially agree with each other. Thus, essentially, the direction of gravity cannot be estimated during the floating period. However, since the estimated gravitational acceleration and the supposed gravitational acceleration always substantially agree with each other, the estimated body posture error at such an instant is substantially 0. Thus, even if the gain Ka is not set to a small value, the correction amount, which is the product of the estimated body posture error and the gain Ka, is also substantially 0, so that it is unlikely to affect significantly the estimated body posture.

In addition, if the condition A is satisfied, keeping the gain Ka constant may increase the precision of a low frequency component (DC component) of the estimated body posture. This is because, in the arrangement in which the error is corrected in such a manner that the integral value of the product of the error and the gain Ka is 0 as described above, if the gain Ka is kept constant, a long-term average value of the horizontal component of the estimated gravitational acceleration error is theoretically 0, and when the estimated body posture error is 0, a long-term average value of the horizontal component of the estimated gravitational acceleration error is theoretically 0. However, it is typically difficult to satisfy the condition A, and therefore, the gain Ka is preferably set as shown in FIG. 8(c).

The fourth embodiment described above is associated with the first to sixth, and eighth to twenty-second implementations of the present invention.

Figure 21:
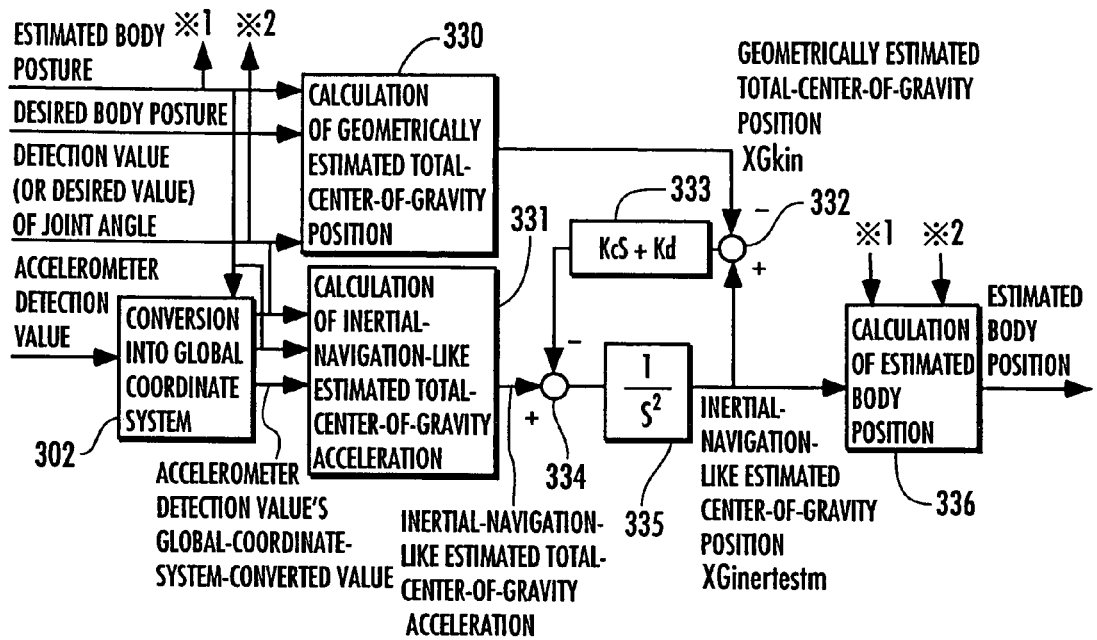
FIG. 21 is a block diagram showing essential steps of the self position/posture estimating process according to the fifth embodiment.

Now, a fifth embodiment of the present invention will be described. The fifth embodiment will be described with reference to FIGS. 20 and 21. FIG. 20 is a flowchart showing a self-position estimating process in step S016 in FIG. 9 according to the fifth embodiment, and FIG. 21 is a block diagram showing means for estimating a total center of gravity used in the self-position estimating process in step S016 according to the fifth embodiment. In the fifth embodiment, an inertial-navigation-like estimated total-center-of-gravity position XGinertestm, described later, is determined for each control cycle, instead of the inertial-navigation-like estimated body position Xinertestm determined in the fourth embodiment. The other part of the process is the same as in the fourth embodiment. In FIG. 21, same sections as those in FIG. 17 are assigned the same reference numerals as those in FIG. 17.

With reference to FIGS. 20 and 21, the self-position estimating process in step S016 according to the fifth embodiment will be described. First, as in step S2300 in FIG. 16 according to the fourth embodiment, in step S2400 in FIG. 20, the detection value of the gyro sensor is integrated to determine the estimated body posture, and a detection drift of the gyro sensor and a drift of the inclination component of the estimated body posture are corrected.

Then, the process proceeds to step S2402, where the processings in steps S2204 to S2214 shown in FIG. 14 are conducted to determine the position/posture of the estimated supporting leg coordinate system and the geometrically estimated body position.

Then, the process proceeds to step S2404, where the total-center-of-gravity position is determined through a kinematics calculation based on the position/posture of the estimated supporting leg coordinate system, the desired body position/posture (or the geometrically estimated body position) and the joint displacement detection values (or the desired values thereof), taking the actual behavior (posture rotation) of the robot as in the third embodiment. This processing is performed in a block 330 in FIG. 21. The total-center-of-gravity position thus calculated is referred to as a geometrically estimated total-center-of-gravity position.

Then, the process proceeds to step S2406, where the acceleration of the total center of gravity is calculated through a kinematics calculation based on the joint angle detection values (or the desired values thereof), the estimated body posture (or the desired body posture) and the accelerometer's detection value's global-coordinate-system-converted value. This processing is performed in a block 331 in FIG. 21. In the following, the acceleration of the total center of gravity is referred to as an inertial-navigation-like estimated total-center-of-gravity acceleration.

Then, the process proceeds to step S2408, where the inertial-navigation-like estimated total-center-of-gravity position XGinertestm is determined by the inertial navigation method based on the inertial-navigation-like estimated total-center-of-gravity acceleration, and the inertial-navigation-like estimated total-center-of-gravity position is corrected so as to make the difference between the geometrically estimated total-center-of-gravity position and the inertial-navigation-like estimated total-center-of-gravity position converge to 0. More specifically, as shown in FIG. 21, the difference between the inertial-navigation-like estimated total-center-of-gravity position XGinertestm determined in a preceding control cycle (that is, the last or previous control cycle) and the geometrically estimated body position is determined in a block 332, and the sum of the time differential value (or a variation of the difference in the control cycle) of the difference multiplied with the gain Kc and the value of the difference multiplied with the gain Kd is determined in a block 333. That is, the sum described above is determined from the difference described above according to the PD control law, a feedback control law. Then, the sum (output from the block 333) is subtracted from the inertial-navigation-like estimated total-center-of-gravity acceleration output from the block 331 in a block 334, and the resulting value is integrated two times in a block 335, thereby determining a new inertial-navigation-like estimated total-center-of-gravity position XGinertestm.

Finally, the process proceeds to step S2410, where the estimated body position in the global coordinate system is determined based on the inertial-navigation-like estimated total-center-of-gravity position, the joint displacement detection values (or the desired values thereof) and the estimated body posture (or the desired body posture). This processing is performed in a block 336 in FIG. 21.

Described above is the self-position estimating process in step S016 in FIG. 9 according to the fifth embodiment.

According to the fifth embodiment, it may be determined whether it is in the floating period or not, and if it is determined to be in the floating period, the inertial-navigation-like estimated total-center-of-gravity acceleration may be determined, without using the accelerometer, on the assumption that the total center of gravity moves in a parabola.

If it is evident that the robot 1 is not subjected to any external force from the environment, the total center of gravity moves in a parabola during the floating period, and therefore, the total-center-of-gravity position can be estimated with a higher precision.

Determination of whether it is in the floating period or not can be achieved using at least one of the period (phase) in the desired gait, the floor reaction force of the desired gait, and the detection value of the floor reaction force.

In particular, if it is desirable that the estimation precision of the total center of gravity is as high as possible, whether it is in the floating period or not can be determined based on whether the detection value of the floor reaction force is equal to or lower than a predetermined value or not.

The fifth embodiment described above is associated with the first to sixth, and eighth to twenty-second implementations of the present invention.

Figure 22:
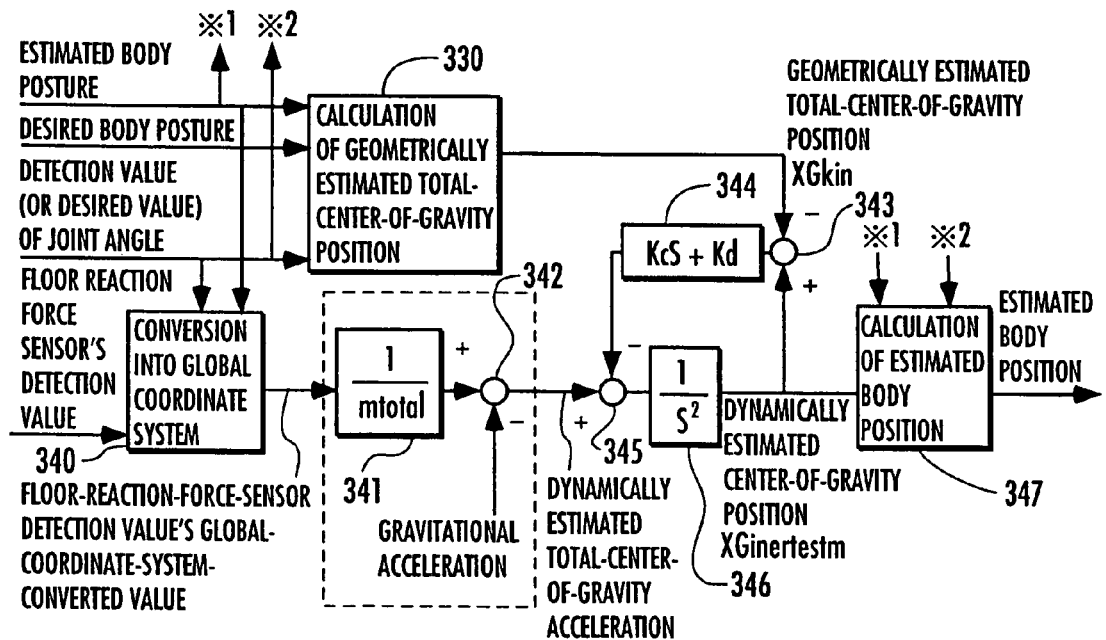
FIG. 22 is a block diagram showing essential steps of a self position/posture estimating process according to a sixth embodiment.

Now, a sixth embodiment of the present invention will be described with reference to FIGS. 22. FIG. 22 is a block diagram showing means for estimating a total center of gravity used in the self-position estimating process in step S016 in FIG. 9 according to the sixth embodiment.

According to the sixth embodiment, a dynamically estimated total-center-of-gravity position is calculated based on the detection value of the floor reaction force detected by the six-axis force sensor (floor reaction force sensor) 50, instead of the inertial-navigation-like estimated total-center-of-gravity position determined based on the detection value of the accelerometer in the fifth embodiment. The other part is the same as in the fifth embodiment. In FIG. 22, same sections as those in FIG. 21 are assigned the same reference numerals as those in FIG. 21.

With reference to FIG. 22, a process of estimating the total-center-of-gravity position for each control cycle will be described. First, in a block 340, the detection value of the floor reaction force sensor (six-axis force sensor 50) is converted into a value in the global coordinate system using the joint angle detection values (or the desired values thereof) and the estimated body posture (or the desired body posture). In the following, the converted detection value of the floor reaction force sensor will be referred to as a floor-reaction-force-sensor's detection value's global-coordinate-system-converted value.

Then, the floor-reaction-force-sensor's detection value's global-coordinate-system-converted value is divided by the total mass of the robot 1 in a block 341, and, in a block 342, the gravitational acceleration is subtracted from the resulting value, thereby determining the estimated value of the total-center-of-gravity acceleration. In the following, the total-center-of-gravity acceleration will be referred to as a dynamically estimated total-center-of-gravity acceleration.

Then, as in the fifth embodiment, the geometrically estimated total-center-of-gravity position is determined in the block 330.

Then, the dynamically estimated total-center-of-gravity position is determined by integrating the dynamically estimated total-center-of-gravity acceleration two times, and the dynamically estimated total-center-of-gravity position is corrected so as to make the difference between the geometrically estimated total-center-of-gravity position and the inertial-navigation-like estimated total-center-of-gravity position converge to 0.

More specifically, as shown in FIG. 22, the difference between the dynamically estimated total-center-of-gravity position determined in a preceding control cycle (that is, the last or previous control cycle) and the geometrically estimated total-center-of-gravity position is determined in a block 343, and the sum of the time differential value (or a variation of the difference in the control cycle) of the difference multiplied with the gain Kc and the value of the difference multiplied with the gain Kd is determined in a block 344. That is, the sum described above is determined from the difference described above according to the PD control law, a feedback control law. Then, the sum (output from the block 344) is subtracted from the dynamically estimated total-center-of-gravity acceleration output from the block 342 in a block 345, and the resulting value is integrated two times in a block 346, thereby determining a new dynamically estimated total-center-of-gravity position XGinertestm.

Finally, in a block 347, the body position in the global coordinate system is determined based on the dynamically estimated total-center-of-gravity position, the joint displacement detection values (or the desired values thereof) and the estimated body posture (or the desired body posture).

Described above is the means for estimating the total center of gravity and the body position used in the self-position estimating process in step S016 according to the sixth embodiment.

According to the sixth embodiment, it may be determined whether it is in the floating period or not, and if it is determined to be in the floating period, the dynamically estimated total-center-of-gravity acceleration may be determined, without using the detection value of the floor reaction force sensor, on the assumption that the total center of gravity moves in a parabola.

If it is evident that the robot is not subjected to any external force from the environment, the total center of gravity moves in a parabola during the floating period, and therefore, the total-center-of-gravity position can be estimated with a higher precision.

Determination of whether it is in the floating period or not can be achieved using at least one of the period (phase) in the desired gait, the floor reaction force of the desired gait, and the detection value of the floor reaction force.

In particular, if it is desirable that the estimation precision of the total center of gravity is as high as possible, whether it is in the floating period or not can be determined based on whether the detection value of the floor reaction force is equal to or lower than a predetermined value or not.

The sixth embodiment described above is associated with the first to sixth, eighth, ninth and twenty-third to thirtieth implementations of the present invention.

The posture rotation center determined in the embodiments described above will be described below more specifically. When any of the legs 2 is in contact with the floor, and a sufficient floor reaction force occurs, the posture rotation center is considered to lie in the supporting polygon (that is, a minimum convex polygon containing the contact surface, a possible area of the ZMP or a possible area of the central point of the total floor reaction force).

The reason for this is as follows. If the posture rotation center lies out of the supporting polygon, every point in the bottom surface of the foot 22 relatively moves with respect to the floor, and therefore, a dynamical friction occurs at every contact point between the bottom surface of the foot 22 and the floor. The dynamical friction remains at a constant value and cannot be controlled to an arbitrary value even if the robot 1 moves the legs 2 in an attempt to control the floor reaction force. This can be compared to a situation in which one cannot walk properly on a slippery ice surface. Therefore, if the robot 1 moves stably by controlling the floor reaction force, it can be considered that, in a certain area between the bottom surface of the foot 22 and the floor, no slipping occurs and a static friction occurs. That is, the posture rotation center is considered to lie in the supporting polygon. Incidentally, if the foot 22 of the robot 1 is perfectly rigid, slipping occurs at every contact point other than the posture rotation center. However, since the sole of the foot 22 is actually made of an elastic material, such as rubber, it can be considered that no slipping occurs in the vicinity of the posture rotation center.

In addition, during the floating period, the robot is considered to perform a perturbation movement about the center of gravity.

In a period other than that described above, that is, when a sufficient floor reaction force does not occur although any of the legs 2 is in contact with the floor, considering the movement continuity, the posture rotation center is considered to lie between the supporting polygon and the total-center-of-gravity position (or the position of the representative point of the body).

Thus, in general, the posture rotation center determined in step S2204 (see FIG. 14) performed in the third embodiment is desirably any of the following points:

(all at the current time t)
- (a) the desired ZMP;
- (b) the actual ZMP (that is, the actual floor reaction force's central point, or the central point of the pressure of the floor reaction force);
- (c) a predetermined point, the origin, for example, in the supporting leg coordinate system;
- (d) the total center of gravity;
- (e) the representative point of the body; and
- (f) the internally dividing point of some of the points described above.

When any of the legs is in contact with the floor, and a sufficient floor reaction force occurs, the posture rotation center preferably lies in the supporting polygon. Specifically, the posture rotation center is preferably set at the point (a) or (b). Alternatively, the posture rotation center may be set at the predetermined point (c) so that it is contained in the supporting polygon. For example, the posture rotation center may be set at the origin (typically, located below the ankle joints) of the supporting coordinate system.

In the floating period, the posture rotation center is preferably set at the point (d). However, since the total-center-of-gravity position is in the vicinity of the representative point of the body, the posture rotation center may be set at the point (e).

In a period other than that described above, that is, when a sufficient floor reaction force does not occur although any of the legs 2 is in contact with the floor, the posture rotation center is preferably set at the point (f).

Furthermore, considering the movement continuity for all the periods, the posture rotation center is preferably set in such a manner that it varies continuously.

In any case, at substantially all the instants, the posture rotation center is preferably set on the surface of or in a smallest convex polyhedron containing the whole robot 1.

Figure 10:
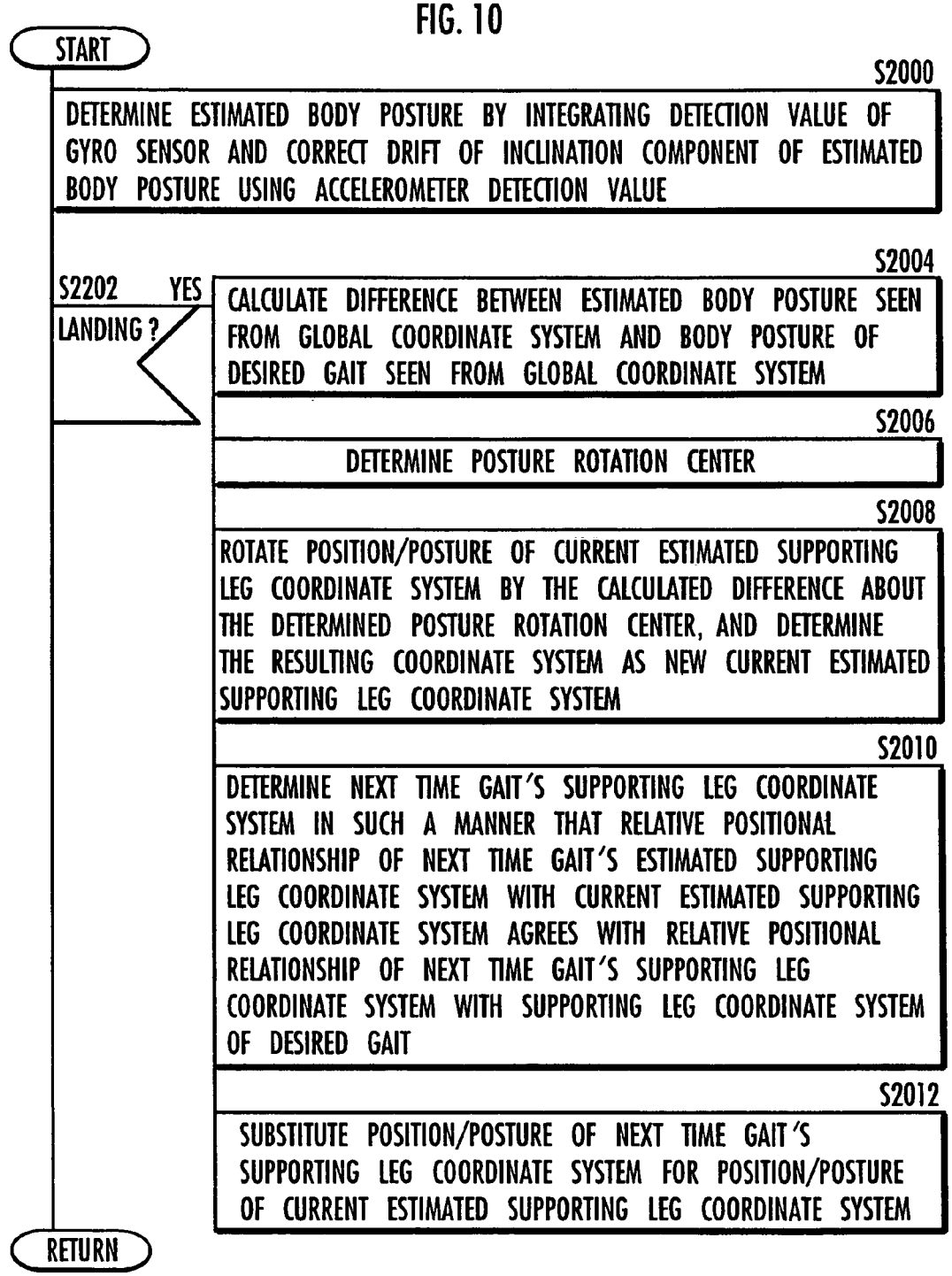
FIG. 10 is a flowchart showing a self position/posture estimating process shown in the flowchart shown in FIG. 9.

Similarly, in general, the posture rotation center determined in step S2006 in FIG. 10 according to the first embodiment and in step S2106 in FIG. 12 according to the second embodiment is desirably any of the following points:
- (a) the desired ZMP position at a landing time n of a free leg or averaged for a period of one step;
- (b) the actual ZMP position (that is, the actual floor reaction force's central point, or the central point of the pressure of the floor reaction force) at a landing time n of a free leg or averaged for a period of one step;
- (c) a predetermined point, the origin, for example, in the supporting leg coordinate system;
- (d) the total-center-of-gravity position at a landing time n of a free leg or averaged for a period of one step;
- (e) the representative point of the body at a landing time n of a free leg or averaged for a period of one step; and
- (f) the internally dividing point of some of the points described above.

In any case, the posture rotation center is preferably set on the surface of or in a smallest convex polyhedron containing the area swept by whole robot 1 during the latest one step.

Alternatively, the posture rotation center is preferably set on the surface of or in a smallest convex polyhedron that contains the whole robot 1 at a certain instant, for example, at the instant of landing.

According to the fourth embodiment, in correcting the inertial-navigation-like estimated body position using the geometrically estimated body position, the correcting input (that is, the output of the block 318 in FIG. 17) is additionally supplied to the integrator (the block 320 in FIG. 17) for calculating the inertial-navigation-like estimated body position. Therefore, the inertial-navigation-like estimated body position is corrected for each control cycle. However, the inertial-navigation-like estimated body position may be determined without correction for a predetermined period of time, an interpolatively estimated body position, which is an interpolation of the inertial-navigation-like estimated body position and the geometrically estimated body position, may be determined using the following formula 45, and the interpolatively estimated body position may be finally output as the estimated body position.

interpolatively estimated body position=α*inertial-navigation-like estimated body position+(1−α)*geometrically estimated body position    formula 45

However, the character α denotes the weight of the weighted average, which gradually varies from 1 to 0 during the predetermined period of time.

When α reaches 0, the inertial-navigation-like estimated body position is substituted (overwritten) with the geometrically estimated body position, and the value of α is restored to 1.

In addition, the predetermined period of time is set in a period other than the floating period.

In the fifth and sixth embodiments, as in the fourth embodiment, there may be determined the interpolatively estimated total-center-of-gravity position, which is an estimated total-center-of-gravity position determined by interpolation of the inertial-navigation-like or dynamically estimated total-center-of-gravity position and the geometrically estimated total-center-of-gravity position.

In the fourth to sixth embodiments, only the vertical positional component (with respect to the floor) of the inertial-navigation-like estimated body position, the inertial-navigation-like estimated center-of-gravity position or the dynamically estimated center-of-gravity position may be corrected. Alternatively, only the horizontal component thereof may be corrected.

The correction gains Ka, Kb, Kc and Kd may be determined using a stationary Kalman filter or a non-stationary Kalman filter. However, as for the robot 1 according to this embodiment, in particular, when the robot is moving, the characteristics of a system noise (disturbance) and an observation noise do not adequately satisfy the precondition of the Kalman filter, and therefore, the Kalman filter cannot always be adequately effective.

The accelerometer and the gyro sensor may be mounted on (or incorporated in) a part of the robot other than the body 3, for example, the head portion 4. Furthermore, in the case where there is a neck joint between the head portion 4 and the body 3, the self-position estimation can be achieved in the same manner as in the embodiments described above except that the detection values of the accelerometer and the gyro sensor have to be additionally converted into the acceleration and the angular acceleration of the representative point of the body, respectively, through a kinematics calculation based on a displacement command (a desired displacement) for the neck joint or a displacement detection value thereof.

Depending on the component of the estimated position/posture (that is, whether the positional vertical component, the positional horizontal component, the directional component about the vertical axis, or the inclination component), a different one of the self-position estimating processes according to the first to sixth embodiments can be selected. For example, the horizontal position of the body 3 may be estimated geometrically in accordance with the self-position estimating process according to the third embodiment, while, as for the vertical position thereof, the inertial-navigation-like estimated body's vertical position may be corrected using the geometrically estimated body's vertical position in accordance with the self-position estimating process according to the fourth embodiment.

In the embodiments in which the joint displacements are used in determining the estimated supporting leg coordinate system and the geometrically estimated body position, the joint displacements of the desired gait or the joint displacement detection values are used as the joint displacements. However, the weighted averages thereof may be used. Furthermore, the weight may have a frequency characteristic.

The estimated position/posture, such as the estimated supporting leg coordinate system or the estimated body position/posture, may be represented by a perturbation from the desired position/posture, rather than represented with respect to the global coordinate system as in the embodiments described above.

In the fourth and later embodiments, as shown in FIG. 17, the estimated body posture angular error in the global coordinate system is determined based on the estimated gravitational acceleration in the global coordinate system, the estimated body posture angular error in the global coordinate system is multiplied with the gain Kb, and the resulting value is additionally input to the integrator (the block 310 in FIG. 17) for integrating the body angular velocity ωgl in the global coordinate system, thereby correcting the estimated body posture. That is, the estimated body posture is corrected in the global coordinate system. Instead, however, the estimated body posture may be corrected in the local coordinate system of the gyro sensor (that is, the coordinate system fixed to the body 3). Specifically, in FIG. 17, the block 309 of the gain Kb and the adder (block 308) that subtracts the output of the block 309 from the body angular velocity ωgl in the global coordinate system may be omitted, and the integrator Ka/S (block 306) may be replaced with a block Ka/S+Kb, that is, a block of PI control law.

In principle, even if such correction in the local coordinate system is performed, convergence of the inclination drift during revolution (including in-situ revolution) with a high yaw rate is not adversely affected by the gain Kb.

In correcting the estimated body posture, the estimated gravitational acceleration may be determined by subtracting the body acceleration of the desired gait from the accelerometer's detection value's global-coordinate-system-converted value, rather than by subtracting the geometrically estimated body acceleration from the accelerometer's detection value's global-coordinate-system-converted value.

In actual, the posture of the robot attempting to move following the desired gait is rotated about the posture rotation center. Therefore, due to the posture rotation, the body acceleration deviates from that of the desired gait. However, the posture inclination included in the posture rotation is 0 on average, even if it varies back and forth and around. In addition, the spin included in the posture rotation is approximately 0 on average, because the direction of the spin is inverted at every step. Therefore, excluding the force, such as the centrifugal force, acting in substantially the same direction regardless of the direction of the posture rotation, the long-term effect of the posture rotation on the body acceleration is substantially 0, because the positive component and the negative component cancel out each other. The term "long term" means a period of time equal to or longer than the settling time of correction of the estimated body posture.

Therefore, instead of the geometrically estimated body acceleration, the body acceleration of the desired gait can be used for correcting the estimated body posture without significantly degrading the effectiveness of the correction.

As in the fourth embodiment, in the first to third embodiments, a detection drift of the gyro sensor can be corrected using the movement acceleration calculated from the geometrically estimated body position/posture movement and the detection value of the accelerometer. Furthermore, in the first to third embodiments, a drift of the inclination component of the estimated body posture can be corrected in the same manner as in the fourth embodiment. Furthermore, in the first to third embodiments, yaw rate correction can be achieved in the same manner as in the fourth embodiment.

Figure 23:
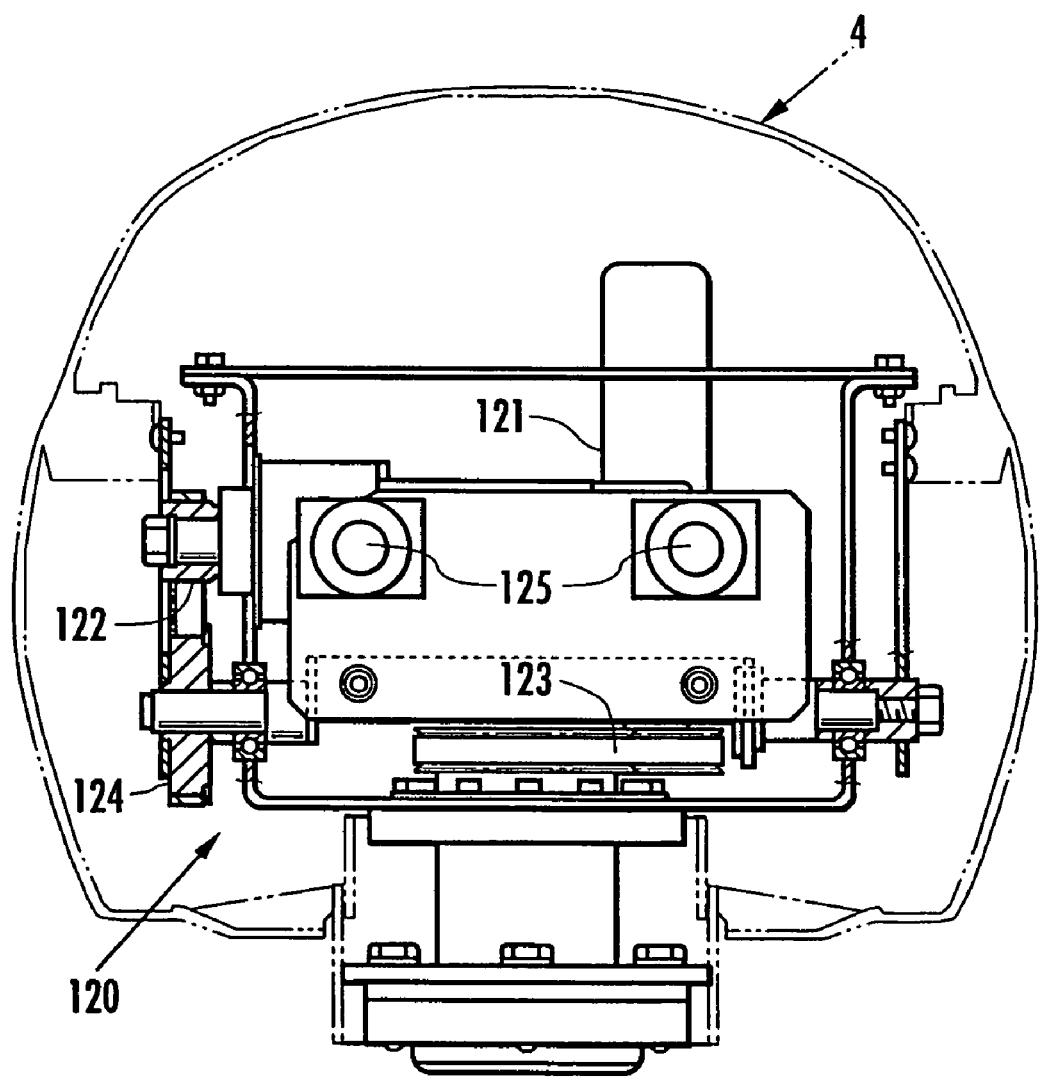
FIG. 23 is a front view of an internal arrangement of a head portion of the robot according to a seventh embodiment.
Figure 24:
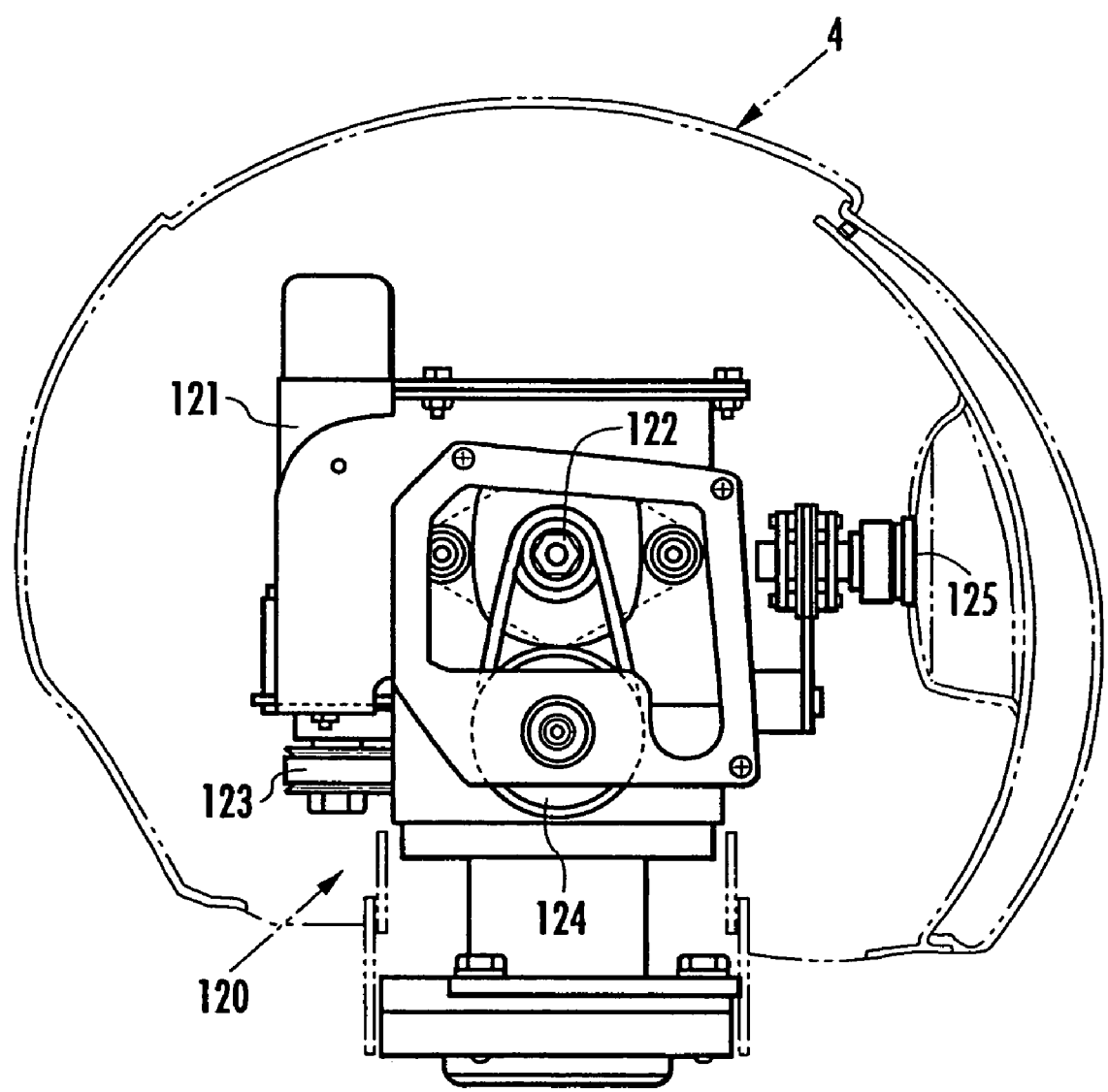
FIG. 24 is a side view of the internal arrangement of the head portion of the robot according to the seventh embodiment.

Now, a seventh embodiment of the present invention will be described with reference to FIGS. 23 to 25. FIGS. 23 and 24 show an internal arrangement of the head portion 4 of the robot 1 according to the seventh embodiment. FIG. 23 is a front view thereof, and FIG. 24 is a side view thereof. The head portion 4 is connected to the top of the body 3 via a neck joint 120 capable of rotating in pan and tilt directions.

As with the other joints, the neck joint 120 also has electric motors 121, 122 with an encoder (an joint displacement detector) and decelerators 123, 124 and is controlled to follow a joint displacement command from the control unit 60 by a motor controller (not shown).

The head portion 4 has two, left and right, video cameras 125, 125 as environment recognition means, so that it can get a stereoscopic view of a target object. Although not shown in FIG. 5, the outputs (that is, the picked-up image information) of the video cameras 125, 125 are input to the control unit 60, and control unit 60 recognizes the distance to the target object or the like in the picked-up image information.

Instead of the two, left and right, video cameras 125, 125, the following environment recognition means may be used:
(a) means for enabling stereoscopic view with three or more cameras;
(b) means for recognizing multiple points on a target object with one camera and estimating the distance to the target object on the principle of triangulation; and
(c) a non-contact multi-point distance meter, such as a rangefinder and a scanning laser distance meter.

The seventh embodiment differs from the fourth embodiment in the self-position estimating process in step S016 in FIG. 9, in addition to the arrangement of the head portion 4 described above. The other arrangements and processings are the same as those in the fourth embodiment. The other arrangements and processings may be the same as those in the fifth or sixth embodiment, rather than the fourth embodiment.

FIG. 25 is a flowchart showing a self-position estimating process in step S016 in FIG. 9 according to the seventh embodiment. According to the seventh embodiment, the estimated self position/posture in the fourth embodiment is used to control the neck joint 120 so that the target object is captured at the center of or at an appropriate position in the image taken by the video cameras 125, 125 (simply referred to as a camera image, hereinafter), thereby achieving gazing control for controlling the directions of the video cameras 125, 125. In addition, a landmark or the like, whose precise position in the global coordinate system has been previously stored, is recognized by the video cameras 125, 125 (or a range finder or the like) to correct the estimated self position/posture. In addition, the target object is recognized by the video cameras 125, 125, and the position/posture of the target object in the global coordinate system and the shape thereof are recognized based on the information obtained by the video cameras 125, 125 and the estimated self position/posture.

Here, instead of the estimated self position/posture in the fourth embodiment, the estimated self position/posture in the third, fifth or sixth embodiment may be used.

Now, the operation according to the seventh embodiment will be described in detail with reference to FIG. 25.

First, in steps S2500 to S2504, the same processings as those in steps S2300 to S2304 in the fourth embodiment are performed to determine the estimated body posture, the position/posture of the estimated supporting leg coordinate system, the geometrically estimated body position and the inertial-navigation-like estimated body position.

Then, the process proceeds to step S2506, where it is determined whether to perform gazing control or not. Specifically, whether to perform gazing control or not is determined based on the current estimated body posture, the current inertial-navigation-like estimated body position, the desired path of the robot 1 and map information. If it is determined to perform gazing control, it is determined what target object is to be gazed. Specifically, the map information includes description of an area in which each target object can be observed and the relative positional relationship between the robot 1 and the target object can be determined (referred to as an observable area, hereinafter). Then, based on the current estimated body posture, the current inertial-navigation-like estimated body position and a future desired path, it is determined whether the target object will remains in any of the observable areas for a predetermined period of time from the current moment, and if it is expected that the target object will remains in the observable area for the predetermined period of time, it is determined that gazing control should be performed.

The target object to be gazed may be previously specified based on the movement path by an action planning portion (not shown) of the robot 1 positioned higher than the movement control portion (the portion shown in FIG. 6) in the hierarchy of the robot 1 or specified by the operator via a man-machine interface.

Here, the map information concerns the position, the feature, the observable area or the like of a landmark, an obstacle, a destination, a movable range, a road or the like and is previously stored in a memory.

Then, the process proceeds to step S2508, where the relative relationship between the position of the target object to be gazed on the map and the estimated body position/posture.

Then, the process proceeds to step S2150, where, based on the relative relationship, the desired neck joint displacement is determined through a kinematics calculation in such a manner that the target object is captured at the center of the camera image.

Then, the process proceeds to step S2512, where the neck joint motors 121, 122 are controlled to provide the desired neck joint displacement. Specifically, the control unit 60 outputs the desired neck joint displacement to the motor controller (that is, the motor driver) for the neck joint motors 121, 122. Then, the motor controller (motor driver) for the neck joint motors 121, 122 controls the current supplied to the neck joint motors 121, 122 in such a manner that the neck joint displacement detection value follows the desired neck joint displacement.

Then, the process proceeds to step S2514, where it is determined whether the target object is a landmark or not. Specifically, whether the target object is a landmark or not is determined based on retrieved information about the attribute of the target object.

If the result of the determination in step S2514 is YES, the process proceeds to step S2516, where the position/posture of the supporting leg coordinate system associated with the current position/posture of the foot of the supporting leg of the actual robot 1 (hereinafter, referred to as a visually estimated supporting leg coordinate system) in the global coordinate system is estimated through a geometrical calculation based on the camera image, the map information, the estimated body position/posture and the neck joint displacement.

Following step S2516, the process proceeds to step S2518, where the position/posture of the estimated supporting leg coordinate system is corrected so that the difference between the position/posture of the visually estimated supporting leg coordinate system and the position/posture of the estimated supporting leg coordinate system converges to 0.

The processing in step S2518 will be described more specifically. First, the difference between the position/posture of the visually estimated supporting leg coordinate system and the position/posture of the estimated supporting leg coordinate system is determined. Then, the product of the difference and a predetermined gain Ke is determined, the product is added to the position/posture of the estimated supporting leg coordinate system, and the resulting position/posture is defined as the position/posture of a new estimated supporting leg coordinate system.

That is, the new estimated supporting leg coordinate system is determined by the following formula 46. In other words, the position/posture of the new estimated supporting leg coordinate system is determined by interpolation (that is, interior division or weighted average) of the position/posture of the visually estimated supporting leg coordinate system and the position/posture of the estimated supporting leg coordinate system.

new estimated supporting leg coordinate system=position/posture of estimated supporting leg coordinate system+$Ke$*(position/posture of visually estimated supporting leg coordinate system−position/posture of estimated supporting leg coordinate system) formula 46

The gain Ke may be determined based on the likelihood of each estimated value so that the estimated supporting leg coordinate system newly determined assumes a value having the highest probability as a true value.

If the result of the determination in step S2514 is NO, the process proceeds to step S2520, where the shape/position of the target object is calculated from the camera image, the map information, the estimated body position/posture and the neck joint displacement. In the following, the shape/position of the target object thus calculated will be referred to as a visually estimated target-object shape/position.

Following step S2520, the process proceeds to step S2522, where the shape/position of the target object registered in the map information is corrected based on the visually estimated target-object shape/position. Specifically, the shape/position of the target object registered in the map information is corrected so as to make the difference between the visually estimated target-object shape/position and the shape/position of the target object registered in the map information converge to 0.

More specifically, first, the difference between the visually estimated target-object shape/position and the shape/position of the target object registered in the map information is determined. Then, the product of the difference and a predetermined gain Kf is determined, the product is added to the shape/position of the target object registered in the map information, and the resulting shape/position is defined as a new shape/position of the target object registered in the map information.

That is, the new shape/position of the target object registered in the map information is determined by the following formula 47. In other words, the new shape/position of the target object registered in the map information is determined by interpolation (that is, interior division or weighted average) of the visually estimated target-object shape/position and the shape/position of the target object registered in the map information.

new shape/position of target object registered in map information=shape/position of target object registered in map information+$Kf$*(visually estimated target-object shape/position−shape/position of target object registered in map information) formula 47

The self-position estimating process in step S016 ends with the completion of the processing in step S2518 or S2522.

The position of the visually estimated supporting leg coordinate system is estimated based on the inertial-navigation-like estimated body position, and the inertial-navigation-like estimated body position is determined so as to converge to the geometrically estimated body position/posture calculated based on the estimated supporting leg coordinate system. Therefore, if the position/posture of the estimated supporting leg coordinate system is modified in the processing in step S2518, the position of the visually estimated supporting leg coordinate system is also modified with a certain delay. Therefore, in the processing in step S2518, a too high gain Ke intended for accelerating the convergence can possibly result in an oscillation. To increase the gain Ke while avoiding such oscillation, the position/posture of the estimated supporting leg coordinate system is corrected in accordance with the difference between the position/posture of the visually estimated supporting leg coordinate system and the position/posture of the estimated supporting leg coordinate system, and the inertial-navigation-like estimated body position is also corrected directly, thereby reducing the delay in modification of the position of the visually estimated supporting leg coordinate system.

If the difference between the estimated body position/posture and the visually estimated body position/posture or the difference between the visually estimated target-object shape/position and the shape/position of the target object registered in the map information is greater than a predetermined allowable value, it may be determined that the recognition is erroneous, and the estimated body position/posture or the shape/position of the target object registered in the map information may not be corrected using the value.

The seventh embodiment described above is associated with the thirty-first to thirty-seventh implementations of the present invention.

As described above, according to the first embodiment, assuming that the actual behavior of the robot 1 is a rotation, during one step, of the robot 1 and the estimated supporting leg coordinate system, the estimated supporting leg coordinate system being a local coordinate system that describes the movement of the robot 1 and the robot 1 moving following the desired gait in the estimated supporting leg coordinate system, about the predetermined posture rotation center determined by the posture rotation center determining means by the difference between the posture detected or estimated by the posture detecting means (or the vertical component of the difference), the position/posture of the new estimated supporting leg coordinate system depending on the position/posture of the free leg at the time of landing, that is, the position and orientation of the landing point are estimated for every step (for every landing). Therefore, the position and orientation of the landing point can be estimated with high precision. In particular, the position and orientation of the landing point can be estimated with high precision even if the robot 1 is in a state where the acceleration thereof varies greatly horizontally or vertically, in a state where all the legs 2, 2 float in the air, which occurs during the floating period when the robot is running, for example, or in a state where a posture rotation (or a spin) of the whole robot occurs due to a rotational slipping of a foot 22 with respect to the floor.

According to the second embodiment, assuming that the actual behavior of the robot 1 is a rotation, during one step, of the robot 1 and the estimated supporting leg coordinate system, the estimated supporting leg coordinate system being a local coordinate system that describes the movement of the robot 1 and the robot 1 moving following at least the joint displacement detection values while keeping the body posture according to the desired gait in the estimated supporting leg coordinate system, about the predetermined posture rotation center determined by the posture rotation center determining means by the difference between the posture detected or estimated by the posture detecting means, and the position/posture of the new estimated supporting leg coordinate system depending on the position/posture of the free leg at the time of landing, that is, the position and orientation of the landing point are estimated for every step (each time the foot lands on the floor). Therefore, the position and orientation of the landing point can be estimated with a higher precision.

According to the third embodiment, assuming that the actual behavior of the robot 1 is a rotation, at each instant, of the robot 1 and the estimated supporting leg coordinate system, the estimated supporting leg coordinate system being a local coordinate system that describes the movement of the robot 1 and the robot 1 moving following the desired gait in the estimated supporting leg coordinate system, about the predetermined posture rotation center at that instant determined by the posture rotation center determining means at a variation rate, which is the difference between the variation rate of the body posture detected or estimated by the posture detecting means and the variation rate of the body posture of the desired gait, and the estimated supporting leg coordinate system and the estimated body position/posture are newly determined (updated) at each instant (for each control cycle). In addition, for every step (each time a foot lands on the floor), the position/posture of the new estimated supporting leg coordinate system depending on the position/posture of the free leg, that is, the position and orientation of the new landing point are estimated. Therefore, the position and orientation of the landing point can be estimated with higher precision, and the self position/posture of the robot 1 can be estimated continuously with high precision.

According to the fourth embodiment, the estimated body position (the inertial-navigation-like estimated body position) and the estimated body posture are determined by the inertial navigation method, and the geometrically estimated body position, which is the estimated body position determined in the third embodiment, is used to correct the inertial-navigation-like estimated body position and the estimated body posture. Therefore, the self position/posture of the robot 1 and the landing position and orientation thereof (that is, the position and orientation of the estimated supporting leg coordinate system) can be estimated with a higher precision.

According to the fifth embodiment, instead of the inertial-navigation-like estimated body position Xinertestm determined in the fourth embodiment, the inertial-navigation-like estimated total-center-of-gravity position is determined for each control cycle. Therefore, the self position/posture of the robot 1 and the landing position and orientation thereof (that is, the position and orientation of the estimated supporting leg coordinate system) can be estimated with high precision, as with the fourth embodiment.

According to the sixth embodiment, instead of the inertial-navigation-like estimated total-center-of-gravity position determined based on the detection value of the accelerometer in the fifth embodiment, the dynamically estimated total-center-of-gravity position is calculated from the detection value of the floor reaction force sensor. Therefore, the self position/posture of the robot 1 and the landing position and orientation thereof (that is, the position and orientation of the estimated supporting leg coordinate system) can be estimated with high precision, as with the fifth embodiment.

According to the seventh embodiment, the environment recognition means, such as the video cameras 125, 125, mounted on the robot 1 determines the direction of gazing using the self-position geometrically estimating calculation or compositely using the self-position geometrically estimating calculation and the inertial navigation calculation based on the self position/posture estimated continuously (for each control cycle) and the position, in the global coordinate system, of a target object on the previously stored map, such as a floor surface or an obstacle. Therefore, the target object can be continuously captured at the center of or at an appropriate position in an image taken by the environment recognition means.

In addition, when the environment recognition means recognizes the target object, the position/posture of the target object in the global coordinate system or the shape thereof can be recognized with high precision based on the information obtained by the environment recognition means and the estimated self position/posture.

In addition, the position/shape of the target object on the map is corrected based on plural successive images, and therefore, the correction is less susceptible to the influence of a noise or erroneous recognition.

In addition, the environment recognition means corrects the self position/posture estimated using the self-position geometrically estimating calculation or the self position/posture estimated compositely using the self-position geometrically estimating calculation and the inertial navigation calculation based on the previously-stored precise information about the position of a target object, such as a landmark, and the information about the relative position of the robot 1 with respect to the target object obtained by the environment recognition means, and thus, the self position/posture can be estimated with a higher precision.

In addition, the self position/posture is corrected based on plural successive images, and therefore, the correction is less susceptible to the influence of a noise or erroneous recognition.

In addition, in the fourth embodiment, the influence of the movement acceleration can be reduced, so that the posture inclination of the robot 1 can be estimated with high precision. This holds true for the other embodiments.

In addition, in the fourth embodiment, the yaw rate is corrected, so that the posture (in particular, the direction of the horizontal component thereof) and position of the robot 1 can be estimated with a higher precision. This holds true for the other embodiments.

INDUSTRIAL APPLICABILITY

As described above, the present invention effectively provides a technique for estimating the position of a leg type movable robot, such as a two-legged movable robot, with high precision.

The invention claimed is:

1. A self-position estimating device for a leg type movable robot that is controlled to follow a determined desired gait, comprising:
 posture rotational deviation calculating means for determining a temporal variation of posture rotational deviation, which is the difference between a detected or estimated value of an actual posture of a predetermined part of said robot and a desired posture of said predetermined part in said desired gait, as a posture rotational deviation's variation;
 rotation center determining means for determining the rotation center of the variation of said posture rotational deviation; and
 position estimating means for determining an estimated position of said robot, that is, an estimated value of the position of said robot, on the assumption that said robot rotates about said rotation center by said posture rotational deviation's variation.

2. The self-position estimating device for a leg type movable robot according to claim 1, wherein said position estimating means comprises means for determining a second coordinate system, which is obtained by rotating a first coordinate system that describes said desired gait about said rotation center by said posture rotational deviation's variation, and said position estimating means determines the estimated position of the robot seen from a global coordinate system in such a manner that the robot position seen from said first coordinate system, which is recognized from at least any of a desired movement with said desired gait, a displacement detection value of a joint of said robot and a desired displacement value of the joint, agrees with the estimated position of the robot seen from said second coordinate system.

3. The self-position estimating device for a leg type movable robot according to claim 2, wherein said predetermined part is a body of said robot.

4. The self-position estimating device for a leg type movable robot according to claim 2, wherein said posture rotational deviation includes at least a posture rotational deviation component of said predetermined part in a yaw direction.

5. The self-position estimating device for a leg type movable robot according to claim 2, characterized in that the desired gait of said robot is a gait including a floating period in which all the legs of the robot float in the air, and said rotation center determining means sets said rotation center at the center of gravity of said robot during said floating period and sets said rotation center at an actual floor reaction force central point, a desired ZMP of the desired gait or a point in the vicinity of the points during a period other than the floating period.

6. The self-position estimating device for a leg type movable robot according to claim 2, wherein said posture rotational deviation calculating means is means for successively determining said posture rotational deviation's variation at each instant, and said position estimating means successively determines the estimated position of said robot at each instant using the posture rotational deviation's variation at each instant.

7. The self-position estimating device for a leg type movable robot according to claim 2, wherein said posture rotational deviation calculating means is means for determining a posture rotational deviation's variation between landings, which is a posture rotational deviation's variation for a period from the last-time leg landing of a leg to the current-time leg landing, each time a leg of the robot lands on a floor via a landing operation of the robot, and said position estimating means determines the estimated position of said robot at each landing using the posture rotational deviation's variation between landings.

8. The self-position estimating device for a leg type movable robot according to claim 2, wherein the position of the robot estimated by said position estimating means is a contact position of the leg, which comes into contact with the floor in the landing operation of the robot.

9. The self-position estimating device for a leg type movable robot according to claim 2, wherein the self-position estimating device further comprises floor reaction force detecting means for detecting a floor reaction force applied to said robot, and said position estimating means estimates a deformation of said robot based on said detected floor reaction force and determines the estimated position of said robot using at least the estimated deformation.

10. The self-position estimating device for a leg type movable robot according to claim 1, wherein said predetermined part is a body of said robot.

11. The self-position estimating device for a leg type movable robot according to claim 1, wherein said posture rotational deviation includes at least a posture rotational deviation component of said predetermined part in a yaw direction.

12. The self-position estimating device for a leg type movable robot according to claim 1, characterized in that the desired gait of said robot is a gait including a floating period in which all the legs of the robot float in the air, and said rotation center determining means sets said rotation center at the center of gravity of said robot during said floating period and sets said rotation center at an actual floor reaction force central point, a desired ZMP of the desired gait or a point in the vicinity of the points during a period other than the floating period.

13. The self-position estimating device for a leg type movable robot according to claim 1, wherein said posture rotational deviation calculating means is means for successively determining said posture rotational deviation's variation at each instant, and said position estimating means successively determines the estimated position of said robot at each instant using the posture rotational deviation's variation at each instant.

14. The self-position estimating device for a leg type movable robot according to claim 1, wherein said posture rotational deviation calculating means is means for determining a posture rotational deviation's variation between landings, which is a posture rotational deviation's variation for a period from the last-time leg landing of a leg to the current-time leg landing, each time a leg of the robot lands on a floor via a landing operation of the robot, and said position estimating means determines the estimated position of said robot at each landing using the posture rotational deviation's variation between landings.

15. The self-position estimating device for a leg type movable robot according to claim 1, wherein the position of the robot estimated by said position estimating means is a contact position of the leg, which comes into contact with the floor in the landing operation of the robot.

16. The self-position estimating device for a leg type movable robot according to claim 1, wherein the self-position estimating device further comprises floor reaction force detecting means for detecting a floor reaction force applied to said robot, and said position estimating means estimates a deformation of said robot based on said detected floor reaction force and determines the estimated position of said robot using at least the estimated deformation.

17. The self-position estimating device for a leg type movable robot according to claim 1, further comprising means for correcting at least one of the detected or estimated value of the actual posture of said predetermined part and the estimated position of said robot based on at least information about the position of a target object, a floor surface or an obstacle, on a map stored previously and information about the relative position of the robot with respect to the target object, which is recognized with environment recognition means, an image pickup device, mounted on said robot.

18. The self-position estimating device for a leg type movable robot according to claim 1, further comprising means for estimating the position of a target object based on at least the position of said robot estimated by said position estimating means and information about the relative position of said robot with respect to the target object, which is recognized with environment recognition means, an image pickup device, mounted on said robot.

19. The self-position estimating device for a leg type movable robot according to claim 1, further comprising means for determining the direction of gazing of environment recognition means, an image pickup device, mounted on said robot based on at least the estimated position of said robot and the position of a target object, a floor surface or an obstacle, on a map stored previously.

20. A self-position estimating device for a leg type movable robot that is controlled to follow a determined desired gait, comprising:
an accelerometer for detecting a translational acceleration that is mounted on said robot;
an angular velocity sensor for detecting an angular velocity in an inertial space that is mounted on said robot;
geometrical position estimating means for determining a first estimated position, which is a geometrically estimated value of the vertical position of a predetermined part of said robot or the center of gravity of said robot, based on at least any of a desired movement with said desired gait, a displacement detection value of a joint of said robot and a desired displacement value of the joint; and
inertial-navigation-like position estimating means for determining a second estimated position, which is an inertial-navigation-like estimated value of the vertical position of said predetermined part or the total center of gravity of said robot, by an inertial navigation method based on at least a detection value of said accelerometer and a detection value of said angular velocity sensor and correcting the second estimated position based on at least the difference between said first estimated position and said second estimated position.

21. The self-position estimating device for a leg type movable robot according to claim 20, wherein said predetermined part is a body of said robot.

22. The self-position estimating device for a leg type movable robot according to claim 20, wherein the self-position estimating device further comprises floor reaction force detecting means for detecting a floor reaction force applied to said robot, and said geometrical position estimating means estimates a deformation of said robot based on said detected floor reaction force and determines said first estimated position using the estimated deformation.

23. The self-position estimating device for a leg type movable robot according to claim 20, wherein said inertial-navigation-like position estimating means corrects said second estimated position in such a manner that the difference between said first estimated position and said second estimated position is brought close to 0.

24. The self-position estimating device for a leg type movable robot according to claim 20, wherein the desired gait of said robot is a gait including a floating period in which all the legs of the robot float in the air, and said inertial-navigation-like position estimating means sets the correction amount of said second estimated position at substantially 0 in said floating period.

25. The self-position estimating device for a leg type movable robot according to claim 20, further comprising means for correcting at least one of the said first estimated position and said second estimated position based on at least information about the position of a target object, a floor surface or an obstacle, on a map stored previously and information about the relative position of the robot with respect to the target object, which is recognized with environment recognition means, an image pickup device, mounted on said robot.

26. The self-position estimating device for a leg type movable robot according to claim 20, further comprising means for estimating the position of a target object based on at least said second estimated position and information about the relative position of said robot with respect to the target object, which is recognized with environment recognition means, an image pickup device, mounted on said robot.

27. The self-position estimating device for a leg type movable robot according to claim 20, further comprising means for determining the direction of gazing of environment recognition means, an image pickup device, mounted on said robot based on at least said second estimated position and the position of a target object, a floor surface or an obstacle, on a map stored previously.

28. A self-position estimating device for a leg type movable robot that is controlled to follow a determined desired gait, comprising:
an accelerometer for detecting a translational acceleration that is mounted on said robot;
posture rotational deviation calculating means for determining a temporal variation of posture rotational deviation, which is the difference between a detected or estimated value of an actual posture of a predetermined part of said robot and a desired posture of said predetermined part in said desired gait, as a posture rotational deviation's variation;

rotation center determining means for determining the rotation center of the variation of said posture rotational deviation;

geometrical position estimating means for determining a first estimated position, which is an estimated value of the position of said predetermined part or the total center of gravity of said robot, on the assumption that said robot rotates about said rotation center by said posture rotational deviation's variation; and inertial-navigation-like position estimating means for calculating a second estimated position, which is an estimated value of the position of the predetermined part or the total center of gravity of said robot, by an inertial navigation method based on at least a detection value of said accelerometer and a detected or estimated value of an actual posture of said predetermined part, and correcting the second estimated position based on at least the difference between the first estimated position and the second estimated position.

29. The self-position estimating device for a leg type movable robot according to claim 28, wherein said geometrical position estimating means comprises means for determining a second coordinate system, which is obtained by rotating a first coordinate system that describes said desired gait about said rotation center by said posture rotational deviation's variation, and said geometrical position estimating means determines the first estimated position of said predetermined part or the total center of gravity seen from a global coordinate system in such a manner that the position of said predetermined part or the total center of gravity seen from said first coordinate system, which is recognized from at least any of a desired movement with said desired gait, a displacement detection value of a joint of said robot and a desired displacement value of the joint, agrees with the first estimated position of said predetermined part or the total center of gravity seen from said second coordinate system.

30. The self-position estimating device for a leg type movable robot according to claim 29, wherein said predetermined part is a body of said robot.

31. The self-position estimating device for a leg type movable robot according to claim 29, wherein said posture rotational deviation includes at least a posture rotational deviation component of said predetermined part in a yaw direction.

32. The self-position estimating device for a leg type movable robot according to claim 29, wherein the self-position estimating device further comprises floor reaction force detecting means for detecting a floor reaction force applied to said robot, and said geometrical position estimating means estimates a deformation of said robot based on said detected floor reaction force and determines said first estimated position using the estimated deformation.

33. The self-position estimating device for a leg type movable robot according to claim 29, wherein the desired gait of said robot is a gait including a floating period in which all the legs of the robot float in the air, and said rotation center determining means sets said rotation center at the center of gravity of said robot during said floating period and sets said rotation center at an actual floor reaction force central point, a desired ZMP of the desired gait or a point in the vicinity of the points during a period other than the floating period.

34. The self-position estimating device for a leg type movable robot according to claim 29, wherein said inertial-navigation-like position estimating means corrects said second estimated position in such a manner that the difference between said first estimated position and said second estimated position is brought close to 0.

35. The self-position estimating device for a leg type movable robot according to claim 29, wherein the desired gait of said robot is a gait including a floating period in which all the legs of the robot float in the air, and said inertial-navigation-like position estimating means sets the correction amount of said second estimated position at substantially 0 in said floating period.

36. The self-position estimating device for a leg type movable robot according to claim 28, wherein said predetermined part is a body of said robot.

37. The self-position estimating device for a leg type movable robot according to claim 28, wherein said posture rotational deviation includes at least a posture rotational deviation component of said predetermined part in a yaw direction.

38. The self-position estimating device for a leg type movable robot according to claim 28, wherein the self-position estimating device further comprises floor reaction force detecting means for detecting a floor reaction force applied to said robot, and said geometrical position estimating means estimates a deformation of said robot based on said detected floor reaction force and determines said first estimated position using the estimated deformation.

39. The self-position estimating device for a leg type movable robot according to claim 28, wherein the desired gait of said robot is a gait including a floating period in which all the legs of the robot float in the air, and said rotation center determining means sets said rotation center at the center of gravity of said robot during said floating period and sets said rotation center at an actual floor reaction force central point, a desired ZMP of the desired gait or a point in the vicinity of the points during a period other than the floating period.

40. The self-position estimating device for a leg type movable robot according to claim 28, wherein said inertial-navigation-like position estimating means corrects said second estimated position in such a manner that the difference between said first estimated position and said second estimated position is brought close to 0.

41. The self-position estimating device for a leg type movable robot according to claim 28, wherein the desired gait of said robot is a gait including a floating period in which all the legs of the robot float in the air, and said inertial-navigation-like position estimating means sets the correction amount of said second estimated position at substantially 0 in said floating period.

42. The self-position estimating device for a leg type movable robot according to claim 28, further comprising means for correcting at least any of the said first estimated position, said second estimated position and the detected or estimated value of the actual posture of said predetermined part based on at least information about the position of a target object, a floor surface or an obstacle, on a map stored previously and information about the relative position of the robot with respect to the target object, which is recognized with environment recognition means, an image pickup device, mounted on said robot.

43. The self-position estimating device for a leg type movable robot according to claim 28, further comprising means for estimating the position of a target object based on at least said second estimated position and information about the relative position of said robot with respect to the target object, which is recognized with environment recognition means, an image pickup device, mounted on said robot.

44. The self-position estimating device for a leg type movable robot according to claim 28, further comprising means for determining the direction of gazing of environment recognition means, an image pickup device, mounted on said robot based on at least said second estimated position and the position of a target object, a floor surface or an obstacle, on a map stored previously.

45. A self-position estimating device for a leg type movable robot that is controlled to follow a determined desired gait, comprising:
  floor reaction force detecting means for detecting a floor reaction force applied to said robot;
  posture rotational deviation calculating means for determining a temporal variation of posture rotational deviation, which is the difference between a detected or estimated value of an actual posture of a predetermined part of said robot and a posture of said predetermined part in said desired gait, as a posture rotational deviation's variation;
  rotation center determining means for determining the rotation center of the variation of said posture rotational deviation;
  geometrical position estimating means for determining a first estimated position, which is an estimated position of said predetermined part or the total center of gravity of said robot, on the assumption that said robot rotates about said rotation center by said posture rotational deviation's variation; and
  dynamical position estimating means for calculating a second estimated position, which is an estimated position of said predetermined part or the total center of gravity of said robot, through a dynamical calculation based on at least a detection value of said floor reaction force detecting means and a detected or estimated value of said actual posture and correcting the second estimated position based on at least the difference between the first estimated position and the second estimated position.

46. The self-position estimating device for a leg type movable robot according to claim 45, wherein said geometrical position estimating means comprises means for determining a second coordinate system, which is obtained by rotating a first coordinate system that describes said desired gait about said rotation center by said posture rotational deviation's variation, and said geometrical position estimating means determines the first estimated position of said predetermined part or the total center of gravity seen from a global coordinate system in such a manner that the position of said predetermined part or the total center of gravity seen from said first coordinate system, which is recognized from at least any of a desired movement with said desired gait, a displacement detection value of a joint of said robot and a desired displacement value of the joint, agrees with the first estimated position of said predetermined part or the total center of gravity seen from said second coordinate system.

47. The self-position estimating device for a leg type movable robot according to claim 46, wherein said predetermined part is a body of said robot.

48. The self-position estimating device for a leg type movable robot according to claim 46, wherein said posture rotational deviation includes at least a posture rotational deviation component of said predetermined part in a yaw direction.

49. The self-position estimating device for a leg type movable robot according to claim 46, wherein said geometrical position estimating means estimates a deformation of said robot based on said detected floor reaction force and determines said first estimated position using the estimated deformation.

50. The self-position estimating device for a leg type movable robot according to claim 46, wherein the desired gait of said robot is a gait including a floating period in which all the legs of the robot float in the air, and said rotation center determining means sets said rotation center at the center of gravity of said robot during said floating period and sets said rotation center at an actual floor reaction force central point, a desired ZMP of the desired gait or a point in the vicinity of the points during a period other than the floating period.

51. The self-position estimating device for a leg type movable robot according to claim 46, wherein said dynamical position estimating means corrects said second estimated position in such a manner that the difference between said first estimated position and said second estimated position is brought close to 0.

52. The self-position estimating device for a leg type movable robot according to claim 46, wherein the desired gait of said robot is a gait including a floating period in which all the legs of the robot float in the air, and said dynamical position estimating means sets the correction amount of said second estimated position at substantially 0 in said floating period.

53. The self-position estimating device for a leg type movable robot according to claim 45, wherein said predetermined part is a body of said robot.

54. The self-position estimating device for a leg type movable robot according to claim 45, wherein said posture rotational deviation includes at least a posture rotational deviation component of said predetermined part in a yaw direction.

55. The self-position estimating device for a leg type movable robot according to claim 45, wherein said geometrical position estimating means estimates a deformation of said robot based on said detected floor reaction force and determines said first estimated position using the estimated deformation.

56. The self-position estimating device for a leg type movable robot according to claim 45, wherein the desired gait of said robot is a gait including a floating period in which all the legs of the robot float in the air, and said rotation center determining means sets said rotation center at the center of gravity of said robot during said floating period and sets said rotation center at an actual floor reaction force central point, a desired ZMP of the desired gait or a point in the vicinity of the points during a period other than the floating period.

57. The self-position estimating device for a leg type movable robot according to claim 45, wherein said dynamical position estimating means corrects said second estimated position in such a manner that the difference between said first estimated position and said second estimated position is brought close to 0.

58. The self-position estimating device for a leg type movable robot according to claim 45, wherein the desired gait of said robot is a gait including a floating period in which all the legs of the robot float in the air, and said dynamical position estimating means sets the correction amount of said second estimated position at substantially 0 in said floating period.

59. The self-position estimating device for a leg type movable robot according to claim 45, further comprising means for correcting at least any of the said first estimated position, said second estimated position and the detected or estimated value of the actual posture of said predetermined part based on at least information about the position of a target object, a floor surface or an obstacle, on a map stored previously and information about the relative position of the robot with respect to the target object, which is recognized with environment recognition means, an image pickup device, mounted on said robot.

60. The self-position estimating device for a leg type movable robot according to claim 45, further comprising means for estimating the position of a target object based on at least said second estimated position and information about the relative position of said robot with respect to the target object, which is recognized with environment recognition means, an image pickup device, mounted on said robot.

61. The self-position estimating device for a leg type movable robot according to claim 45, further comprising means for determining the direction of gazing of environment recognition means, an image pickup device, mounted on said robot based on at least said second estimated position and the position of a target object, a floor surface or an obstacle, on a map stored previously.

* * * * *